AUTOMATIC TOLL TICKETING TELEPHONE SYSTEM

Filed March 28, 1951 21 Sheets-Sheet 1

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 2

INVENTOR.
Harry N. Newstedt

BY
Smith, Olsen & Baird
Attys

AUTOMATIC TOLL TICKETING TELEPHONE SYSTEM

Filed March 28, 1951 21 Sheets-Sheet 3

INVENTOR.
Harry N. Newstedt
BY
Smith, Olsen & Baird
Attys.

AUTOMATIC TOLL TICKETING TELEPHONE SYSTEM

Filed March 28, 1951

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 5

INVENTOR.
Harry N. Newstedt

BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 6

INVENTOR.
Harry N. Newstedt
BY
Smith, Olsen + Baird
Attys.

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 8

INVENTOR.
Harry N. Newstedt
BY
Smith, Olsen & Baird
Attys

Dec. 25, 1956 H. N. NEWSTEDT 2,775,648

AUTOMATIC TOLL TICKETING TELEPHONE SYSTEM

Filed March 28, 1951 21 Sheets-Sheet 9

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 10

INVENTOR.
Harry N. Newstedt
BY
Smith, Olsen & Baird
Attys.

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 12

INVENTOR.
Harry N. Newstedt
BY
Smith, Olsen & Baird
Attys.

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 14

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 15

INVENTOR.

Harry N. Newstedt

BY

Smith, Olsen & Baird

Attys.

AUTOMATIC TOLL TICKETING TELEPHONE SYSTEM

Filed March 28, 1951 21 Sheets-Sheet 16

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 17

INVENTOR.
Harry N. Newstedt
BY
Smith, Olsen & Baird
Attys.

INVENTOR.
Harry N. Newstedt
BY
Smith, Olsen + Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 19

INVENTOR.
Harry N. Newstedt
BY
Smith, Olsen & Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 20

INVENTOR.
Harry N. Newstedt
BY
Smith, Olsen + Baird
Attys.

Dec. 25, 1956 H. N. NEWSTEDT 2,775,648

AUTOMATIC TOLL TICKETING TELEPHONE SYSTEM

Filed March 28, 1951 21 Sheets-Sheet 21

INVENTOR.
Harry N. Newstedt
BY
Smith, Olsen & Baird
Attys

United States Patent Office 2,775,648

Patented Dec. 25, 1956 routed by way of automatic switching apparatus to the particular called exchange. The first three digits dialed by the calling subscriber also control the register sender to thereafter transmit certain of the first three digits identifying the called exchange and then all of the digits constituting the numerical portion of the called subscriber directory number. From the foregoing it will be understood that the register sender will first transmit the routing digits, then certain pre-determined digits of the called exchange code, and finally the four digits constituting the numerical portion of the called subscriber directory number.

In the above mentioned Ostline application the register sender is automatically associated with the calling subscriber line in response to the initiation of a call and thereafter the digits of the called subscriber directory number are registered therein. As the result of the association of the register sender with the calling a subscriber line and prior to the transmission of a dial tone signal indicating that the dialing of the called subscriber number may be started, the register sender functions to test the calling line to determine the class thereof. Three different classes of calling lines are provided in that system and the particular class of the calling line will be registered in the register sender prior to the transmission of the dial tone signal in order to control subsequent operation thereof. After the first three digits of the called subscriber directory number have been registered in the register sender, a common translator mechanism is automatically associated with the register sender in order to perform the translation operations previously noted above whereby appropriate routing digits are registered in the register sender. As soon as the translating function is completed, the translator mechanism is disconnected from the register sender and rendered available to perform the translation operation for any of the remaining register senders included in the exchange. Thereafter the register sender functions to transmit the routing digits registered therein, then certain of the digits of the called exchange code as determined by the translator mechanism and finally the digits of the numerical portion of the called subscriber directory number. These digits control appropriate switching apparatus in the telephone network in order to complete the connection to the desired called subscriber substation. During the establishment of the above mentioned connection, various items of record information pertaining thereto, such as the directory numbers of both the calling and called subscriber substation, the rate of charge for the call and other pertinent items of information are transmitted to and temporarily registered in a toll ticket repeater included in the connection, so that a record may be produced of the items of information and charged against the calling subscriber in response to the release of the completed telephone connection.

The toll ticket repeater included in the telephone connection as noted above, is provided with timing apparatus for accumulating and registering the total elapsed time of the connection so that a record may also be produced of the elapsed time for the purpose of establishing the charge for the call. In response to the release of the connection as noted above, an idle tabulator is associated with the toll ticket repeater so that the items of record information stored in the repeater may be transferred to and stored in the tabulator before the repeater is released and rendered available for another call. The tabulator in turn controls a ticket tape punch mechanism and a record tape mechanism in order to produce, respectively, an individual subscriber record and a common exchange record of the completed toll call. These records may then be used by the operating 2,775,648

AUTOMATIC TOLL TICKETING TELEPHONE SYSTEM

Harry N. Newstedt, Chicago, Ill., assignor to Automatic Electric Laboratories, Inc., Chicago, Ill., a corporation of Delaware Application March 28, 1951, Serial No. 217,923

21 Claims. (Cl. 179—18)

Figure 1:
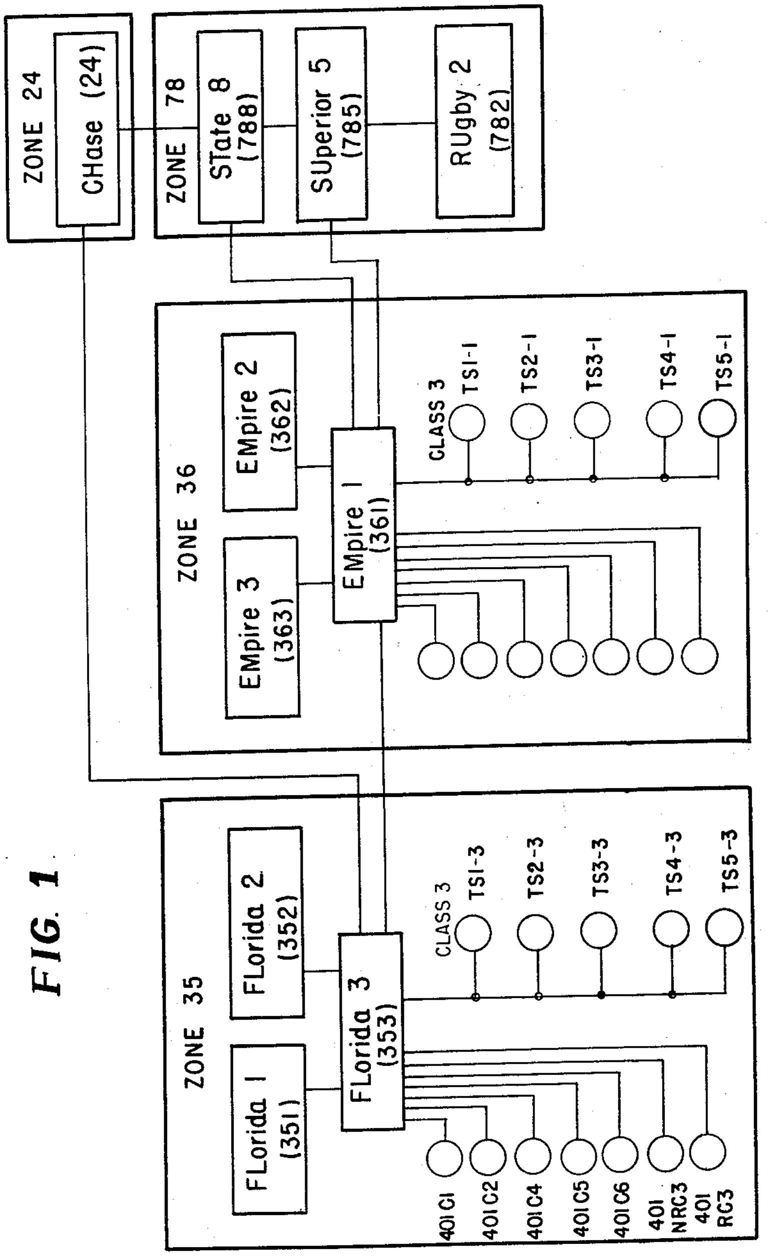

The present invention relates in general to automatic toll ticketing systems of the type which are arranged to produce a record of various items of information pertaining to each completed toll connection. More particularly, the invention relates to improvements in an automatic toll ticketing system of the general type disclosed in the John E. Ostline application, Serial No. 205,460, filed January 11, 1951.

In an automatic toll ticketing system of the type disclosed in the above mentioned Ostline application, the area served by the telephone system is divided into a plurality of zones and each zone includes one or more telephone exchanges. Telephone connections established between the subscribers in the different exchanges in the different zones and between the subscribers in different exchanges in the same zone are handled on a toll basis so that the charges for the connections may be assessed against the calling subscriber substations in accordance with the distances between the originating and terminating exchanges and the time duration of the completed telephone connection. Each telephone connection is established automatically under control of a calling subscriber dial and a record is produced of the particulars concerning the connections, including the office code digits identifying both the calling and the called exchanges, the numerical digits identifying both the calling and the called subscriber substations, and other pertinent particulars, such as the rate of charge applicable to the connection, the duration thereof, the date, and possibly the toll charge for the connection.

These telephone connections are automatically completed from a calling subscriber substation to a desired called subscriber substation under control of register sending apparatus provided in the originating exchange. In extending a connection, the calling subscriber, after removing his receiver, merely operates his calling device in accordance with the directory number of the desired called subscriber substation which number includes a three digit office code portion comprising the first two letters of the called exchange name and a digit identifying the particular called exchange identified by the exchange name, and a numerical portion comprising four digits designating the called subscriber substation in the particular called exchange. Consequently, each subscriber directory number normally constitutes a seven digit number. Certain subscriber numbers in this system however, are identified by an office code portion comprising the first two letters of the called exchange name and a numerical portion comprising four digits designating the called subscriber substation. Consequently, the directory numbers of the subscriber substations in the exchanges identified by a two digit office code constitute a six digit number instead of the normal seven digit number. In either event, the first three digits dialed by a calling subscriber are registered in a register sender and they are translated into one or more routing digits by a common translator so that the particular call will be properly telephone company to control appropriate business machines in order to produce printed records of the various items of information pertaining to each particular toll call.

The main object of the present invention is to provide in an automatic toll ticketing telephone system of the type noted, improved circuits and apparatus for ascertaining and registering in the register sender at least six different classes of calling subscriber lines.

It is a further object of the invention to provide in a toll ticket telephone system improved circuits and apparatus for restricting certain of the subscriber lines in the different classes of lines from extending calls to certain of the exchanges included in the telephone network.

Further objects and features of the invention pertain to the particular arrangement of the circuit elements and the apparatus of the automatic ticketing telephone system whereby the above outlined and additional operating features are obtained.

Figure 3:
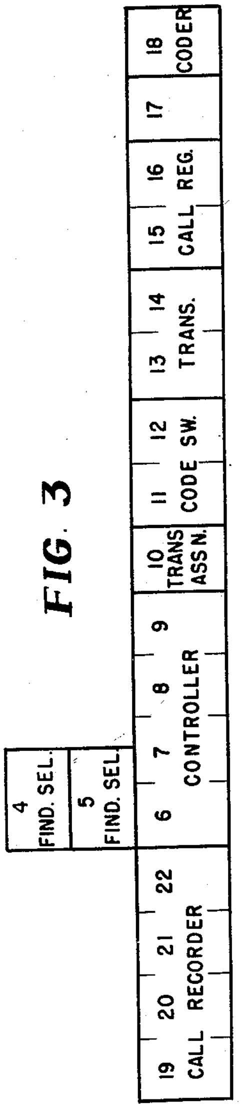
Figure 2:
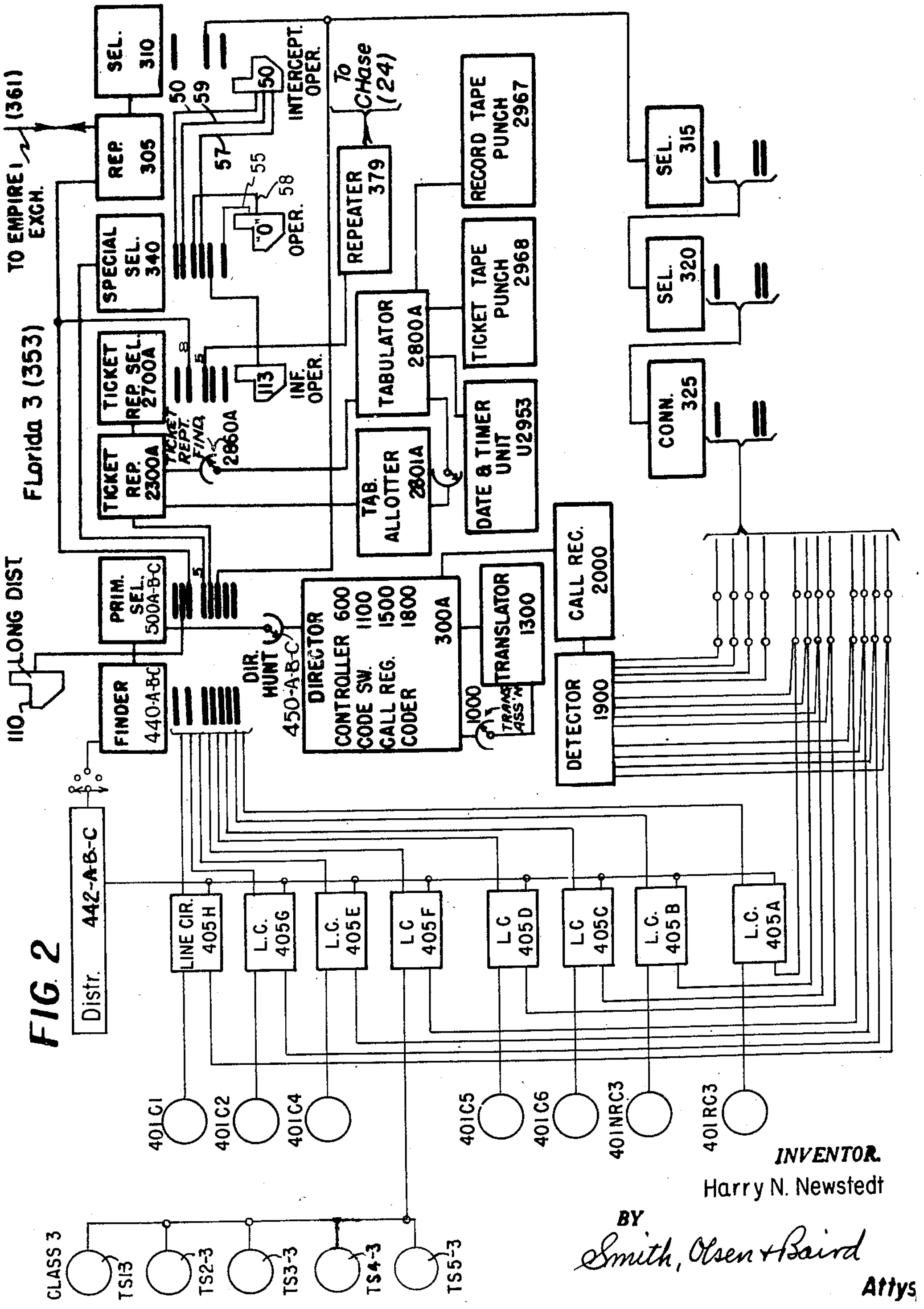

The invention, both as to its organization and method of operation, together with further objects and advantages thereof, will best be understood by reference to the following specification taken in connection with the accompanying drawings in which Figure 1 is a schematic diagram of the area served by the telephone system embodying the present invention; Figure 2 is a trunking diagram illustrating the general arrangement of the switching apparatus incorporated in the FLorida 3 exchange in zone 35 of the telephone system; Figure 3 illustrates the mode of combining Figures 4 to 22, inclusive, to form a unified switching system for the FLorida 3 exchange; and Figs. 4 to 22, inclusive, when assembled together in the manner shown in Fig. 3, illustrate the details of the switching apparatus included in the FLorida 3 exchange which apparatus has incorporated therein the features of the invention as outlined above. In Fig. 2 certain plural circuit elements necessary to the system are shown collectively as 440A–B–C, 442A–B–C, 450A–B–C and 500A–B–C, respectively. More particularly, Fig. 4 schematically illustrates five subscriber substations TS1–3 to TS5–3 on a party line of the class 3 type connected to the line circuit 405F; a class 1 subscriber 401–C1 connected to the line circuit 405H; and a class 2 subscriber substation 401–C2 connected to the line circuit 405G.

Each of the above noted line circuits terminate in different levels in the bank contacts of a group of line finders, including the line finder 440C, served by the distributor 442C; each of the line finders in this group is individually associated with a primary selector, such as the primary selector 500C, to form a finder-selector link. Fig. 4 also schematically illustrates a class 4 subscriber substation 401–C4 connected to the line circuit 405E; a class 5 subscriber substation 401–C5 connected to the line circuit 405D; and a class 6 subscriber substation 401–C6 connected to the line circuit 405C. The line circuits individual to the class 4, 5 and 6 subscriber substations terminate in different levels in the bank contacts of a group of line finders, including the line finder 440B, served by the distributor 442B. Each of the line finders in this group are also individually associated with primary selectors, such as the primary selector 500B, to form finder-selector links.

Figure 5:
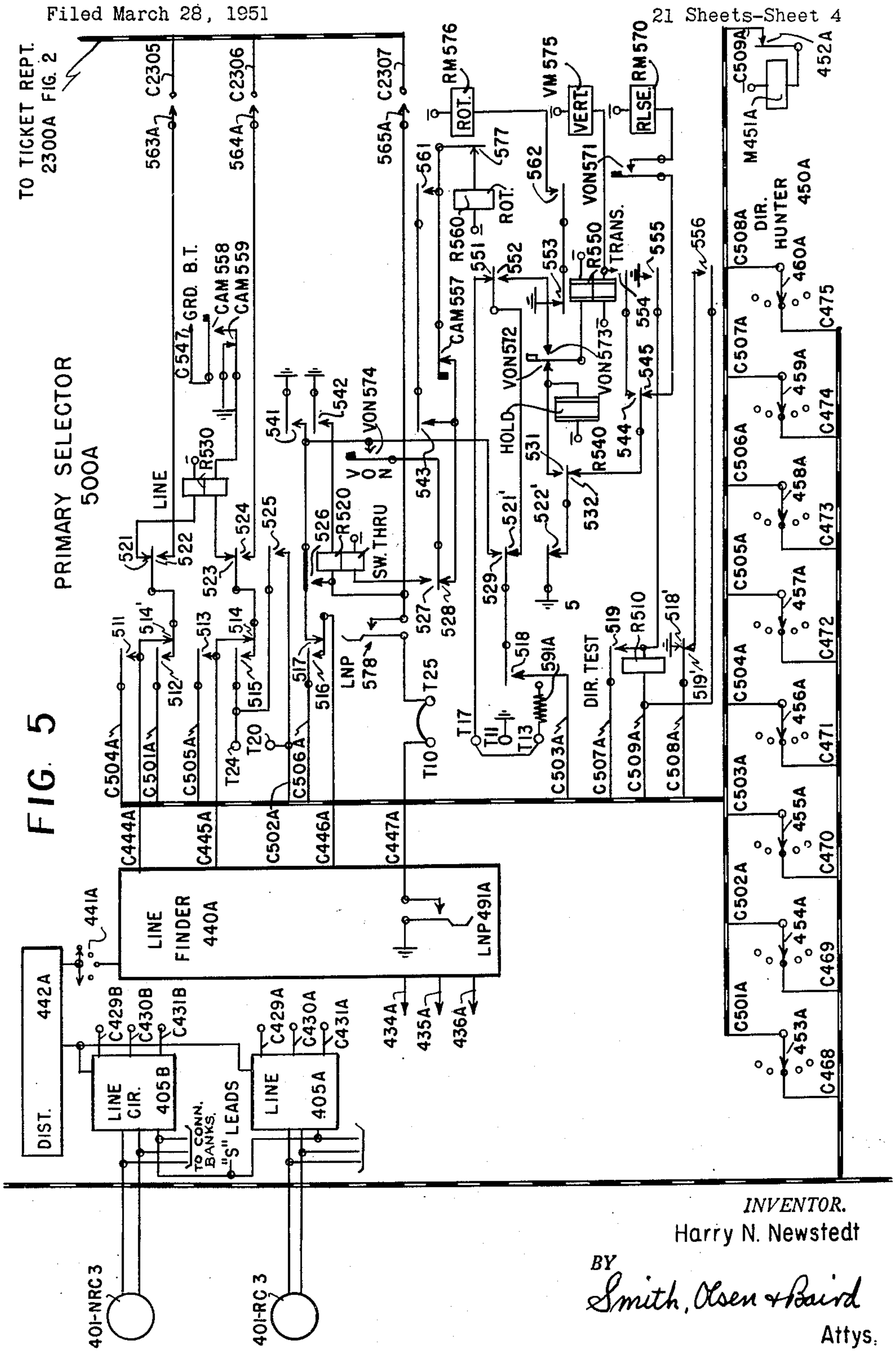

Fig. 5 schematically illustrates a class 3 subscriber substation 401–NRC3 of the non-restricted type and a class 3 substation 401–RC3 of the restricted type connected respectively to the line circuits 405B and 405A. These line circuits terminate in different levels of the bank contacts in the group of line finders, including the line finder 440A, served by the distributor 442A. The line finders in this group are also individually associated with primary selectors, such as the primary selector 500A, to form finder-selector links. Each of the previously noted line finder circuits may be of the general type illustrated in the co-pending Ostline application Serial No. 75,985, filed February 12, 1949, now Patent No. 2,678,353, granted May 11, 1954. Also the previously noted line finders may be of the type illustrated in the Saunders et al., Patent No. 1,849,694, granted March 15, 1932. Each of the line finders in the group served by the distributor 442B has been modified to include both left normal-post-springs LNP 491B and right normal-post-springs RNP 492B and each of the line finders in the group served by the distributor 442C has been modified to include both left normal-post-springs LNP 491C and right normal-post-springs RNP 492C. These normal post springs are arranged to operate when the associated finders raise the wipers thereof to certain predetermined levels in the manner to be described hereinafter. The line finders in the group served by the distributor 442A have also been modified to include left normal-post-springs LNP 491A which are arranged to operate when the associated finders are operated to raise the wipers thereof to certain predetermined levels terminated restricted class 3 subscriber lines. The primary selectors associated with the various line finders in the different groups of finders are substantially identical to the primary selector 500A associated with the finder 440A, except that certain strapping terminals therein are innerconnected in the manner to be described hereinafter, in accordance with the different classes of the subscriber lines served by the associated line finder group.

Figure 4:
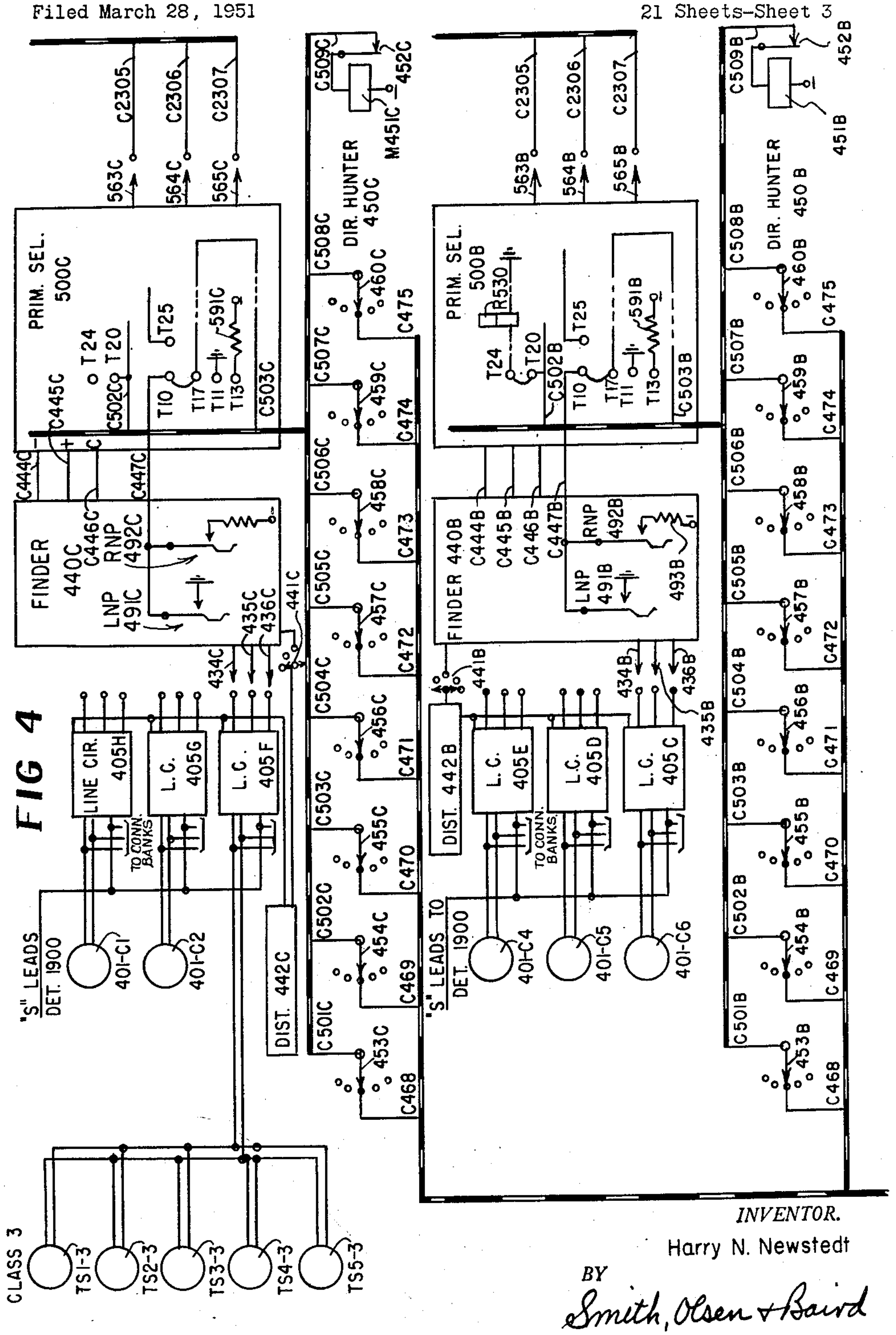

Figs. 4 and 5 also illustrate the director hunters 450A, 450B and 450C which have access, by way of the associated wipers, to a plurality of directors or register senders. It should be understood that in the present description of the operation of the system, the term director is synonymous with the term register sender. It should also be understood that each finder-selector link is provided with a director hunter and that each director hunter has access to all of the directors in the exchange. As illustrated in the drawings, the director hunters 450A, 450B and 450C, each have access over the conductors C468 to C475 inclusive, to the director 300 schematically illustrated in Fig. 2 and disclosed in detail in the drawings.

Figs. 6 to 9 inclusive, 11, 12 and 15 to 18, inclusive, illustrate the details of one of a plurality of directors provided in the telephone exchange. Each director includes a plurality of units of apparatus which have been designated respectively as the controller 600 illustrated in Figs. 6 to 9 inclusive; the code switch 1100 illustrated in Figs. 11 and 12; the call register 1500 illustrated in Figs. 15 and 16, and the coder 1800 illustrated in Figs. 17 and 18. This director is substantially the same as the director illustrated in the corresponding figures of the drawings of the Ostline application Serial No. 205,460, filed January 11, 1951, except that it has been modified to incorporate the features of the present invention. In considering the different units of apparatus constituting the director, it should be understood that the controller 600 portion thereof, is arranged to register the class identity of any one of the six different classes of calling lines, to control the other units of the director, to control the transmission of switch setting impulses for setting up a desired telephone connection, and to control the transmission of coded impulses in order to store various items of record information pertaining to a toll connection in a toll ticket repeater included in the connection. The code switch 1100 portion of the director includes facilities for receiving the impulses of the digits dialed by a calling subscriber and for selectively controlling the operation of the common exchange translator 1300 in order to determine the routing digits to be utilized by the director in routing a connection toward the desired designation. The call register 1500 portion of the director includes facilities for registering the digits of the called subscriber directory number, as dialed by a calling subscriber, and for determining the order of transmission of the registered routing digits and the registered digits of the calling subscriber directory number. Finally, the coder 1800 portion of the director includes facilities for registering the routing digits, the digits indicative of the rate of charge for a connection, and control signals indicative of the various control operations which are to be performed by the director, either as determined by the selective operation of the translator 1300, or as determined by the joint operation of the controller 600 and the call register 1500.

Figure 10:
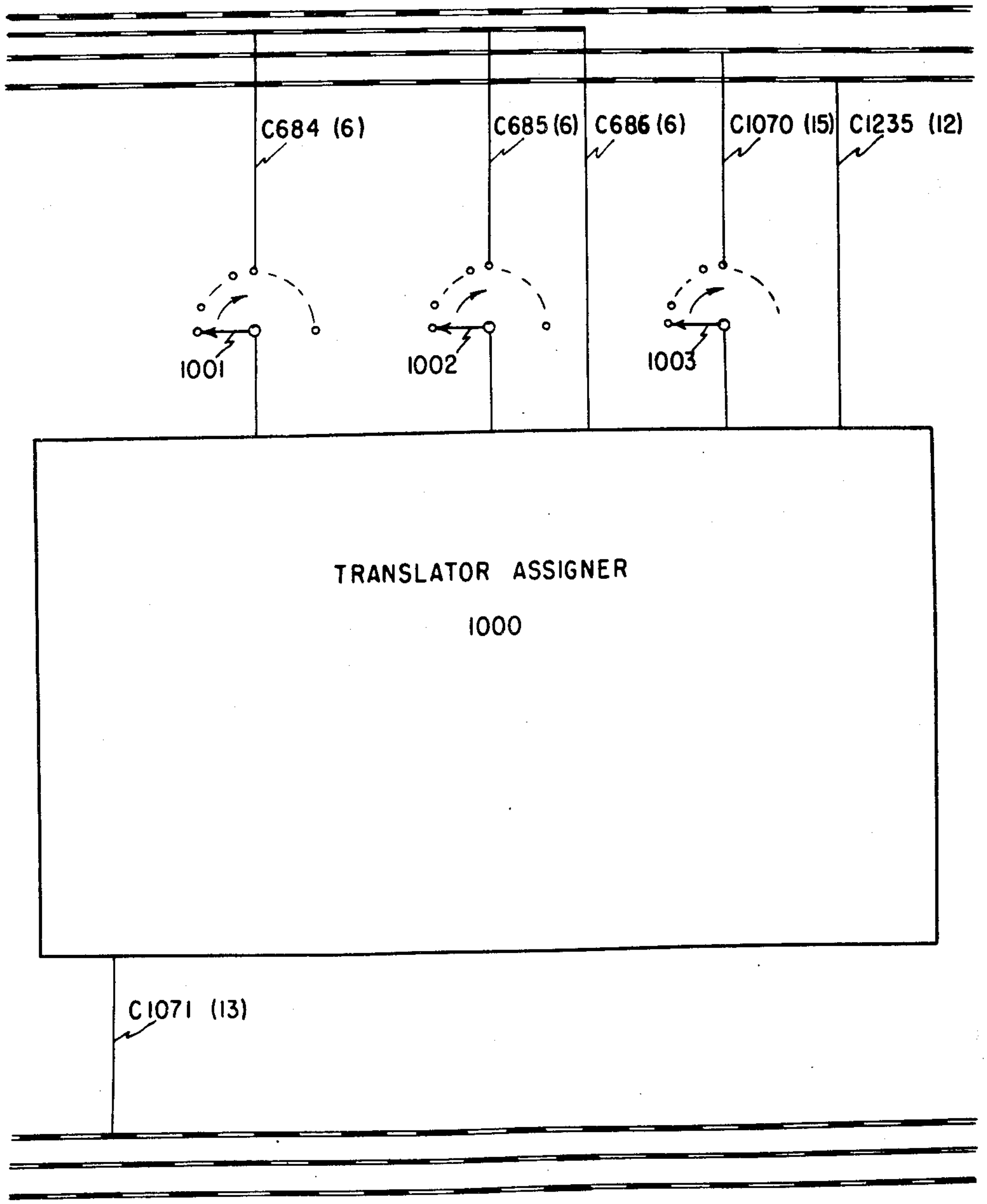

Figure 10 schematically illustrates the translator assignor 1000 which is provided to associate the common exchange translator 1300 with a calling one of the plurality of directors included in the exchange and to limit the time duration that the translator 1300 may be associated with any calling director. The details of the translator assignor 1000 are shown in Figure 10 of the Ostline application, Serial No. 75,985, filed February 12, 1949.

Figure 13:
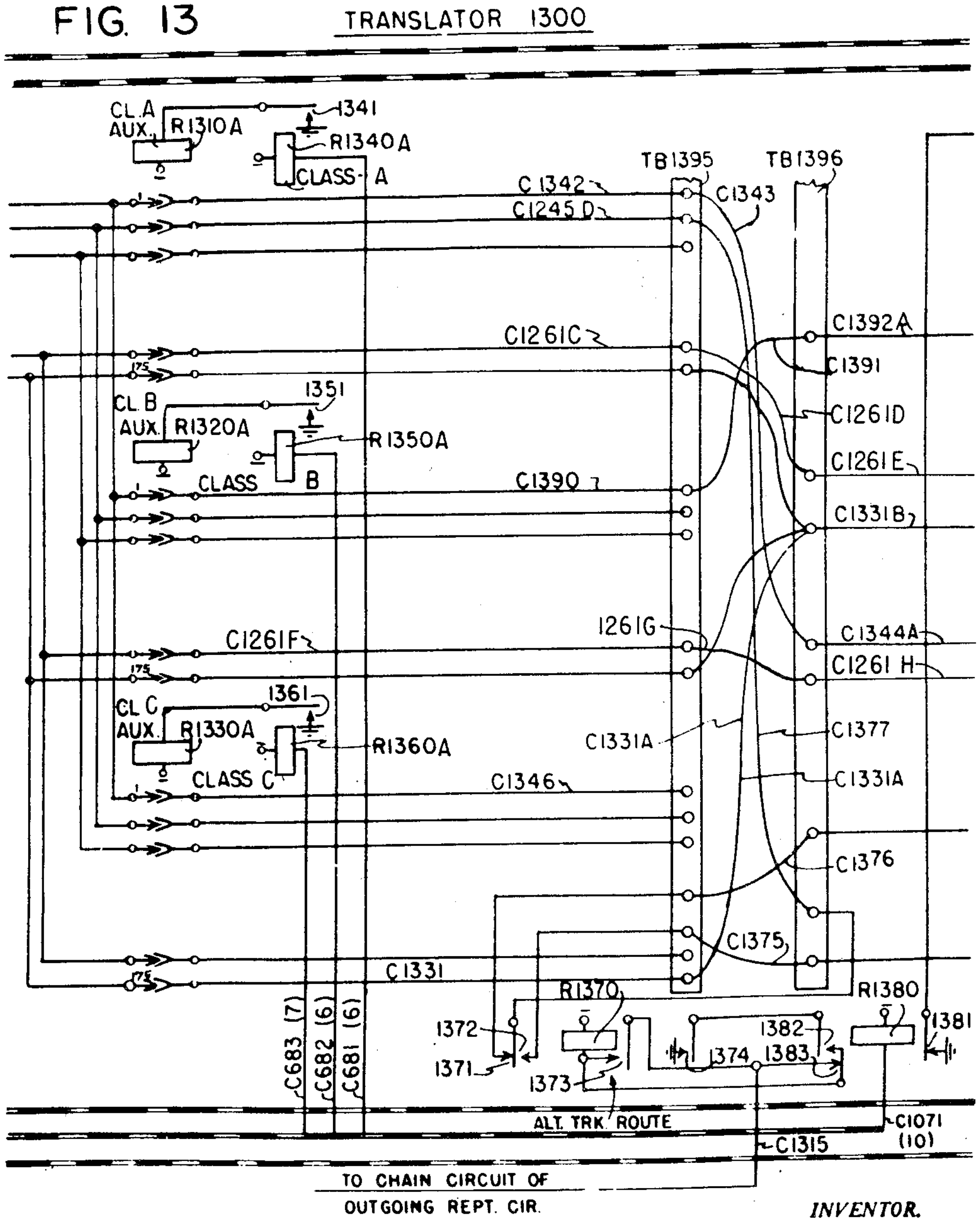
Figure 14:
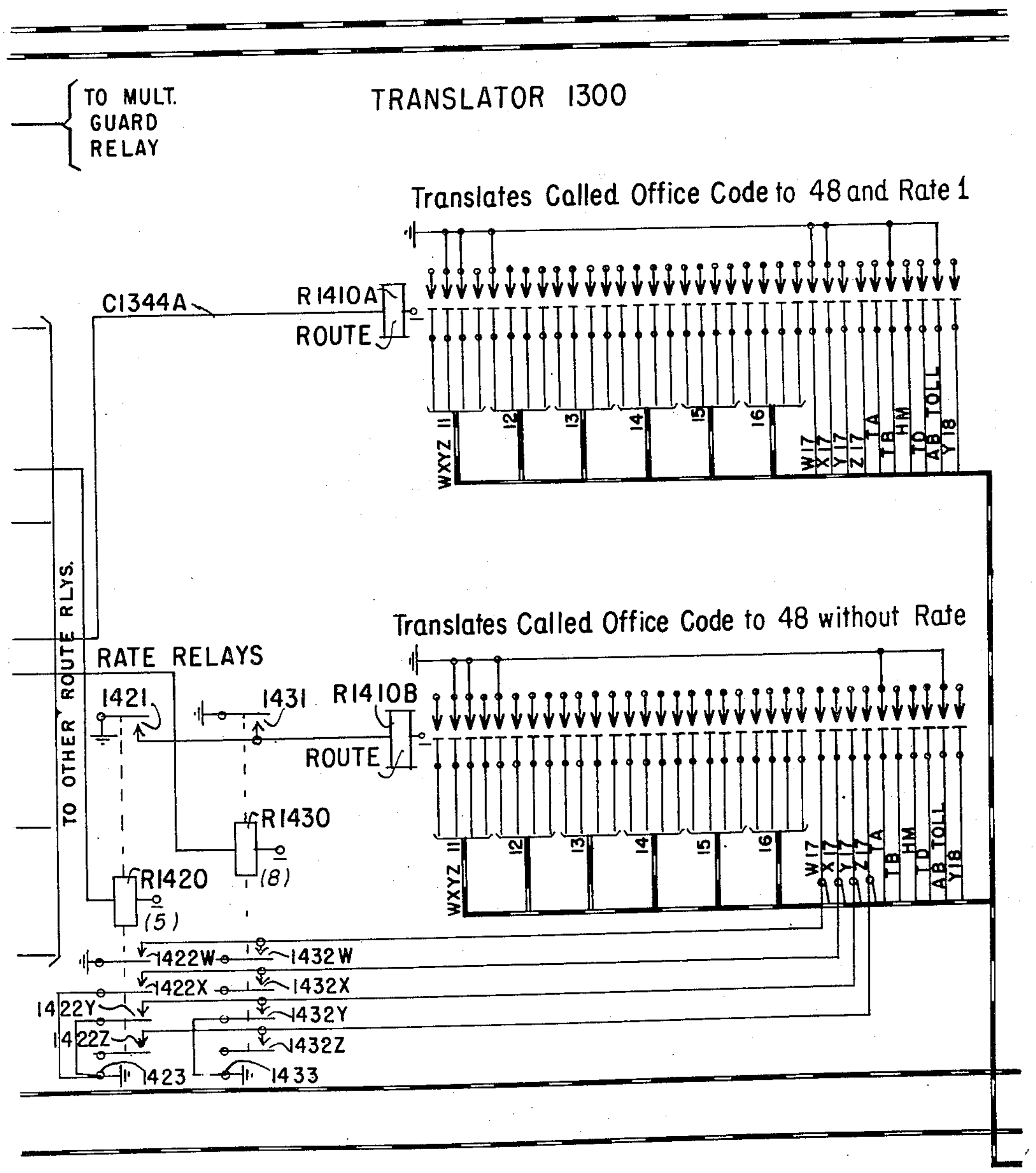

Figs. 13 and 14 disclose the details of the common exchange translator 1300 which is temporarily associated with a calling director in order to register in the coder 1800 portion thereof the rounting digits, the rate digits applicable to a call, and certain predetermined control signals, and which is also arranged to call in the call recorder 2000 when a record is to be made of a connection, all in accordance with the code digits identifying the called exchange and the class of the calling subscriber line. This translator is the same as the translator shown in Figs. 13 and 14 of the Ostline application, Serial No. 75,985, filed February 12, 1949, except that it has been modified to incorporate therein one of the novel features of the present invention whereby at least one of the route relays provided therein may be selectively controlled by any one of a plurality of different rate relays in order to register the digits of a particular route in the coder 1800 and in order to register different rate digits therein in accordance with the selected one of the rate relays.

Figure 19:
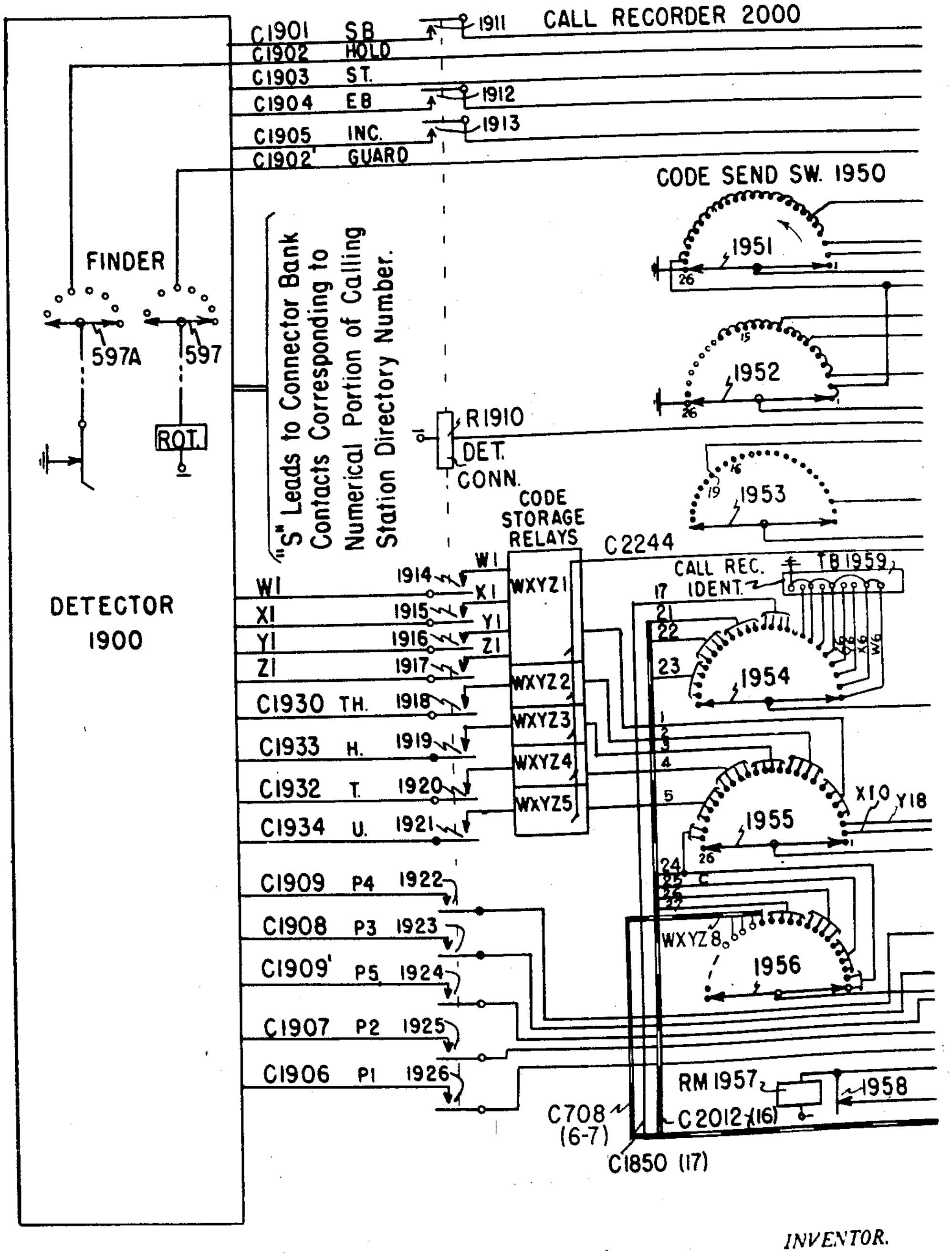

Fig. 19, in the left-hand portion thereof, schematically illustrates the detector 1900 which is arranged to identify the directory number of a calling subscriber substation. This detector is substantially identical to the detector 1900 illustrated in the Ostline application, Serial No. 79,677, filed March 4, 1949, now Patent No. 2,639,330, granted May 19, 1953.

Figs. 19 to 22, inclusive, illustrate the details of the call recorder 2000 which is called into use by the translator 1300 and associated with the director, only in the event that a record is to be produced of the items of information pertaining to a particular toll call. This call recorder is substantially identical to the call recorder 2000 illustrated in Figs. 19 to 22 inclusive, of the Ostline application, Serial No. 205,460, filed January 11, 1951, except that it has been modified in accordance with the present invention to transmit an item of information indicative of any one of the six different classes of calling lines registered in the director to the toll ticket repeater for recording purposes.

Referring now to Figs. 4 and 5, it will be seen that the primary selectors 500A, 500B and 500C are substantially identical to the selector 500 illustrated in Fig. 5 of the previously noted Ostline application, Serial No. 75,985, filed February 12, 1949, except that they have been modified to indicate to the director the different classes of the calling subscriber lines. These selectors have access by way of their associated bank contacts to various trunk lines extending to other switching apparatus in the FLorida 3 exchange. More particularly and as shown in Fig. 2, in one level of the associated bank contacts the primary selectors have access to the local switch train including the selectors 315 and 320 and the connector 325 for completing local calls to subscriber lines terminating in the FLorida 3 exchange. In another level, the primary selectors have access to recording trunks, including the ticket repeater 2300A and the ticket repeater selector 2700A in order to extend toll connections by way of the repeater 379 to the CHase exchange or by way of the repeater 305 to the EMpire 1 exchange. At this point it should be understood that calls may also be completed either through the EMpire 1 exchange or the CHase exchange, to the STate 8, SUperior 5 and RUgby 2 exchanges provided in zone 78. All calls completed over the trunks including the ticket repeaters, such as the ticket repeater 2300A are recorded. In another level of the associated bank contacts the primary selectors have access by way of the special selector 340 to the intercepting operator position 50 to the "0" operator position, and the information operator position 113. Over still another level, the primary selectors have access to the long distance operator position 110. Over still another level, the primary selectors have access to trunk lines extending to the EMpire 1 exchange by way of the repeater 305 without including any of the toll ticket repeaters. In other words, certain calls may be completed from the FLorida 3 exchange to the EMpire 1 exchange over the last mentioned level of the primary selectors without including any of the toll ticketing apparatus.

The recording apparatus may be associated with the ticket repeaters, such as the ticket repeater 2300A, by means of a tabulator allotter 2801A which is arranged to select an idle tabulator 2800A and to cause it to be associated with a particular calling ticket repeater by way of the ticket repeater finder 2860A. When the tabulator 2800A is associated with a ticket repeater, various items of record information pertaining to the telephone connection, including the calling subscriber directory number, the called subscriber directory number, the rate of charge for the call, the class of service of the calling subscriber substation, the time duration of the conversational connection, and certain other items of information which are stored in the ticket repeater by the director are transferred to the tabulator 2800A. Thereafter, the calling ticket repeater is released for other calls. If the ticket tape punch mechanism 2968 and the record tape punch mechanism 2967 are available, the tabulator 2800A will control these mechanisms to perforate tapes in accordance with the items of record information now stored in the tabulator and also in accordance with the date and time of the recording as registered in the date and time unit U2953. In this manner, the record tape punch mechanism 2967 and the ticket tape mechanism 2968 will produce separate perforated tapes, each tape containing a record of various items of information pertaining to the toll call.

All of the recording apparatus described above, including the ticket repeater 2300A, the ticket repeater selector 2700A, the tabulator allotter 2801A, the tabulator 2800A, the ticket repeater finder 2860A, are disclosed and described in detail in the Ostline application, Serial No. 75,985, filed February 12, 1949. The record tape punch mechanism 2967 and the ticket tape punch mechanism 2968 are disclosed and described in the Ostline application, Serial No. 207,092, filed March 3, 1949.

THE GENERAL ARRANGEMENT OF THE TELEPHONE SYSTEM

The automatic toll ticket telephone system disclosed in the drawings is substantially the same as the system disclosed in the Ostline applications, Serial No. 205,460, filed January 11, 1951, and Serial No. 75,985, filed February 12, 1949, except that it has been modified to incorporate therein the previously outlined features of the present invention. The present system serves a large metropolitan area and the adjacent suburban areas which are divided into a plurality of zones designated 24, 35, 36, and 78. The zone 24 includes the single CHase exchange, the zone 35 includes the FLorida 1, FLorida 2 and FLorida 3 exchanges; the zone 36 includes the EMpire 1, EMpire 2 and EMpire 3 exchanges; and the zone 78 includes the STate 8, SUperior 5 and RUgby 2 exchanges. Each of the exchanges may include 10,000 subscriber lines. As schematically illustrated in Fig. 1, the telephone network including the FLorida 3 exchange in zone 35 and the details of the circuits and the trunking layout of this exchange have been shown in greater detail in Fig. 2. It should be understood, however, that each of the exchanges in the various zones of the system may be substantially identical to the FLorida 3 exchange.

The subscriber lines terminating in the FLorida 3 exchange are divided into three separate class groups. One of the class groups (class A) of subscriber lines may, for example, include metropolitan business lines of the class 1 type, metropolitan residence lines of the class 2 type and five-party subscriber lines of the class 3 type. The second class group (class B) of lines may include flat rate business lines of the class 5 type and flat rate residence lines of the class 6 type. The third class group (class C) of lines include the paystation lines of the class 4 type. All of the subscriber substations connected to the above noted subscriber lines are identified by 7 digit directory numbers. All of the subscriber lines of the remaining exchanges of the network may be identified by 7 digit directory numbers, except the CHase exchange. In the last mentioned exchange, the subscriber lines are identified by 6 digit directory numbers as is disclosed and described in the Ostline application, Serial No. 205,460, filed January 11, 1951.

In the present system, the various exchanges in each zone are interconnected by suitable groups of trunk lines and at least one exchange in each zone is interconnected with at least one of the exchanges in the other zones by suitable groups of toll lines. Although the EMpire 1 exchange is shown as the tandem switching point for toll calls between the exchanges in zone 35 and the exchanges in zone 78, it should be understood that additional zones including other exchanges may also be reached by way of the EMpire 1 exchange.

At this point it may be well to note that each substation is provided with a dial or calling device arranged in a conventional manner with ten finger holes corresponding respectively to the digits 1 to 9 and 0. Each finger hole also corresponds to certain letters of the alphabet which may be dialed in accordance with the first two letters of any exchange name. It should also be understood that the office code of a called exchange may also include three letters instead of the two letters and a digit as previously noted. The ten digits of the dial and the corresponding letters for each of the digits are as follows:

| Digits: | Letters |
|---|---|
| 1 | |
| 2 | ABC |
| 3 | DEF |
| 4 | GHI |
| 5 | JKL |
| 6 | MNO |
| 7 | PRS |
| 8 | TUV |
| 9 | WXY |
| 0 | Z (Operator) |

*The apparatus incorporated in the Florida 3 exchange*

Referring now to the switching apparatus provided in the FLorida 3 exchange, as illustrated in Figs. 4 and 5, it will be noted that three different groups of subscriber line circuits have been shown and that each group of line circuits is served by a different group of line finders. More specifically, the line circuits 405A and 405B terminate respectively the line of the restricted class 3 subscriber substation 401–RC3 and the line of the nonrestricted class 3 subscriber substation 401–NRC3. Other subscriber lines of restricted and nonrestricted stations also terminate in similar line circuits and all of these line circuits are accessible to the group of finder-selector links including the finder 440A and the primary selector 500A. However, the line circuits of the restricted class 3 subscribers are terminated in certain levels of the finders and whenever the wipers of the finder are operated to a level terminating restricted lines, the normal-post-springs therein are actuated to indicate that the finder is connected to a level terminating restricted lines.

In addition to the foregoing, the line circuits 405C, 405D and 405E terminate respectively the line of the class 6 subscriber substation 401–C6, the line of the class 5 subscriber substation 401–C5, and the line of the class 4 subscriber substation 401–C4. These line circuits are accessible to another group of finder-selector links including the finder 440B and the primary selector 500B illustrated in Fig. 4. However, the line circuits connected to subscriber lines of the same classes must all be terminated in the same levels of the bank contacts of the finders so that the normal-post-springs therein are selectively actuated whenever the wipers of the finders are raised to the levels terminating the line circuits of a class 5 and a class 6 line.

The line circuits 405F, 405G and 405H terminate respectively the five-party line of the class 3 subscriber substations TS1–3 to TS5–3 inclusive, the line of the class 2 subscriber substation 401–C2, and the line of the class 1 subscriber substation 401–C1. These line circuits are accessible to still another group of finder-selector links including the finder 440C and the primary selector 500C as is illustrated in Fig. 4. The line circuits connected to subscriber lines of the same classes are also terminated in the same levels of the banks contacts of the finders so that the normal-post-springs therein are selectively actuated whenever the wipers of the finders are raised to the levels terminating the line circuits of the class 2 and class 3 lines.

As is illustrated in Figs. 2, 4 and 5, the finder-selector link, including the finder 440A and the primary selector 500A, has access to all of the directors in the exchange, such as the director 300A, by means of a director hunter such as the director hunter 450A. It should be understood that each finder-selector link in the group serving the line circuits 405A and 405B is provided with a director hunter and that each link in the group is selected for use by means of the associated distributor 442A. Each of the finder-selector links in the remaining two groups also have access to the directors by means of director hunters, such as the director hunters 450B and 450C and the links in each of the two groups are selected for use by means of the associated distributors 442B and 442C.

In considering the service rendered the different subscriber lines it will be assumed that the class 1 metropolitan business lines are rendered free automatic local service, free automatic toll service to certain nearby exchanges and automatic toll ticketing service to other exchanges in the network on a bulk billing basis; the class 2 metropolitan residence lines are rendered the same service as the class 1 lines, except that their service is billed on a monetary basis; the class 3 party lines are rendered free automatic local service and automatic toll ticketing service to all other exchanges in the network on a monetary billing basis; the class 4 paystation lines are rendered automatic local service, providing the necessary coins have been deposited in the paystation instrument, and they are rendered toll service to the other exchanges in the network with the aid of the "0" operator; the class 5 flat rate business lines and the class 6 flat rate residence lines are rendered free automatic local service and automatic toll ticketing service to all other exchanges of the network on a monetary billing basis. The different classes of service noted above are merely illustrative and it will be apparent from the description of the system that different types of service may be provided in accordance with the service requirements and the rate schedule established in the area served in the telephone network.

As previously noted, the restricted and nonrestricted lines are of the class 3 type and they are served by a separate group of finder-selector links. For the purpose of the present description, it will be assumed that the nonrestricted class 3 lines are rendered the same service as are the class 3 party lines and it will also be assumed that the restricted class 3 lines cannot make calls to exchanges in other zones of the network. It will be apparent from the following description that each of the six different classes of lines may be connected to line circuits terminating in six different line finder groups in substantially the same manner as the class 3 restricted and nonrestricted lines are connected to the group of finders including the finder 440A. With the last mentioned arrangement, each of the six classes of lines may include both restricted and nonrestricted lines by arranging the associated finders so that the left-normal-post-springs therein will be actuated each time the wipers are raised to a level in the associated contact banks terminating the restricted lines in the class. The strapping terminals of the associated primary selectors will then be connected so that only one class of lines will be served by each of the six groups of finder-selector links and each class may, if desired, include both nonrestricted and restricted lines. The manner in which the strapping terminals of the primary selectors are connected for the different classes of lines will be described hereinafter.

The remaining switching apparatus provided in the FLorida 3 exchange has been described previously in connection with the description of the various drawings constituting the present disclosure.

In the present telephone system code storage registering apparatus and code marking conductors are utilized in the various units of apparatus for the purpose of registering various digits in code form and for the purpose of transferring such registered digits from one unit of apparatus to another. The code employed is generally referred to as a WXYZ code and is of the type wherein any digit from 1 to 9, inclusive, and 0 may be registered and transmitted by operating any one or any two of four WXYZ register relays, or by marking any one or any two of four WXYZ code marking conductors in accordance with the following code:

| Digit: | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

Before describing the operation of the switching apparatus in the FLorida 3 exchange it should be noted that each subscriber substation telephone instrument includes the usual hand-set, having a transmitter and a receiver, a ringer and a calling device or dial. The calling device provided at each of the subscriber substations except the second, third, fourth and fifth subscriber substations on a party line is of conventional construction and arrangement; while the calling device provided at each of the second, third, fourth and fifth party subscriber substations on the five-party line is of the construction and arrangement of that disclosed in the John E. Ostline Patent No. 2,410,520, granted November 5, 1946. Each of the last-mentioned calling devices are provided with special cams which are effective during each operation of the dial to transmit station identifying ground signals in addition to the regular switch controlling loop impulses. The manner in which the station identifying ground impulses are registered in the director is disclosed and described in the Ostline application, Serial No. 205,460, filed January 11, 1951. These individual station identifying signals, when registered in the director, indicate the position of the calling subscriber substation on the five-party line.

*Initiation of a call by a nonrestricted subscriber*

Referring now to Fig. 5, it will be assumed that the class 3 nonrestricted subscriber at substation 401–NRC3 removes his receiver to initiate a call. In response to the removal of the receiver, the usual loop circuit is completed for initiating the operation of the line circuit 405B. Upon operating, the line circuit 405B causes the distributor 442A to search for an idle line finder, such as the line finder 440A, by means of the rotary switch 441A and it marks the terminals of the calling subscriber line in the bank contacts accessible to the group of line finders including the line finder 440A. When the distributor 442A selects the line finder 440A for use, the finder automatically operates its wipers 434A to 436A, inclusive, step-by-step in a vertical direction until the wipers are raised to the level of the associated bank contacts terminating the calling subscriber line. Thereafter the line finder automatically rotates the wipers step-by-step over the contacts of the selected level until the wipers thereof engage the bank contacts terminating the conductors C429B to C431B inclusive, of the calling subscriber line. As soon as the calling line is found by the line finder 440A, it switches through in a conventional manner to connect the subscriber line to the primary selector 500A. At this point it may be well to mention the fact that the left-normal-post-springs LNP491A are not actuated because the wipers of the finder have been raised to a level in the associated contact banks terminating nonrestricted lines.

As soon as the finder 440A switches through, a loop circuit is completed for operating the line relay R530 which may be traced from ground at the 11th rotary step contacts CAM559, and then by way of the lower winding of the line relay R530, contacts 523 and 514, conductor C445A, finder 440A, wiper 435A, conductor C430B, line circuit 405B, the calling subscriber line conductors and returning by way of the conductor C429B, the wiper 434A, finder 440A, conductor C444A, contacts 514′ and 521, and the upper winding of the line relay R530, to battery. The line relay R530 operates over the above traced loop circuit and, at its contacts 531, it completes a circuit for operating the hold relay R540 and, in multiple therewith, the transfer relay R550. As soon as the hold relay R540 operates, at its contacts 541, it applies ground potential by way of the contacts 517 to the conductor C446A in order to hold the line finder 440A and the line circuit 405B in their operated positions and to mark the calling subscriber line busy in the banks of the connectors having access thereto. As soon as the transfer relay R550 operates, it completes, at its contacts 556, a point in the circuit for controlling the magnet M451A of the director hunter 450A and, at its contacts 555, it prepares a point in the test circuit for the director test relay R510.

The director hunter 450A is arranged to search for an idle director over the bank contacts associated with the wipers 453A to 460A, inclusive. Busy directors are indicated by a direct ground potential applied to the conductors, such as the conductor C457, accessible to the wiper 460A and idle directors will be indicated by an absence of ground potential on these conductors. If the wiper 460A is in engagement with a busy director, the ground potential on C475 will be extended by way of the conductor C508A, contacts 519′ and 556, conductor C509A, contacts 452A and the winding magnet M451A, to battery. This circuit causes the magnet M451A to operate and interrupt, its operating circuit, at its contact 452A, whereupon the magnet restores to normal and advances its wipers one step into engagement with the next set of contacts. It should be noted that the ground potential applied to the conductor C509A short-circuits the winding of the relay R510 in order to prevent its operation when the wipers of the director hunter 450A engage contacts terminating a busy director. If the conductor C475 is not grounded, the short-circuit is removed from the relay R510 and a circuit will be completed from ground at contacts 555, by way of the winding of relay R510, conductor C509A, contacts 452A and the winding of the magnet M451A, to battery. Thus when an idle director is found, the director test relay R510 is operated over the above traced circuit in series with magnet M451A, but due to the resistance of the relay R510 the magnet does not operate at this time.

Upon operating, the relay R510 interrupts, at its contacts 519', a point in the previously traced circuit for controlling the magnet M451A and simultaneously therewith, at its contact 518', it connects ground potential by way of the conductor C508A to the wiper 460A in order to mark the director seized by the director hunter 450A busy to other director hunters having access thereto.

As a further result of the operation of relay R510, at its contacts 511 and 513, it now transfers the conductors C444A and C445A from the circuit including the windings of the relay R530 to a circuit including the conductors C504A and C505A, wipers 456A and 457A, and the conductors C471 and C472 extending to the code switch 1100 portion of the director. Simultaneously therewith, the relay R510, at its contacts 512, connects the upper winding of the relay R530 by way of the conductor C501A, wiper 453A to the conductor C468 extending to the control 600 portion of the director. At this time the relay R510 also prepares points in various other circuits to be described hereinafter, but it should be noted that when the relay R510 disconnects the conductors C444A and C445A from the circuit of the line relay R530, the relay restores to normal and, at its contacts 531, interrupts the previously described circuits for operating the hold relay R540 and the transfer relay R550. These relays being of the slow-to-release type restore to normal after a slight delay.

*Seizing an idle director*

For the purpose of this description it will be assumed that the wipers of the director hunter 450A are in engagement with the conductors C468 to C475, inclusive, of the idle director illustrated in the drawings at the time the director test relay R510 operates. Consequently, the calling subscriber loop circuit, including the line circuit 405B, line finder 440A, conductors C444A and C445A, contacts 511 and 513, conductors C504A and C505A and wipers 456A and 457A, is extended by way of the conductors C471 and C472 to the code switch 1100 portion of the illustrated director.

Figure 11:
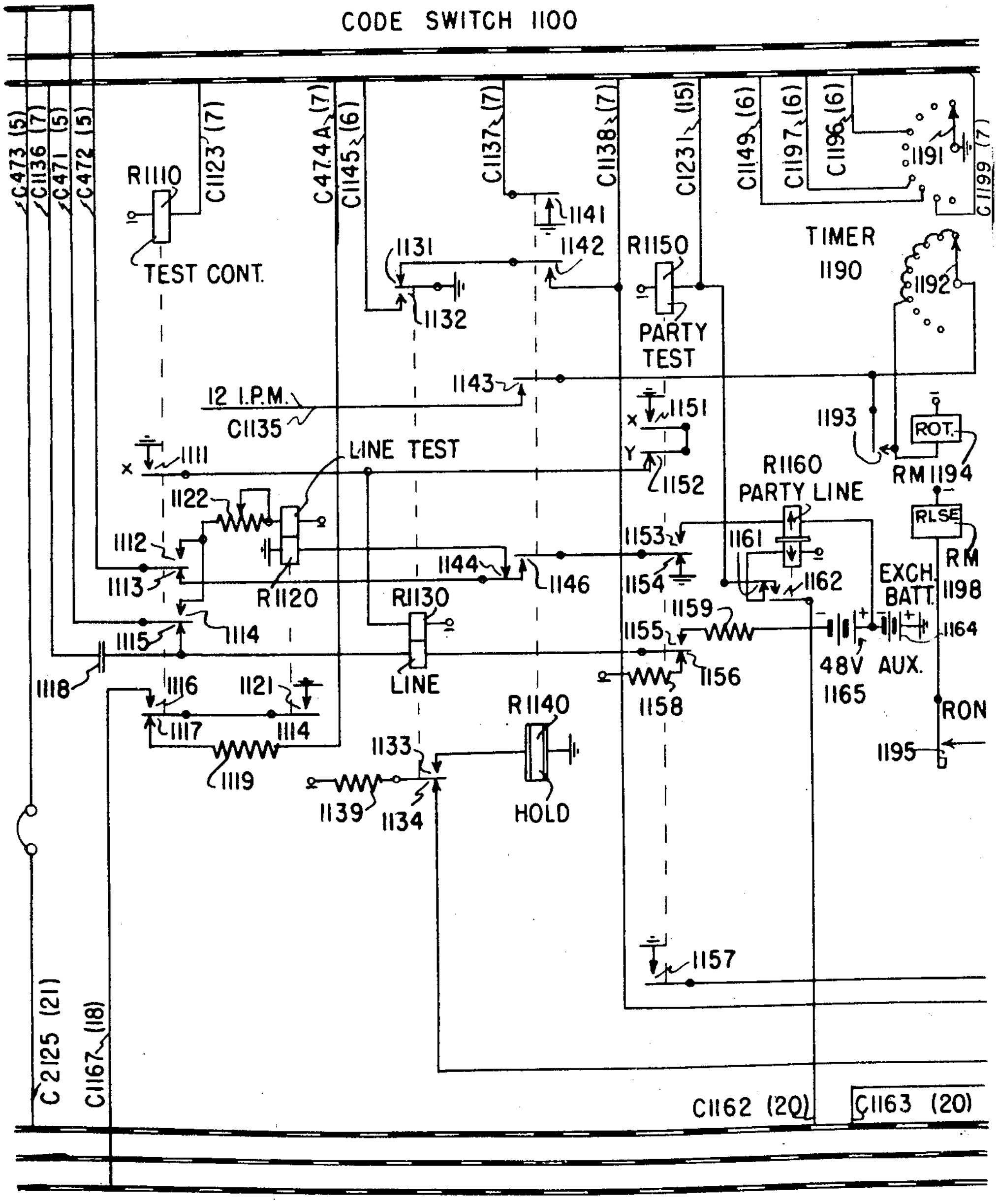
Figure 12:
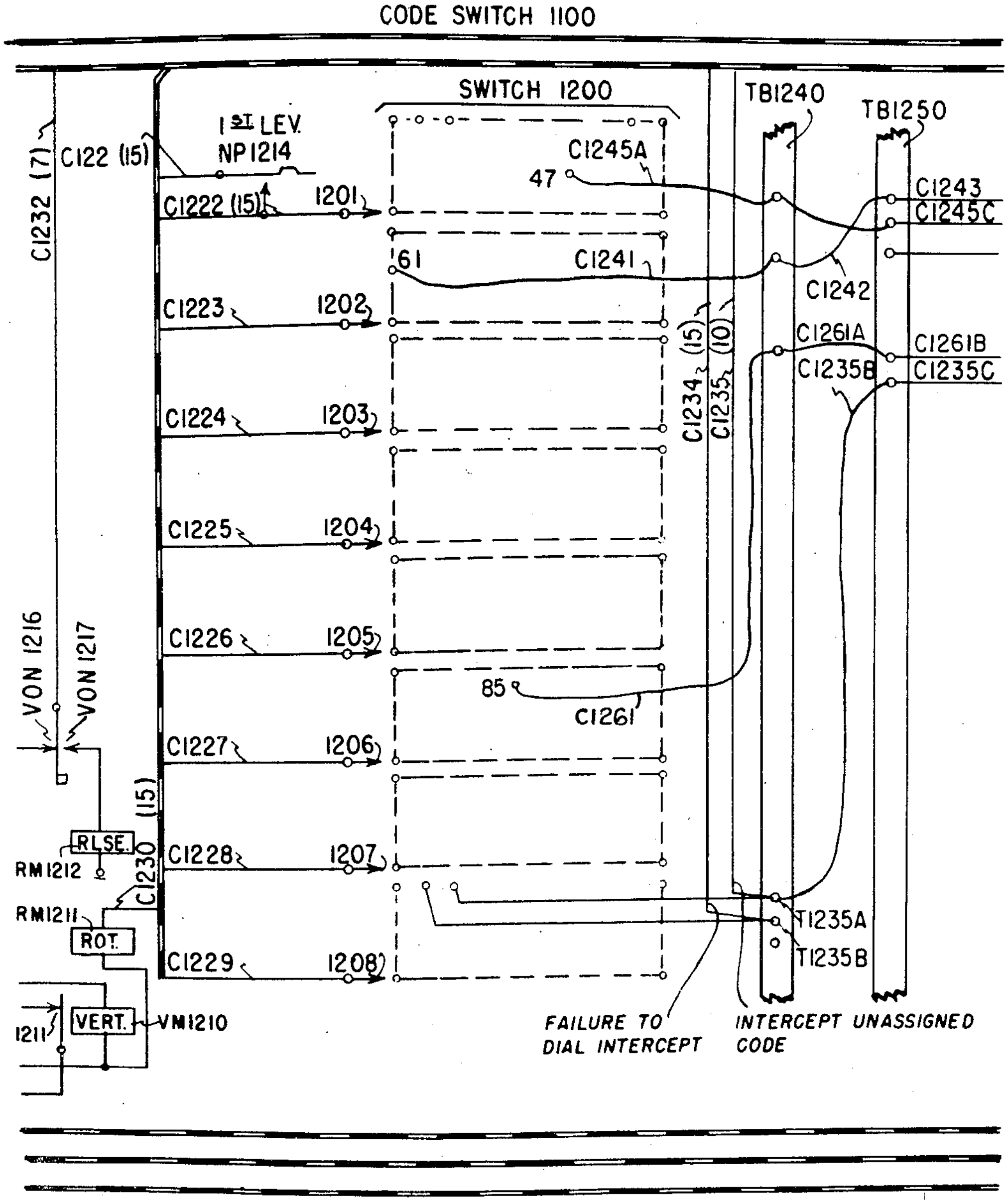

Referring now to the code switch 1100, shown in Figs. 11 and 12, it will be seen that the portion of the above described loop circuit, including the conductor C471 is further extended by way of the contacts 1115, the lower winding of the relay R1130, the contacts 1156 and the resistor 1158, to battery. The portion of the loop circuit, including the conductor C472, is further extended by way of contacts 1113 and 1144 and the lower winding of the test relay R1120, to ground. In view of the above traced loop circuit, which becomes effective as soon as the director test relay R510 operates, the line relay R1130 and the test relay R1120 in the coder 1100 operate. As soon as the relay R1130 operates, it completes an obvious circuit for operating the hold relay R1140 and, at its contacts 1132, it applies ground potential to the conductor C1145 extending to Fig. 6. The latter circuit is ineffective at the present time and is utilized to control the primary selector 500A only in the event that the first and second digits dialed by the calling subscriber correspond to the first two digits of the local called office code designation. The detailed description of the operation of the system to complete local calls will be described hereinafter.

Figure 7:
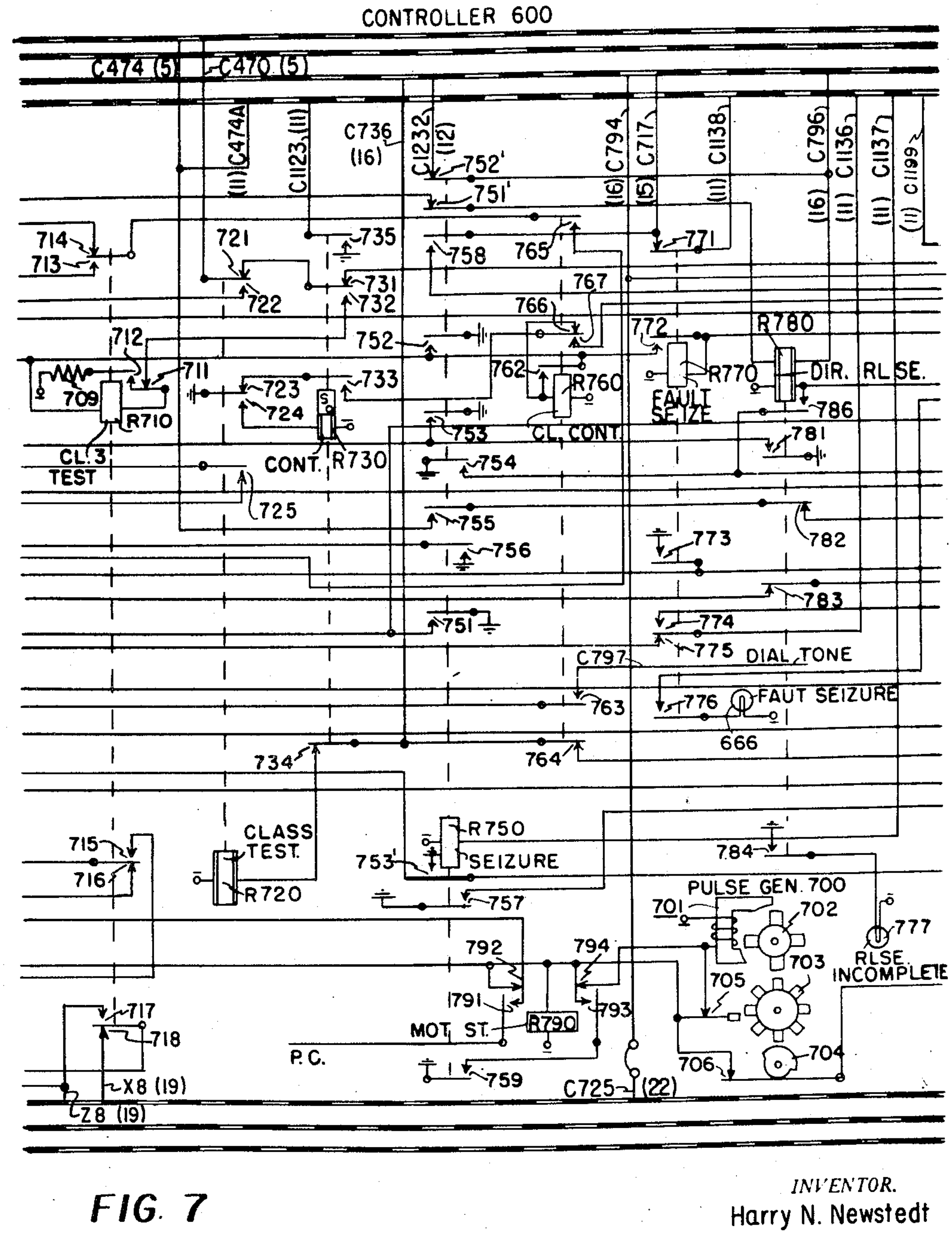

As soon as the hold relay R1140 operates, it completes at its contacts 1141, a circuit including the conductor C1137 extending to Fig. 7, for operating the seizure relay R750 in the controller 600 portion of the director. At its contacts 1143, the relay R1140 connects the conductor C1135 to the wiper 1192 of the timer 1190. The conductor C1135 is connected to a time pulse interrupter (not shown) which transmits twelve ground impulses per minute to the rotary RM1194 of the timer. Consequently, the magnet RM1194 will advance its wipers 1191 and 1192 twelve times per minute. The circuit operations which are controlled incident to the stepping of the wiper 1191 are for the purpose of performing certain operations under control of the timer if there is a delay in certain of the successive operations of the control 600. Also, the hold relay R1140, at its contacts 1144, disconnects the lower winding of the relay R1120 from the conductor C472 and, at its contacts 1146, it connects direct ground potential to the conductor C472 in order to retain the loop circuit for the line relay R1130 and to improve the loop circuit for impulsing. At this time the relay R1120 restores to normal and, at its contacts 1121, removes ground potential from the conductor C474A.

Referring now to the controller 600 portion of the director in Fig. 7 it will be seen that the seizure relay R750 operates as described above under control of the hold relay R1140 in the code switch 1100. As soon as the relay R750 operates, it applies ground potential by way of contacts 751 and 897 to the conductor C788 extending to the call register 1500 (Fig. 16), in order to ground the bank contacts accessible to the wiper 1664 of the sender switch 1660. This ground potential is also extended via the conductor C787 to the coder 1800 (Fig. 18) in order to provide a locking ground potential for various relays included therein. At its contacts 757, the relay R750 applies ground potential by way of contacts 895 to the conductor C794 extending to Fig. 16 in order to apply a marking ground potential to the wiper 1515 of the receive sequence switch 1510 included in the call register 1500. The ground potential at the contacts 757 is also connected via the conductor C725 extending to Fig. 22 of the call recorder 2000, and then via the winding of the relay R2105 and the resistor 2107, to battery. The relay R2105 operates at this time and interrupts, at its contacts 2106, a point in the circuit for the relay R2120, in order to prevent the last-mentioned relay from operating until after the identity of a calling subscriber line has been ascertained and the relay R2105 is restored to normal.

At its contacts 755, the relay R750 also prepares a circuit for holding the director test relay R510 operated. This circuit may be traced from ground by way of the winding of the hold relay R820, contacts 782 and 755, conductor C474 extending to Fig. 5, wiper 459A of the director hunter 450A, and then via conductor C507A, contacts 519, the winding of relay R510, conductor C509A, contacts 452A, and the winding of magnet M451A, to battery. Attention is directed to the fact that the conductor C474A is grounded by the line test relay R1120 and will prevent operation of the hold relay R820 over the above-traced series circuit until the relay R1120 restores, as noted above. As soon as the hold relay R820 operates, it locks the test relay R510 in its operated position in series with the magnet M451A. At its contacts 753, the relay R750 completes a circuit for operating the director busy relay R610. The relay R610, upon operating, marks the director busy in the banks of the director hunters by applying ground potential to the conductor C475. The details of the busy marking facilities included in the director are described in detail in the Ostline application, Serial No. 75,985, filed February 12, 1949. At its contacts 751' and 752', the relay R750 interrupts points in the releasing circuit for the director, and, at its contacts 753', it completes a circuit for energizing the right-hand winding of the delay send relay R910 in order to bias this relay for subsequent operation.

As soon as the hold relay R820 operates, it completes, at its contacts 821, a circuit including the contacts 764 and 734 for operating the class test relay R720. The relay R720, in turn, connects the conductor C470, at the contacts 722, to the class 2 and 5 test relay R670; at its contacts 725, it connects the conductor C469 to the class 4, 5 and 6 test relay R600; and at its contacts 724, it completes an obvious circuit for operating the slow-to-operate control relay R730.

*Class of calling line registration*

It will be recalled that the calling subscriber line may be provided with any one of six different classes of service. The class of service of the particular calling subscriber line is indicated to the director by a marking placed upon the conductors C470 and C469.

As previously noted, the calling subscriber at substation 401–NRC3 is of the class 3 type. Therefore, the primary selector 500A serving this group of class 3 subscriber lines is arranged so that it applies resistance battery via the resistor 591A, terminal T13 connected to terminal T17, contacts 551, 521' and 518, conductor C503A and the wiper 455A, to the conductor C470 extending to the director in order to mark the conductor C470 with a resistance battery potential indicative of a class 3 line.

Referring to the primary selector 500A (Fig. 5) the terminals T11, T13, T17, T20, and T24 may be interconnected to indicate any one of six different classes of service in accordance with the following table:

| Classes | Strap Terminals | Potential on Conductor C470 | Potential on Conductor C469 | Relays Operated |
|---|---|---|---|---|
| 1 | None | None | None | None. |
| 2 | T11 and T17 | Ground | do | R670. |
| 3 | T13 and T17 | Resis. bat. | do | R710. |
| 4 | T20 and T24 | None | Ground | R600. |
| 5 | T11 and T17, T20 and T24. | Ground | do | R670 and R600. |
| 6 | T13 and T17, T20 and T24. | Resis. bat. | do | R710 and R600. |

With the foregoing six classes of service in mind it will be seen that when the contacts 722 and 725 in the controller 600 portion of the director are closed, the conductor C470 is connected to the winding of the class test relay R670 and the conductor C469 is connected to the winding of the class test relay R600. If no ground potential appears on either conductor, the relays remain in their restored positions. If ground potential is connected to the conductor C470, the relay R670 operates and locks. If ground potential is connected to the conductor C469, the relay R600 operates and locks.

Due to the slow-to-operate characteristics of the control relay R730 the class test for classes 1, 2, 4 or 5 will be completed before the relay R730 fully operates, but as soon as the relay R730 operates it interrupts, at its contacts 734, the previously traced circuit for the class test relay R720. Relay R720 slowly restores to normal and, at its contacts 721, it connects the conductor C470 via the contacts 732 and 711 to the winding of the class 3 and 6 test relay R710. At the contacts 725, the relay R720 disconnects the conductor C469 from the relay R600.

If resistance battery potential is connected to the conductor C470, the relay R710 operates and locks. It will be understood that if ground or no potential appears on the conductor C470 at this time, the relay R710 will not operate.

As a further result of the restoration of the class test relay R720, and before the relay R730 restores to normal, a circuit is completed by way of the contacts 723, 733 and 766, for operating the control relay R760. The relay R760 upon operating, at its contacts 762, locks itself in its operated position to ground at contacts 752. The operation of this relay indicates that the class test cycle has been completed and that the class of the particular calling line is now registered in accordance with the above chart by the selective control of relays R600, R670 and R710.

The foregoing description points out the manner in which the relays R600, R670 and R710 may be selectively controlled during a class test cycle in accordance with the class of the calling line. In order to understand the operations resulting from the registration of the different classes of calling lines, each relay will be individually described hereafter. If at the end of a class test, the relays R600, R670 and R710 are in their restored position to indicate the registration of a class 1 calling line, relay R760 upon operating at the end of the class test cycle, completes a circuit including ground at contacts 601, contacts 765, 714 and 673 for steadily illuminating the class 1 lamp 676. If it is ultimately determined by the digits dialed by the calling subscriber that the call requires a translator, the relay R650 will be in its operated position, in the manner to be described hereinafter. Relay R650, at its contacts 652, will then connect ground potential by way of the contacts 606 to the translator class group A conductor C681 extending to Fig. 13. This will control the group class A relay R1340A in the translator to indicate that the class 1 calling line is in the translator class group A. In order to register the class of the calling line in the call recorder 2000, four marking leads W8, X8, Y8 and Z8 are provided. With the class relays R600, R670 and R710 in their restored positions at the end of the class test cycle, the W8 and X8 marking conductors extending to Fig. 19 will be grounded at the contacts 601' and 718 in order to mark the WXYZ8 code marking conductors in accordance with the digit 1 indicative of the class 1 calling line.

If, at the end of the class test, the relay R670 is operated and the relays R600 and R710 are restored to indicate the registration of a class 2 calling line, relay R760 upon operating at the end of the class test cycle completes a circuit including ground at contacts 601, contacts 765, 714 and 672 for steadily illuminating the class 2 lamp 677. When relay R650 is subsequently operated, at its contacts 652, it will then connect ground potential by way of the contacts 606 to the translator class group A conductor C681 extending to Fig. 13 in order to operate the group class A relay R1340A and thus indicate to the translator 1300 that the class 2 calling line is in the translator class group A. In order to register the digit 2 indicative of the class 2 calling line in the call recorder 2000, the W8 and Y8 marking conductors will be marked with ground potential. For this purpose, the relay R670 in its operated position completes, at contacts 676, an obvious circuit for operating the relay R625. At this time the W8 marking conductor is ground at contacts 601' and the Y8 marking conductor is grounded by way of the contacts 627 and 607. The ground potential applied to the conductors W8 and Y8 will mark the WXYZ8 code conductors extending to Fig. 19 in accordance with the digit 2 indicative of the class 2 calling line.

If, at the end of the class test, the relay R710 is operated and the relays R600 and R670 are restored to indicate the registration of a class 3 calling line, relay R760 upon operating at the end of the class test cycle completes a circuit including ground at contacts 601, contacts 765 and 713 for steadily illuminating the class 3 lamp 678. When the relay R650 is subsequently operated, at its contacts 652, it will then connect ground potential by way of the contacts 606 to the translator class group A conductor C681 extending to Fig. 13, in order to operate the group class A relay R1340A and thus indicate to the translator 1300 that the class 3 calling line is in the translator class group A. In order to register the digit 3 indicative of the class 3 calling line in the call recorder 2000, the W8 and Z8 marking conductors will be marked with ground potential. At this time the W8 marking conductor is grounded at contacts 601' and the Z8 marking conductor is ground by way of the contacts 717 and 629′ in order to mark the WXYZ8 code marking conductors extending to Fig. 19 in accordance with the digit 3 indicative of a class 3 calling line.

If, at the end of the class test, the relay R600 is operated and the relays R670 and R710 are restored to indicate the registration of a class 4 calling line, relay R760 upon operating at the end of the class test cycle completes a flashing circuit including 120 I. P. M. impulsing conductor C699′, contacts 602, 765, 714 and 673 for flashing the class 4 lamp 676. Thus the lamp 676 indicates a class 4 calling line if it is flashing and it indicates a class 1 calling line if it is steadily illuminated. When the relay R650 is subsequently operated, at its contacts 652, it will then connect ground potential by way of the contacts 605, 716 and 675 to the translator class group C conductor C683 extending to Fig. 13 in order to operate the group class C relay R1360A and thus indicate to the translator 1300 that the class 4 calling line is in the translator class group C. In order to register the digit 4 indicative of the class 4 calling line in the call recorder 2000, the X8 and Y8 marking conductors will be grounded. At this time the X8 marking conductor is grounded by way of the contacts 609 and 718 and the Y8 marking conductor is grounded by way of the contacts 608 and 628. The ground potential applied to the conductors X8 and Y8 will mark the WXYZ8 code marking conductors extending to Fig. 19 in accordance with the digit 4 indicative of the class 4 calling line.

If, at the end of the class test, the relays R600 and R670 are operated and the relay R710 is restored to indicate the registration of a class 5 calling line, the relay R760 upon operating at the end of the class test cycle completes a flashing circuit including the 120 I. P. M. impulsing conductor C699′, contacts 602, 765, 714 and 672 for flashing the class 5 lamp 677. Thus the lamp 677 indicates a class 5 calling line if it is flashing and it indicates a class 2 calling line if it is steadily illuminated. When the relay R650 is subsequently operated, at its contacts 652, it will then connect ground by way of the contacts 605, 716 and 674 to the translator class group B conductor C682 extending to Fig. 13 in order to operate the group class B relay R1350A and thus indicate to the translator 1300 that the class 5 calling line is in the translator class group B. In order to register the digit 5 indicative of the class 5 calling line in the call recorder 200, the X8 and Z8 marking conductors will be grounded. For this purpose, the relay R670 in its operated position completes, at its contacts 676, an obvious circuit for operating the relay R625. At this time the X8 marking conductor is grounded by way of the contacts 609 and 718 and the Z8 marking conductor is grounded by way of the contacts 608 and 629. The ground potential applied to the conductors X8 and Z8 will mark the WXYZ8 code marking conductors extending to Fig. 19 in accordance with the digit 5 indicative of a class 5 calling line.

If, at the end of the class test, the relays R600 and R710 are operated and the relay R670 is restored to indicate the registration of a class 6 calling line, the relay R760 upon operating at the end of the class test cycle completes a flashing circuit including the 120 I. P. M. impulsing conductor C699′, contacts 602, 765, and 713 for flashing the class 6 lamp 678. Thus the lamp 678 indicates a class 6 calling line if it is flashing and it indicates a class 3 calling line if it is steadily illuminated. When the relay R650 is subsequently operated, at its contacts 652, it will then connect ground by way of the contacts 605 and 715 to the translator class group B conductor C682 extending to Fig. 13 in order to operate the group class B relay R1350A and thus indicate to the translator 1300 that the class 6 calling line is in the translator class group B. In order to register the digit 6 indicative of the class 6 calling line in the call recorder 2000, the Y8 and Z8 marking conductors will be grounded. At this time the Y8 marking conductor is grounded by way of the contacts 608 and 628 and the Z8 marking conductor is grounded by way of the contacts 609 and 717. The ground potential applied to the conductors Y8 and Z8 will mark the WXYZ8 code marking conductors extending to Fig. 19 in accordance with the digit 6 indicative of a class 6 calling line.

With the foregoing arrangement six different groups of finder-selector links, such as 440A and 500A, may be provided and each group may be wired to provide a different class of service, in accordance with the above chart, for the lines terminating in the respective group. Also, each of the six different classes may include both restricted and nonrestricted subscriber lines if the normal-post-springs are connected and arranged in the manner described under the heading "restricted calls."

In the above description it was pointed out that the control relay R730 operated under control of the class test relay R720. As a result thereof, at its contacts 735, the relay R730 applies ground potential to the conductor C1123 extending to Fig. 11, in order to operate the test control relay R1110 in the code switch 1100. The relay R1110 is operated at this time in order to connect the upper winding of the line test relay R1120 to the previously traced circuit, including the conductors C471 and C472 and the calling subscriber line. When the relay R1110 operates, it first closes its "X" contacts 1111 in order to complete an obvious hold circuit for the upper winding of the line relay R1130. This holding circuit will prevent the relay R1130 from momentarily restoring to normal when the circuit, including the lower winding thereof, is opened at the contacts 1115. As a further result of the operation of relay R1110, at its contacts 1113 and 1115, it disconnects the conductors C471 and C472 from the battery potential through the lower winding of the line relay R1130, and from the ground potential at the contacts 1154. At its contacts 1112 and 1114, the relay R1110 simultaneously connects the conductors C471 and C472 via the variable resistor 1122, and the upper winding of the line test relay R1120, to battery. In view of the foregoing description it will be understood that the calling subscriber line conductors are temporarily disconnected from the circuit including the lower winding of the line relay R1130 and simultaneously connected via the upper winding of the line test relay R1120, to battery. The relay R1120 is normally adjusted to operate in the event the subscriber line has a ground resistance thereon of less than 10,000 ohms. Consequently, if there is a direct ground potential or a low resistance ground leak on either the tip (+) or the ring (−) conductors of the calling subscriber line, the relay R1120 will operate. If the relay R1120 is operated at this time it applies ground potential via the contacts 1121 and 1116 to the conductor C1167 extending to Fig. 18, in order to operate the grounded-line relay R1810 in the coder 1800. This relay will lock itself in its operated position and thus register the fact that the calling subscriber line has a false ground potential thereon.

Shortly after the above-traced circuit is completed for operating the test control relay R1110, the slow-to-operate control relay R730 restores to normal and, at its contacts 735, opens the circuit for the test control relay R1110. The relay R1110 now restores to normal in order to reconnect the conductors C471 and C472 to the previously traced circuits. The line relay R1130 is now held in its operated position over the previously traced loop circuit including the calling subscriber line. It will be appreciated, however, that if no ground potential is found on the calling subscriber line at the time the relay R1120 is connected thereto, the relay will remain in its unoperated position and thus prevent the registration of a false ground condition in the coder 1800.

After the above-described class and grounded line tests have been made of the calling subscriber line, the class control relay R760 is operated as previously described. As soon as relay R760 operates it interrupts, at its contacts 764, a further point in the previously traced circuit for operating the relay R720. Finally, the relay R760 at its contacts 763, connects the dial tone signal applied to the dial tone conductor C797 via the contacts 624 and 775, conductor C1136 extending to Fig. 11, tone condenser 1118 and the contacts 1115, to the previously traced loop circuit, including the calling subscriber line. In this manner, the dial tone signal is transmitted to the calling subscriber to indicate that the digits of the called subscriber number may be dialed.

*Dialing the called number*

When the calling subscriber hears the dial tone signal he may dial the first two letters of the desired called exchange name, then the single digit identifying the number of the exchange in the called zone, and finally the four numerical digits designating the particular called subscriber substation in the called exchange. When the first digit is dialed by the calling subscriber, the line relay R1130 in the code switch 1100 will follow the impulses corresponding to the digit in the well-known manner and it will register this digit in the call register 1500. In response to the first interruption of the loop circuit, that is, the first impulse, the line relay R1130 will momentarily restore to normal, and, at its contacts 1131 it will apply ground potential via the contacts 1142, the conductor C1138 extending to Fig. 7, and the contacts 771 and 758 in order to operate the digit relay R905. This ground pulse is also extended via the conductor C717 extending to Fig. 15, wiper 1514 of the receiving sequence switch 1510, conductors C1551, and the winding of the magnet RM1521, to battery. The digit relay R905 operates and completes, at its contacts 906, an obvious circuit for operating the sequence control relay R830. Since the digit relay R905 is of the slow-to-release type it remains in its operated position during the time that the line relay R1130 is pulsing under control of the calling subscriber dial. Consequently, the digit relay R905 and the sequence control relay R830 are operated in response to the first impulse of each series of impulses transmitted by the calling subscriber and they remain in their operated positions until the last pulse of each series has been transmitted. During the interdigital pause between transmission of the successive digits of a number, the relays R905 and R830 will remain in their restored positions.

In view of the above-traced circuit for controlling the magnet RM1521 of the first called register 1520, it will be understood that the magnet RM1521 will operate upon each restoration of the line relay R1130 and that it will restore to normal upon each operation of the line relay R1130. It should be noted at this time that each series of impulses of each digit will be transmitted by the line relay R1130 to the wiper 1514 of the receive sequence switch 1510. Therefore the impulses of the first digits will be transmitted over the conductor C1551 engaged by the wiper 1514 to the magnet RM1521 of the first code register 1520. The receive sequence switch 1510 is automatically controlled at the end of each digit to position the wiper 1514 successively into engagement with the conductors 1552 to 1557, inclusive, so that the impulses of each of the following digits dialed by the calling subscriber will be transmitted to the magnets RM1531 and RM1541 of the second and third code registers 1530 and 1540, and to corresponding magnets provided in the first, second, third and fourth numerical registers 1610, 1620, 1630 and 1640 shown in block form. In this manner the seven digits of a called number dialed by a calling subscriber will be registered respectively in the seven registers noted of the call register 1500. Each of the above-noted registers are arranged so that the associated wipers, such as the wipers 1523 to 1527, inclusive, of the first code register 1520, will be advanced step-by-step in a counterclockwise direction a number of steps corresponding to the number of impulses in the digit dialed.

At the end of the first digit the wipers 1524 and 1525 of the first code register 1520 will mark the code marking conductors WXYZ21 to register the first digit dialed. Also the wiper 1526 will mark a conductor in its associated contact bank which determines whether or not the first digit dialed corresponds to the first digit of the local exchange terminating the calling subscriber. Finally, the wiper 1527 of the first code register 1520 will mark one of the conductors in its associated contact bank extending to the switch 1200 included in the code switch 1100, in order to select one of the eight wipers 1201 to 1208, inclusive.

At the conclusion of the first digit dialed by the calling subscriber the line relay R1130 will remain in its operated position during the interdigital pause and thus, at its contacts 1131, will remove ground potential from the conductor C1138 for a time interval which is sufficient to permit the slow-to-release digit relay R905 to restore to normal and interrupt, at its contacts 906, the previously described circuit for the sequence control relay R830.

Figure 15:
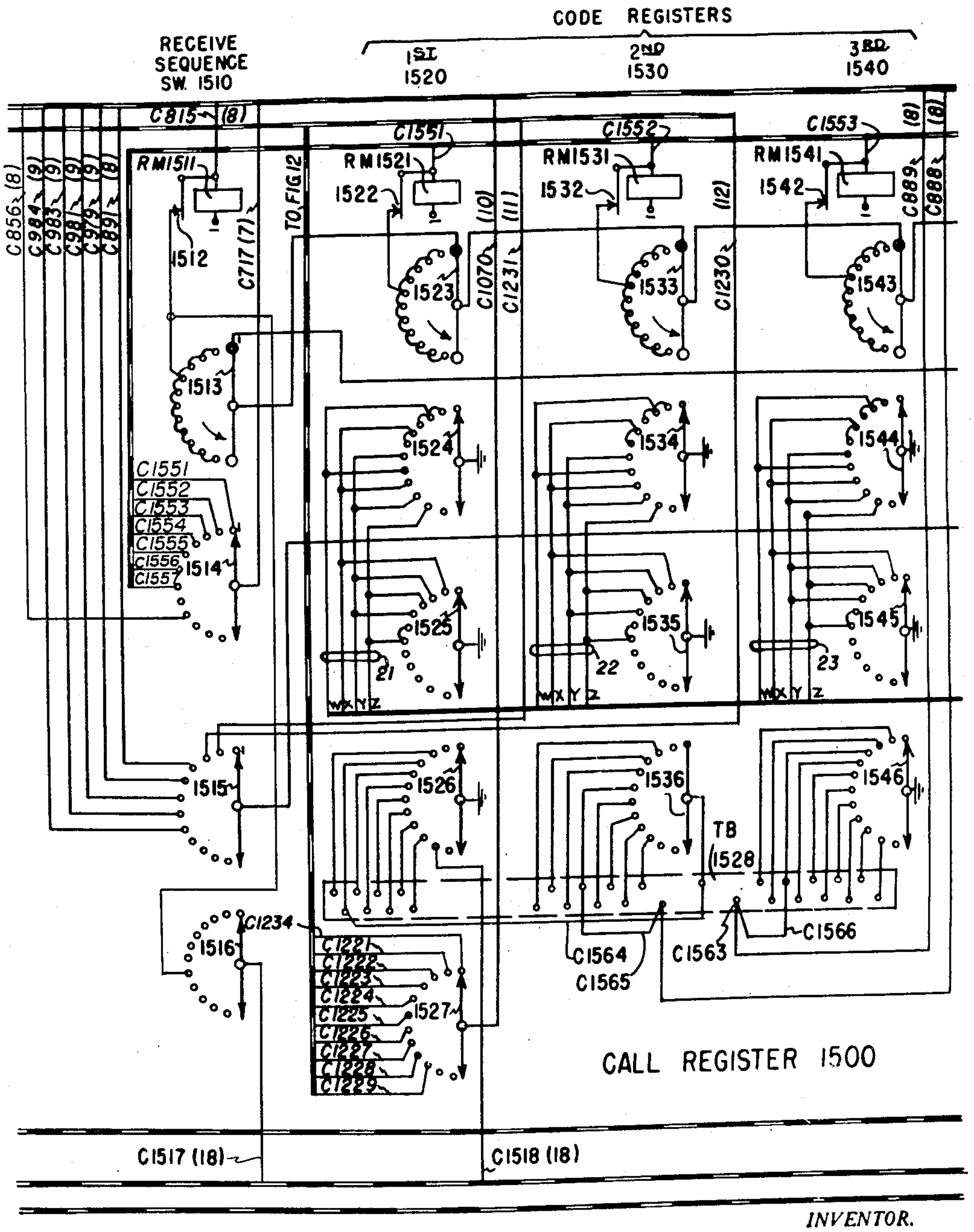

Before describing the operations which result from the restoration of the relay R830 it should be noted that when the relay initially operates, it completes a circuit by way of its contacts 831 and the conductor C815 extending to Fig. 15, for operating the magnet RM1511 of the receive sequence switch 1510. The operation of the magnet RM1511 prepares the switch 1510 to step its wipers 1513 to 1516, inclusive, one step in a counterclockwise direction as soon as the relay R830 restores to normal at the end of the digit. Consequently, when the relay R830 restores to normal at the end of the first digit it interrupts the circuit from magnet RM1511 which now restores to normal and advances its wipers into engagement with the second set of contacts in the associated contact banks. This operation transfers the previously traced impulsing circuit extending to the wiper 1514, from the conductor C1551 extending to the first code register 1520, to the conductor C1552 extending to the second code register 1530.

As a further result of the initial operation of the relay R830, at its contacts 835, it completes an obvious circuit for illuminating the station dial lamp 823 in order to indicate to the exchange attendant that the calling subscriber has started to dial. Finally, at its contacts 832, the relay R830 completes a circuit for operating the tone control relay R620. Upon operating the relay R620, at its contacts 622, locks itself in its operated position, independently of its initial operating circuit, to ground at contacts 756. As a further result of the operation of relay R620, at its contacts 624, it interrupts a point in the previously traced circuit for transmitting the dial tone signal to the calling subscriber. Finally, at its contacts 621, the relay R620 disconnects the fifteen-second control conductor C1196 from the circuit for controlling the fault seizure relay R770. The last-mentioned circuit is provided so that the fault seizure relay R770 will be operated only in the event that the calling subscriber fails to dial any digit within fifteen seconds after the director has been connected to the calling subscriber line.

In the above description it was pointed out that the receive sequence switch 1510 advanced its wipers into engagement with the second set of contacts in the associated contact banks at the end of the dialing of the first digit in order to prepare the impulsing circuit for the magnet RM1531 of the second code register 1530. As a result of the advancement of the wiper 1515 into engagement with the second contact in its associated contact bank a circuit is immediately completed for operating the party test relay R1150 and for energizing the lower winding of the party line relay R1160 in the code switch 1100. This circuit may be traced from ground at contacts 757 of the operated seizure relay R750 and then via contacts 895, conductor C794 extending to Fig. 16, wiper 1515 and the engaged contact 2, conductor C1231 extending to Fig. 11, the winding of relay R1150, to battery, and, in multiple therewith, the contacts 1161 and the lower winding of relay R1160, to battery. The relay R1150 operates over the above-traced circuit and immediately closes its "X" contacts 1151 before the "Y" contacts 1152 are opened in order to provide a momentary hold circuit for the upper winding of the line relay R1130. At its contacts 1154 and 1156, the relay R1150 disconnects respectively ground and battery potential from the previously traced loop circuit including the calling subscriber line, and at its contacts 1153 and 1155 it connects the calling subscriber loop circuit to a circuit including in series the upper winding of the party relay R1160, the 48-volt auxiliary battery 1165, and the resistor 1159.

The party line relay R1160 is connected to the calling subscriber loop circuit only after the dialing of the first digit, and it is disconnected therefrom after the second digit has been dialed. This party relay is of the type disclosed in the Pye Patent No. 1,673,884, granted June 19, 1928, and is arranged to respond to station identifying ground impulses transmitted by the special calling devices provided at the second to the fifth subscriber substations on party lines. As previously noted each station is provided with a special calling device of the type disclosed in the John E. Ostline Patent No. 2,410,520, granted November 5, 1946, which is provided with a cam as for transmitting ground pulses during the return movement of the dial.

If the calling line is assumed to be the first station on a calling party line, or an individual subscriber line, the calling device thereat will be of conventional construction, arranged only to interrupt the loop circuit in the usual manner without transmitting any station identifying ground impulses. In the latter case, the line relay R1130 will respond in the manner previously described to the impulses of the second digit, and to register the digit in the second code register 1530.

*Dialing the second digit*

Assuming that the calling subscriber substation is provided with a conventional calling device, the line relay R1130 will respond to the pulses of the second digit in substantially the same manner as has been described above even though the party line relay R1160 is included in the loop circuit of the relay R1130. The party line relay R1160, however, will not respond to the impulses transmitted from a conventional calling device of the type provided at an individual subscriber substation or at the first party substation on a party line due to the fact that the direction of the current flow in the lower winding opposes the direction of the current flow in the upper winding. Consequently, the impulses of the second digit control the line relay R1130 in the manner described above, to repeat the said impulses, at its contacts 1131, over the conductor C1138 to register the second digit in the second code register 1530. The impulses of the second digit will also be repeated at the contacts 1134 to the vertical magnet VM1210 of the switch 1200, due to the fact that the party test relay R1150 is in its operated position during the dialing of the second digit. More specifically, the circuit for controlling the vertical magnet VM1210 may be traced from ground via the contacts 1157, the winding of the magnet VM1210, contacts 1134, and the resistor 1139, to battery. Therefore, each time the line relay R1130 restores to normal during the dialing of the second digit, the above-traced circuit is completed for operating the vertical magnet VM1210.

From the foregoing it will be understood that the impulses corresponding to the second digit, dialed by a calling subscriber, will be registered in the second code register 1530, and the wipers 1201 to 1208, inclusive, of the switch 1200 will be positioned in vertical direction to a level in the associated contact banks corresponding to the value of the dialed digit.

If the calling station is provided with a special calling device, as previously noted, then the party line relay R1160 will respond to the ground impulses transmitted during the return movement of the dial in the manner described and disclosed in the Ostline application Serial No. 205,460, filed January 11, 1951. Consequently, the party line station identification operation will not be described in connection with the present disclosure. It may be well to mention, however, that the party line relay R1160 and the line relay R1130 cooperate to transmit signals over the conductors C1162 and C1163 to the calling station identifying register relays R2010, R2020, R2030, R2040, R2050, R2060 and R2080 in the call recorder 2000 to register the identity of the particular station on a calling party line.

After the impulses constituting the second digit of the called subscriber number have been transmitted by the calling subscriber, the line relay R1130 and the hold relay R1140 remain in their operated positions and cause the digit relay R905 and the sequence control relay R830 to restore to their normal positions. The sequence relay R830, upon restoring, at its contacts 831, removes ground potential from the conductor C815 thereby interrupting the circuit for the magnet RM1511. The magnet RM1511 now restores to normal and advances its wipers 1513 to 1516, inclusive, from engagement with the contacts 2 into engagement with the contacts 3 in the associated contact banks. As soon as the wiper 1515 disengages the second contact it interrupts the previously traced circuit, including the conductor C1231, for operating the party test relay R1150. The relay R1150 now restores to normal and disconnects the party line relay R1160 from the loop circuit including the line relay R1130 and it reestablishes the original loop circuit including the contacts 1154 and 1156 for the relay R1130. As a result of the advancement of the wiper 1515 into engagement with the third contact in its associated bank, a circuit is completed via the conductor C1230 extending to Fig. 12 for controlling the rotary magnet RM1211 of the switch 1200. Finally, the wiper 1514 of the switch 1510 connects the impulsing conductor C717 to the conductor C1553 so that the magnet RM1541 of the third code register 1540 will be controlled by the third digit dialed by the calling subscriber.

*Dialing of the third digit*

In response to the dialing of the third digit by the calling subscriber, the line relay R1130 will respond to the impulses transmitted over the loop circuit and, at its contacts 1131 it will repeat the impulses over the conductor C1138 in the manner previously described in order to control the digit relay R905 and the magnet RM1541 of the third code register 1540. In response to the operation of the digit relay R905, the sequence relay R830 will be reoperated and, at its contacts 831, the latter relay will complete the previously traced circuit including the conductor C815 for operating the magnet RM1511 of the receive sequence switch 1510. In addition to the foregoing, the line relay R1130, at its contacts 1134, repeats the impulses of the digit to the winding of the rotary magnet RM1211. In this connection it will be recalled that the wiper 1515 of the receive sequence switch 1510, in engagement with its third contact, applies ground potential via the conductor C1230, the winding of the rotary magnet RM1211, and the resistor 1139, to battery, each time the line relay R1130 closes its contacts 1134. From the foregoing it will be understood that the line relay R1130 controls the magnet RM1541 to register the third dialed digit in the third code register 1540, and that it also controls the rotary magnet RM1211 in order to rotate the wipers 1201 to 1208, inclusive, over the selected level of the associated bank contacts to a particular contact therein corresponding to the value of the third digit.

At the end of the dialing of the third digit the line relay R1130 will again be retained in its operated position during the interdigital pause and thereby cause the digit relay 905 and the sequence relay R830 to restore to normal. As previously noted, the sequence relay R830, upon restoring, will again interrupt the circuit for the magnet RM1511, thereby to advance the wipers 1513 to 1516, inclusive, an additional step in the counterclockwise direction.

It may be well to briefly outline the operations that have taken place as a result of the dialing of the first three digits of the called number. The first code register 1520 operates to register the first digit and, incident to the registration, the wiper 1527 thereof selects one of the wipers 1201 to 1208, inclusive, of the switch 1200. In response to the second dialed digit, the second code register 1530 operates to register the same, and simultaneously therewith the vertical magnet VM1210 operates to step the wipers 1201 to 1208, inclusive, of the switch 1200 in a vertical direction a number of steps corresponding to the value of the second digit. During the dialing of the second digit, the identity of a particular calling subscriber substation on a party line is also registered by the relays illustrated in Fig. 20 of the call recorder 2000. The third digit dialed by the calling subscriber is registered in the third code register 1540, and simultaneously therewith the rotary magnet RM1211 rotates the wipers 1201 to 1208, inclusive, of the switch 1200 a number of steps corresponding to the value of the third dialed digit.

Various operations may result from the registration of the first three digits dialed by the calling subscriber, including a possible disconnection of the director from the calling subscriber line. However, before continuing with the description of the operations which may result from the registration of the first three digits in the above-mentioned code registers 1520, 1530 and 1540, it is convenient at the present time to mention the fact that the last four digits of a called number will be registered respectively, in the same manner as has been described hereinbefore, in the first, second, third and fourth numerical registers 1610, 1620, 1630 and 1640. The manner in which the digits registered in the various registers are utilized in controlling the setting up of a telephone connection to the called subscriber substation will be described hereinafter.

*Registration of a local call in the call register 1500*

For the purpose of describing a local call, it will be assumed that the calling subscriber is a subscriber located in the FLorida 3 exchange, and that the digits dialed by the calling subscriber correspond to the directory number of another subscriber in the FLorida 3 exchange. Consequently, the first three digits correspond to the letters FL of the exchange name, and the digit 3 identifying the third exchange in zone 35. When the calling device is actuated in accordance with the letter F, three impulses corresponding to the digit 3 will be transmitted to the line relay R1130 and registered in the first code register 1520 in the manner previously explained. Therefore, the wipers 1523 to 1527, inclusive, will be in engagement with the contacts 3 in the associated contact banks. The wiper 1524 applies ground potential to the W21 code marking conductor, and the wiper 1525 applies ground potential to the Z21 code marking conductor. Consequently, the WXYZ21 code marking conductors will be marked in code form in accordance with the digit 3. In this manner the digit 3 registered in the first code register 1520 will be marked in the bank contacts accessible to the wipers 1655 to 1658, inclusive, of the send sequence switch 1650. Furthermore, the wiper 1526 will apply ground potential via the terminal 3 on the terminal block TB1528 and the conductor C1564, to the wiper 1536 of the second code register 1530. Finally, the wiper 1527 in engagement with the contact 3 of the associated contact bank connects the conductor C1070 to the conductor C1223 extending to the wiper 1202 of the switch 1200.

The calling subscriber now dials the second letter L of the called exchange name and thereby transmits five impulses corresponding to the digit 5 to the second code register 1530. Consequently, the wipers 1533 to 1536, inclusive, will be positioned into engagement with the contacts 5 in the associated contact banks. The wipers 1534 and 1535 will respectively apply ground potential to the X22 and Z22 code marking conductors in order to mark the same in accordance with the digit 5. Finally, the wiper 1536 in engagement with the contact 5 connects ground potential via the conductor C1565 to the conductor C888 extending to Fig. 8, contacts 833 and 813, and the winding of the first and second digit local relay R840, to battery. The relay R840 now operates and locks itself in its operated position over a circuit including the contacts 813, 845 and 754. In view of the above description it should be understood that by means of the strapping on the terminal block TB1528, it is possible to arrange the jumpering on the left-hand section and the middle section of the terminal block to complete the above-traced circuit for the relay R840 in accordance with any first and second digit. In the present description it is assumed that the letters FL (corresponding to the digits 35) operate the relay R840 at the end of the dialing of the second digit.

Figure 6:
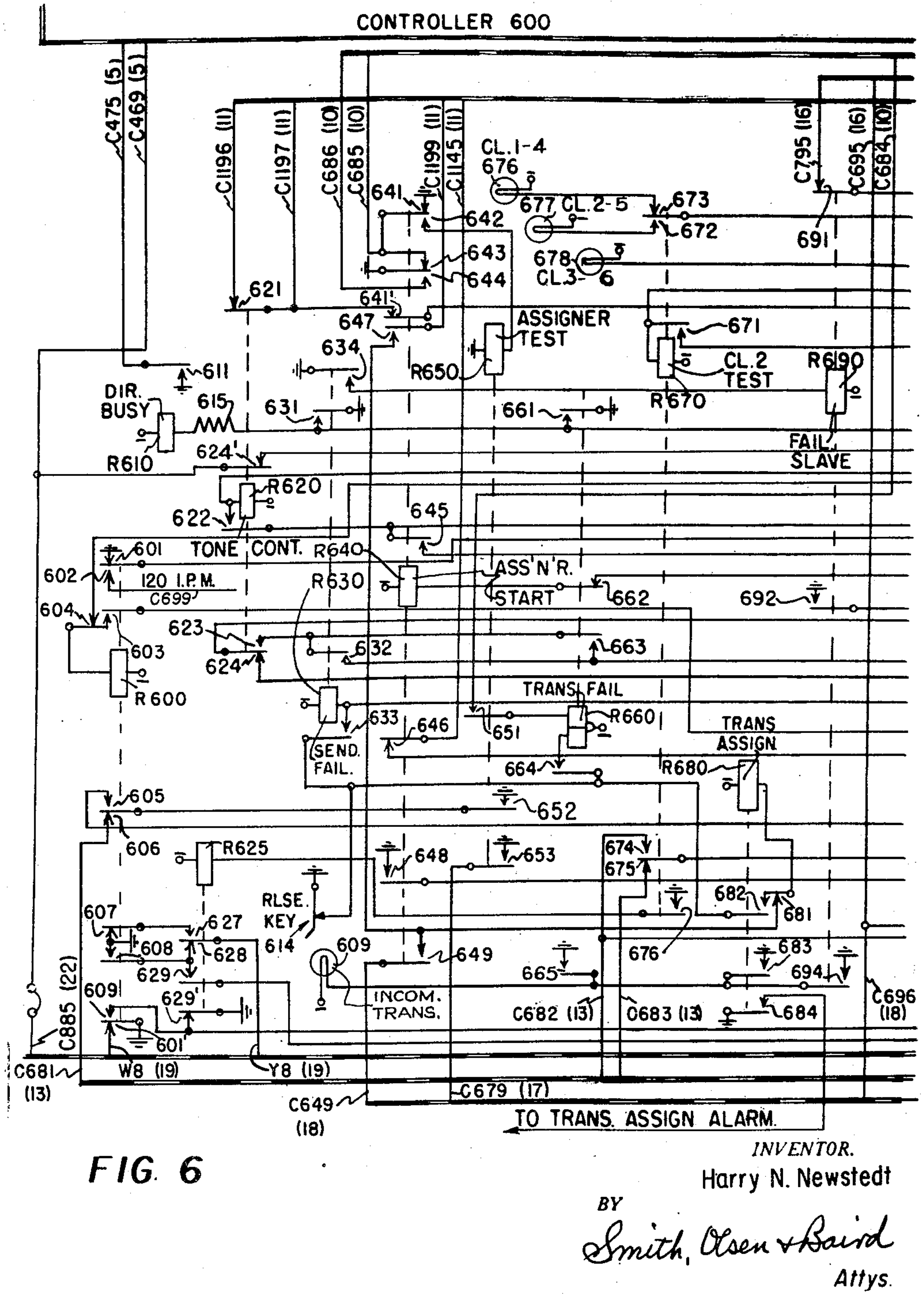

In response to the operation of the relay R840, at its contacts 844, it completes a circuit for operating the line relay R530 in the primary selector 500A which may be traced from ground at the contacts 1132 of the operated line relay R1130 in the code switch 1100, conductor C1145 extending to Fig. 6, contacts 646 and 844, resistor 843, contacts 898, conductor C468 extending to Fig. 5, wiper 453A, conductor C501A, contacts 512 and 521 and the upper winding of the line relay R530, to battery. The line relay R530 now operates and, at its contacts 531, operates relays R540 and R550 in order to prepare the selector to respond to the third digit dialed by the calling subscriber to the line relay R1130 of the code switch 1100.

Also, the relay R840 applies ground potential via the contacts 851, 841, 731 and 721, conductor C470 extending to Fig. 5, wiper 455A, conductor C503A and the contacts 518, 521' and 552, the contacts VON573 when they subsequently operate in order to place the upper winding of the transfer relay R550 under control of the controller 600 portion of the connected director. Finally, at its contacts 842 and 846, the relay R840 prepares points in the circuit for controlling the third digit local relay R850. The last-mentioned circuit is effective to operate the relay R850 only in the event that the third digit dialed by the calling subscriber corresponds to the third digit identifying the local calling exchange code.

From the foregoing explanation it will be seen that when the calling subscriber dials the first two digits of a local number the first and second code registers 1520 and 1530 will function to cause the primary selector 500A to be seized and conditioned to respond to the third digit.

In the present example it will be assumed that the third digit dialed by the calling subscriber is the digit 3, and that it controls the line relay R1130 so that the impulses of the digit are repeated, in the manner previously described, to the magnet RM1541 of the third code register and to the rotary magnet RM1211 of the switch 1200. The wipers 1543 to 1546, inclusive, of the third code register 1540 will be advanced into engagement with the third set of contacts in the associated contact banks. The wipers 1544 and 1545, respectively, apply ground potential to the W23 and Z23 code marking conductors in order to mark the WXYZ23 code marking conductors in accordance with the registered digit 3. The wiper 1546 applies ground potential to the terminal of the terminal block TB1528 connected to the jumper C1566 and then via the terminal 1563, conductor C889 extending to Fig. 8, contacts 842 and 846, and the winding of the third digit local relay R850, to battery. The last-mentioned circuit for operating the relay R850 is completed in response to the registration of the digit 3 in the third code register 1540. However, during the time that the line relay R1130 is transmitting impulses over the conductor C1138 to control the register 1540, at its contacts 1132, it also repeats the impulses over the previously traced circuit, including the conductor C1145, to the upper winding of the line relay R530 in the primary selector 500A. Consequently, the relay R530 controls the primary selector 500A. Consequently the line relay R530 restores three times and at its contacts 532 it transmits three impulses via the contacts 522', 532, 544 and 554 to the vertical magnet VM575. A branch of this circuit includes the lower winding of the relay R550 in order to retain the relay in its operated position during impulsing. Each time the above traced circuit is completed at contacts 532, the vertical magnet VM575 is controlled in the well known manner to raise the wipers 563A, 564A and 565A step-by-step in a vertical direction to a position opposite the third level in the associated bank contacts. As soon as the wipers take one vertical step the vertical-off-normal contacts VON573 are closed in order to complete the previously traced circuit for the upper winding of the relay R550 thereby to place the relay under control of the director. Also the contacts VON574 are closed on the first vertical step of the wipers in order to complete a circuit including the contacts 541 and 528, the cam springs CAM557, and the contacts 577 for operating the rotary relay R560. Upon operating the relay R560, at its contacts 562, it prepares a point in the circuit for operating the rotary magnet RM576 and, at its contacts 561, it completes a locking circuit for itself which is independent of the contacts CAM557.

At the end of the dialing of the third digit 3, the line relay R1130 remains in its operated position over the previously traced loop circuit and it maintains a holding circuit, at its contacts 1132, for the line relay R530. Also, at the end of the dialing of the third digit 3, the above traced circuit including the wiper 1546 is completed for operating the third digit local relay R850. At this time, line relay R1130 removes the ground potential from the conductor C1138 in order to cause the restoration of the digit relay R905 and the sequence relay R830, thereby to cause the receive sequence switch 1510 to advance its wipers an additional step into engagement with the fourth contacts in the associated contact banks. This operation is of no consequence in the present example inasmuch as the first three digits dialed by the calling subscriber indicate that the call is to be completed to a subscriber in the originating local exchange area and, therefore, the director will be released from the connection.

Referring now to the third digit local relay R850, it will be seen that, at its contacts 851, it removes ground potential from the conductor C470, thereby to interrupt the circuit for the transfer relay R550 in the primary selector. The relay R550 now restores to normal and, at its contacts 553, it completes a circuit including the contacts 562 for operating the rotary magnet RM576. Upon operating, the magnet RM576 rotates the wipers 563A to 565A into engagement with the first set of contacts in the third level of the primary selector 500A. As a further result of the operation of the magnet RM576, at its contacts 577, it interrupts the locking circuit for the relay R560 which relay now restores and, at its contacts 562 interrupts the circuit of the magnet RM576 which also restores. If the trunk terminating in the first set of contacts is busy, a ground potential will be encountered by the wiper 565A in order to complete a shunt circuit including the contacts 542 for preventing operation of the switch through relay R520. Consequently, the relay R560 and the magnet RM576 interact in the manner noted to stop the wipers until the wiper 565A encounters an idle trunk marked with a battery potential. If battery potential is encountered by the wiper 565A, indicating an idle trunk, the relay R520 will operate and open the stepping circuit of the rotary relay R560 and the magnet RM576.

When the relay R520 operates, it completes a locking circuit for itself including battery through its lower winding contacts 527 contacts VON574 and a first branch including contacts 529 and 518 and the grounded conductor C503A, and a second branch including contacts 526 and ground potential returned over the wiper 565A by the subsequent automatic switch. At its contacts 521 and 523, it disconnects the line relay R530 from the director, or if the relay R510 has been restored by the director, the line relay R530 is disconnected from the calling line. Also at its contacts 522 and 524, the relay R520 connects the calling line to the succeeding switch by way of the wipers 563A and 564A. At its contacts 526, the relay R520 connects the ground potential returned by the subsequent switch to the wiper 565A, by way of the contacts 517 (assuming that relay R510 is restored) to the conductor C446A in order to hold the preceding apparatus operated. As soon as the line relay R530 restores it interrupts the previously traced circuit for the hold relay R540 which also restores to normal.

Referring again to the relay R850 in the director it will be noted that, at its contacts 853, it also completes a circuit for illuminating the sending lamp 883 in order to indicate that the controller 600 portion of the director is in a sending condition. Finally, at its contacts 852, the relay R850 interrupts a point in the incomplete circuit for controlling the assignor start relay R640 in order to prevent the last-mentioned relay from being operated to associate the translator 1300 with the calling director.

When the sequence control relay R830 restores to normal, at the end of the dialing of the third digit, as described above, it completes, at its contacts 834, a circuit for energizing the lower winding of the director release relay R780 from the grounded conductor C889.

*Release of the director on a local call*

When the director release relay R780 is operated over the circuit including its lower winding, in response to the dialing of the three digits of a local subscriber called office code, it locks itself via its contacts 786 to ground at contacts 754 of the operated seizure relay R750. As a further result of the operation of the relay R780, at its contacts 781, it completes a multiple holding circuit for retaining the director busy relay R610 operated; at its contacts 784, it completes an obvious circuit for illuminating the release lamp 777 to indicate that the director has started to release; and, at its contacts 782, it interrupts a point in the previously traced circuit for the holding relay R820 and the director test relay R510. As a result of the latter operation, the relay R510 restores to normal and, at its contacts 511 to 519, inclusive, it disconnects the conductors C501A to C507A, inclusive, from the associated director, and it connects the conductors C444A to C446A, inclusive, to the wipers 563A to 565A, which have been connected to an idle local selector such as the selector 315. In other words, when a calling subscriber registers the three code digits identifying the originating local exchange, the director controls the primary selector 500A to seize an idle selector 315 and the director is released from the connection so that the subsequent digits of the numerical portion of the local called subscriber directory number may now be dialed by the calling subscriber directly to the switches included in the local exchange, in a conventional manner.

As soon as the conductors C501A to C507A, inclusive, are disconnected from the director, the line relay R1130 in the code switch 1100 restores to normal. This relay, at its contacts 1133, interrupts the circuit for the relay R1140 and the latter relay, at its contacts 1141, interrupts the circuit including the conductor C1137 in order to restore the seizure relay R750 to normal.

Incident to the restoration of the relay R750, at its contacts 751', it completes a circuit including the conductors C795 and C796 for energizing the upper winding of the director release relay R780. Referring to the call register 1500, it will be seen that the conductor C795 is grounded at the home contact position of the wiper 1667 on the sender switch 1660. Therefore, the ground potential on the conductor C795 is forwarded via the contacts 691 and 751', the upper winding of the director release relay R780 to the conductor C796 extending to Fig. 16, and also to the conductor C1232 extending to Fig. 12.

Figure 16:
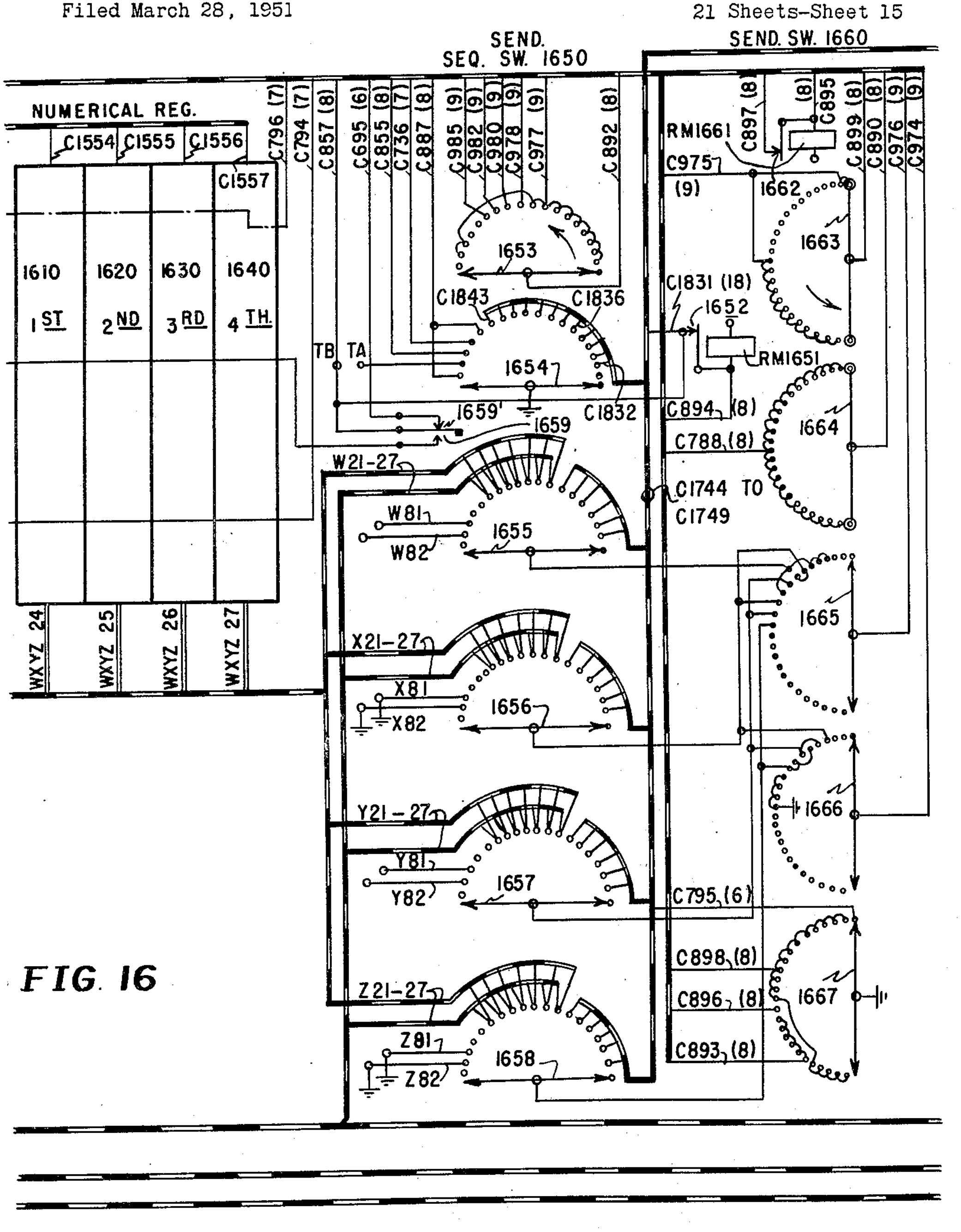

Referring now to Fig. 16, it will be seen that the ground potential applied to the conductor C796 is further extended to a wiper in the fourth numerical register 1640. Although the numerical registers 1610 to 1640, inclusive, have not been operated on the present local call, it will be assumed for the purpose of describing the release of the director that the registers 1610 to 1640 have been operated to register the last four digits dialed by a calling subscriber. Since all of the registers in Figs. 15 and 16, as far as the releasing circuit is concerned, are identical, the release of the third register 1540 will be described hereinafter. Therefore, when the ground potential is applied to the wiper 1543 it will be extended via the associated bank contacts and the interrupter contacts 1542 and the winding of the rotary magnet RM1541, to battery. The magnet RM1541 will be self-interruptedly operated over this circuit and will advance its associated wipers step-by-step in a counterclockwise direction until the wiper 1543 engages its home contact position. When this occurs the ground potential on the conductor C796 will be further extended to a wiper, similar to the wiper 1543, on the second code register 1530, in order to cause the associated rotary magnet to step its wipers to the home contact position. Each of the rotary magnets of the registers shown in Figs. 15 and 16 are sequentially operated in the reverse order, to restore their wipers to their normal home positions in the manner explained above in describing the restoration of the third code register 1540. Therefore, when the last of the registers, that is the first code register 1520, is restored to normal, the ground potential on the conductor C796 is then forwarded via the wiper 1513 to the winding of the magnet RM1511 on the receive sequence switch 1510. This magnet also restores its wipers to the normal first contact position in order to again forward the releasing ground potential on the conductor C796 to the send sequence switch off-normal contacts 1659. Since the send sequence 1650 is not operated on a local call, the off-normal contacts remain in the position illustrated in the drawings, and no circuit will be completed to restore the send sequence switch 1650 to normal. However, if it is assumed that the send sequence switch is in an off-normal position, then the ground potential at the contacts 1659 will be extended via the interrupter contacts 1652 and the winding of the magnet RM1651, to battery. This magnet will be self-interruptedly operated to restore its wipers to the normal home contact positions in the same manner as has been described above. However, when the wipers reach the home contact position, the off-normal contacts 1659 and 1659' will assume the position illustrated in the drawings.

During the time that the various magnets of the switches illustrated in Figs. 15 and 16 are restoring to normal, as described above, simultaneously therewith the ground potential applied to the conductor C1232 extending to Fig. 12, completes a circuit, including the vertical off-normal contacts VON1217, for operating the release magnet RM1212 of the switch 1200. This release magnet, upon operating, will cause the switch 1200 to restore its wipers 1201 to 1208, inclusive, to their normal resting positions, at which time the vertical off-normal contacts VON1217 are opened in order to interrupt the circuit for the magnet RM1212, and the vertical off-normal contacts VON1216 are closed in order to transfer the release circuit to the release magnet RM1198 of the timer 1190. As soon as the magnet RM1198 operates it will cause its wipers 1191 and 1192 to restore to normal in a clockwise direction to the position illustrated in the drawings and, in response to the restoration, the rotary off-normal contacts RON1195 will be opened in order to interrupt the circuit for the magnet RM1198.

As a further result of the restoration of the seizure relay R750, at its contacts 751, 752, 753, 754, 756, 757, 759, and 753', it removes the holding ground potential from various operated relays in the director in order to cause all such relays to restore to normal. When all of the rotary switches shown in Figs. 15 and 16, the vertical and rotary switch 1200 and the minor switch of the timer 1190 have been restored to normal in the manner described above, the multiple circuit, including the upper winding of the director release relay R780, will be interrupted in order to restore the last-mentioned relay to normal. Consequently, the relay R780 now interrupts, at its contacts 781, the circuit for the director busy relay R610 which also restores to normal in order to render the associated director available for additional calls.

From the foregoing description of a local call it will be understood that the director functions to absorb the first two digits dialed by the calling subscriber and to repeat the third dialed digit to the primary selector 500A before it is disconnected from the calling line. It will be appreciated, however, that if the director is released from the calling line, and the calling line is connected through the operated primary selector 500A it is immaterial how many digits are thereafter dialed by the calling subscriber to operate the switching apparatus in the local exchange since they will be operated on a straight forward step-by-step basis. Normally, the local subscriber directory numbers will be seven digits, but any larger or smaller number of digits may be dialed, after a three digit local called office code, without regard to the operation of the director.

*Restricted calls*

In the foregoing description of a local call, it was assumed that the call was from one subscriber to another subscriber in the FLorida 3 exchange and that the director, upon registering the digits 353, corresponding to the letters FL and the exchange digit 3, identifying the FLorida 3 exchange, released from the primary selector 500A in order to connect the calling line to the selector. The primary selector, however, has been operated to the third level and has searched for an idle trunk line to a succeeding local switch before the director has disconnected. It will be apparent that calls to the FLorida 1 and FLorida 2 exchange in zone 35 may also be completed in the same manner by connecting the contacts 1 and 2 accessible to the wiper 1546 to terminals on the terminal block TB1528 and by jumpering these terminals to the terminal C1563 on the terminal block TB1528 in the director and by connecting the trunk lines to the FLorida 1 and 2 exchanges in the first and second levels of the primary selector 500A. With this arrangement, all of the subscribers in the FLorida 3 exchange may make calls to all other subscribers in the FLorida 1 and FLorida 2 exchanges. The directors, however, will only be utilized to determine that the calls are to the subscribers in zone 35 before they disconnected and place the switching apparatus under control of the calling subscriber dial.

It may also be necessary in certain telephone networks to restrict a few subscriber substations in the FLorida 3 exchange from marking free calls to other exchanges in zone 35 because of the low rate of charge for their telephone service. The substation 401–RC3 represents a restricted subscriber substation in the FLorida 3 exchange of the type that is restricted from making calls to either the FLorida 1 or FLorida 2 exchanges.

Referring now to Fig. 5, it will be seen that the line circuit 405A is individual to the subscriber substation 401–RC3 and it will be assumed that at least ten such subscriber line circuits are terminated in the same level in the bank contacts accessible to the wiper 434A, 435A and 436A of the finder 440A. It will also be assumed that the left-normal-post springs 491A in the finder 440A will be closed whenever the wipers are raised to the level terminating the restricted lines. It will also be assumed that when the wipers 563A, 564A and 565A of the primary selector 500A are raised to levels 1 or 2, for example, terminating trunk lines extending respectively to the FLorida 1 and FLorida 2 exchanges, the left-normal-post springs LNP 578 are also closed.

In view of the foregoing, it will be understood that a restricted subscriber, such as the subscriber at substation 401–RC3, may complete a local call to another subscriber in the FLorida 3 exchange in the same manner as has been previously described. However, if the restricted subscriber should attempt to call the FLorida 1 or FLorida 2 exchange the director, in response to the dialing of the called office code digits 351 or 352, will release from the connections as soon as it has controlled the primary selector to raise its wipers to the first or second level, depending upon its value of the third digit of the called office code.

In either event, the left-normal-post springs LNP 578 in the primary selector 500A will be operated and the left-normal-post springs LNP 491A in the finder 440A will be operated. After the director has controlled the line relay R530 to raise the wipers of the primary selector to the first or second level, in the manner previously described, the third digit local relay R850 in the director operates, and removes ground potential from the conductor C470 thereby to interrupt the circuit including the wiper 455A, conductor C503A, contacts 518, 521′, 552 and VON573, for the upper winding of the transfer relay R550. The relay R550 now restores to normal, and, at its contacts 553, completes the previously traced circuits whereby the rotary magnet RM576 and the rotary relay R560 cooperate, in the manner previously described, to rotate the wipers of the primary selector 500A over the contacts of the selected level to search for an idle trunk to the called exchange in zone 35. However, since the left-normal-post springs LNP 491A and LNP 578 are closed when the call is made from a restricted subscriber substation, a circuit is completed for shunting the upper winding of the switch-through relay R520 in order to prevent its operation even though the wiper 565A encounters an idle trunk during the rotary stepping. This circuit may be traced from ground at the springs LNP491A, conductor 447A, terminal T10 connected to terminal T25, springs LNP578, the upper winding of relay R520 and ground at contacts 542. Since the relay R520 can not operate, the rotary relay R560 is reoperated after each rotary step of the wipers over a circuit which includes the contacts 541, VON574, 528, CAM557 and 577, and the winding of the rotary relay R560. As soon as the wipers of the selector 500A have been rotated over the tenth contacts in the selected level and have rotated to the eleventh rotary step position, the cam contacts CAM557 are opened in order to interrupt the circuit for the rotary relay R560 and thus terminate the rotary stepping of the switch wipers. At this time the cam contacts CAM558 are also closed and the cam contacts CAM559 are opened in order to substitute a grounded busy tone signal for a direct ground potential applied to the circuit including the lower winding of the line relay R530. The line relay R530 remains in its operated position.

In the director, the release relay R780 is operated in response to the dialing of the third digit, 1 or 2 in the call being described and, at its contacts 782 it removes ground potential from the conductor C474 in order to restore the director test relay R510 in the primary selector 500A. As soon as the relay R510 restores it disconnects the circuit for the upper winding of the line relay R530 from the conductor C501A at its contacts 512, and, at its contacts 514′ and 514, it reconnects the circuit including the upper and lower windings of the line relay R530 to the conductors C444A and C445A extending to the calling subscriber line. At this time the busy tone signal is connected via the eleventh rotary step cam springs CAM558 and the lower winding of the line relay R530 over the previously traced loop circuit to the calling subscriber at substation 401–RC3. Upon hearing the busy tone signal the subscriber will release the connection in a conventional manner by replacing his receiver upon the switchhook of the telephone instrument. As a result thereof, the line relay R530 will restore to normal and cause the primary selector 500A, the line finder 440A, and the line circuit 405A to restore to normal in a conventional manner.

In view of the foregoing description, it will be understood that the primary selector 500A will automatically rotate its wipers to the eleventh rotary stepping position whenever the switch-through relay R520 is shunted by the circuit including the left - normal - post springs LNP491A and LNP578. It should also be understood that the above described restrictions may also be employed to bar a restricted subscriber from making certain toll calls in which the director may necessarily be employed to control the setting-up of the entire connection before the transfer is made, whereby the calling line is connected to the established connection. In the latter type of call however, the first digit transmitted by the director to control the primary selector 500A will be effective, but all of the subsequent digits transmitted by the director will merely control the line relay R530. As soon as the director has transmitted all of the digits for completing a connection, the director test relay R510 will be restored to normal and the busy tone signal will be transmitted by way of the winding of the line relay R530 to the restricted calling subscriber line. It should be apparent from the foregoing description that if the call is initiated from a restricted subscriber substation and the first digit transmitted by the director raises the wipers of the primary selector to a level that causes the operation of the left-normal-post springs LNP578, the wipers will be automatically rotated to the eleventh rotary step position and the busy tone will be transmitted to the calling subscriber in response to the subsequent disconnection of the director from the primary selector 500A.

*Calls to exchanges outside the originating exchange zone*

In order to describe the operation of the telephone system to establish connections under control of the director it will be assumed that the calling subscriber has initiated a call, has seized the director, and has registered the number of the called subscriber directory number therein. For this purpose it will be assumed that the desired called subscriber is a subscriber in the EMpire 1 exchange whose directory number is EMpire 1–1234. In response to the dialing of the digits corresponding to the called office code EM1, the code digits 361 are registered respectively in the first, second and third code registers 1520, 1530 and 1540, in the manner previously described. Also the numerical portion of the called subscriber directory number, that is the digits 1234, are registered respectively in the first, second, third and fourth numerical registers 1610, 1620, 1630 and 1640. The above noted registers will also mark the WXYZ21 to WXYZ27, inclusive, code marking conductors in accordance with the different digits registered in the respective registers, in the manner previously explained.

As previously noted, the wiper 1527 of the first code register 1520 will be connected to the conductor C1223 in order to select the wiper 1202 of the switch 1200. During the registration of the second and third digits in the second and third code registers 1530 and 1540, the vertical and rotary magnet VM1210 and RM1211 will be respectively controlled in accordance with the second and third digits 6 and 1, to position the wipers on switch 1200 into engagement with the contacts 61 of the associated contact banks.

At the end of the dialing of the third digit the digit relay R905 and the sequence relay R830 restore to normal, as previously noted, and cause the magnet RM1511 of the receive sequence switch 1510 to advance its wipers into engagement with the fourth set of contacts in the associated contact banks. At this time the impulsing conductor C717 is connected to the conductor C1554 extending to the first numerical register 1610, and a circuit is completed for associating the translator 1300 with the particular calling director. As soon as the wiper 1515 engages the contact 4, the ground potential on the contacts 757 of the operated relay R750 is connected via the conductor C794 extending to Fig. 16, wiper 1515, conductor C891 extending to Fig. 8, contacts 852, 811, 783 and 662, and the winding of the assigner start relay R640, to battery. The relay R640 now operates in order to cause the translator assigner 1000 (Fig. 10) to find the particular calling director being utilized in the present call and to associate the common translator 1300 (Figs. 13 and 14) with the said director.

Before proceeding with the description of the operation to assign the translator to the particular calling director it should be noted that the originating exchange is provided with a plurality of directors, each comprising a plurality of individual units, as previously noted, and that the originating exchange is also provided with a single common translator 1300. This translator is called into use by any calling director when it becomes necessary to translate the three code digits dialed by a calling subscriber into one or more routing digits which may be of the same value and the same number as the three code digits, or which may be of different values and different numbers of digits than the three code digits dialed by the calling subscriber. The translator 1300 is provided with a plurality of individual translator relays, each of which is permanently wired in accordance with the routing digits and other control information required to govern the operation of the director to set up a connection between the originating exchange and the particular called exchange over a predetermined route. The route, as determined by the individual translator relay may include a direct trunk route to a particular called exchange, or it may include a trunk route to the called exchange through an intermediate tandem exchange, and in certain cases the individual translator relays will route a call over an alternate trunk route to the desired called exchange, in the event all of the direct routes are busy at the time that the particular translator relay is to be selected.

When the assigner start relay R640 operates after the dialing of the third digit, it completes a locking circuit for itself which may be traced from ground at the contact 756 of the operated relay R750, contacts 645, 811, 783 and 662 and the winding of the relay R640, to battery. It may be well to mention at this time that the assigner start relay R640 cannot be operated to call for the common translator 1300 if the third digit local relay R850 is operated in the manner previously described. In other words, the fact that the called office code digits do not correspond to the three code digits indicative of the local calling exchange prevents operation of both the relays R840 and R850.

As a further result of the operation of the relay R640, at its contacts 646, it interrupts a point in the previously traced circuit including the conductor C1145, thereby to prevent any impulses from being repeated to the primary selector 500A over the conductor C468. At its contacts 641 and 643, the relay R640 removes the direct ground potential from the hold conductor C685 extending to the bank contact accessible to the wiper 1002 of the translator assigner 1000 (Fig. 10), thereby to remove the busy marking ground potential and indicate that the calling director requires the use of the common translator 1300. At its contacts 642, the relay R640 connects the assigner test relay R650 to the conductor C685 and, at its contacts 644, it applies ground potential to the start conductor C686 extending to Fig. 10, thereby to complete a circuit for initiating the operation of the translator assigner 1000 to associate its wipers 1001 to 1003, inclusive, with the conductors C684, C685, and C1070, respectively. Other directors accessible to the wipers of the translator assigner 1000 have ground potential applied to the conductors corresponding to the conductor C685 to mark such directors busy to the translator assigner. At its contacts 648, the relay R640 completes a circuit for controlling the pulse generator 700 and the motor start relay R790 in parallel. The circuit for controlling the pulse generator 700 may be traced from ground via the contacts 648 and 792, and via a first branch circuit including the contacts 794 and the winding 701 of the pulse generator 700, to battery, and via a second branch circuit including the vibrating contacts 705, and the winding 701, to battery. The first branch circuit is provided to start the pulse generator 700 regardless of whether the contacts 705 are closed or opened. A third branch circuit is also completed for operating the motor start relay R790, which relay, upon operating, now interrupts the first branch circuit including the contact 794, and it locks itself in its operated position over a circuit including its contacts 793, and the contacts 759 of the operated seizure relay R750. In addition to the foregoing, a fourth branch circuit is completed via the contacts 792 and the conductor C695 extending to Fig. 16, for controlling the magnet RM1651 of the send sequence switch 1650. In Fig. 16 it will be seen that the ground potential applied to the conductor C695 is extended via the off-normal contacts 1659′ and the interrupter contacts 1652 and the winding of the magnet RM1651, to battery. The magnet now operates and restores, under control the contacts 1652, and advances its wipers 1653 to 1658, inclusive, one step in a counterclockwise direction into engagement with the first contacts in the associated contact banks. At this instant the off-normal contacts 1659′ are opened in order to interrupt the preliminary stepping circuit for the magnet RM1651.

As a further result of the operation of the motor start relay R790, at its contacts 792, it interrupts the initial circuit, including ground potential at contact 648, and, at its contacts 791, it connects the ground potential at contacts 648 to the PC conductor in order to operate a peg count meter (not shown). At this time the ground potential at contacts 759 is connected via the contacts 793 and 705 to the winding 701 of the pulse generator 700. The generator 700 now operates to interrupt its contacts 706 at approximately ten pulses per second. In this connection it should be noted that the ground at contacts 759 is also connected via the contacts 706 and the winding of the pulse relay R880, to battery. Therefore, each time the contacts 706 are opened, under control of the pulse generator cam 704, the relay R880 restores. Consequently, the relay R880 pulses at the rate of ten pulses per second.

The pulse generator 700 is of the type disclosed in the Ostline Patent No. 2,492,435, granted December 27, 1949. It should be understood that the armature 702, the serrated permanent magnet 703, and the cam 704 are secured to a common shaft, and that armature 702 is rotated in the magnetic field created by the field structure including the winding 701. The right end of the armature spring for the contacts 705 is provided with a permanent magnet and constitutes a pendulum having a natural frequency of vibration that is determined by the mass of the magnet and the mass and stiffness of the armature itself. Thus the pulse generator 700 constitutes an electric motor which is started over the previously traced circuits regardless of the position in which the armature 702 was stopped at the termination of its previous operation. The control circuit for the pulse generator is connected and arranged by means of the circuits including the contacts of the motor start relay R790 so that it will always be restarted regardless of its previous stopped position. The principal function of the pulse generator 700 is to transmit pulses, at its contacts 706, at the rate of ten pulses per second in order to control the pulsing rate of the pulse relay R880.

*Operation of the translator assigner 1000 and the translator 1300*

At the outset it should be noted that the translator assigner 1000 (Fig. 10), and the translator 1300 (Figs. 13 and 14), are schematically illustrated, and that they are the same as those disclosed in Figs. 10, 13 and 14 of the Ostline application Serial No. 75,985, filed February 12, 1949. The application of ground potential to the start conductor C686 controls the translator assigner 1000 to rotate its wipers 1001 to 1003, inclusive, to find the calling director which is marked by the resistance ground potential applied to the conductor C685, through the winding of the assigner test relay R650. When this director is found, the stepping of the wipers 1001 to 1003 is terminated and a circuit is completed over the conductor C685 for operating the assigner test relay R650 in the controller 600 portion of the director. The latter relay, at its contacts 651, connects resistance battery potential by way of the upper winding of the translator failure relay R660 to the conductor C684 extending to Fig. 10 in order to operate a director hold relay therein (not shown). However, due to the resistance of the last-mentioned relay, the translation failure relay R660 does not operate at this time. The translator assigner 1000 now applies ground potential to the conductor C1071 extending to Fig. 13 and to the conductor C1070 extending to Fig. 15 in order to seize the translator 1300. In Fig. 13, the ground on conductor C1071 operates the start relay R1380 in order to prepare the translator 1300 for operation in the manner described in the Ostline application Serial No. 75,985, filed February 12, 1949.

Referring now to the assigner test relay R650 (Fig. 6) it will be seen that, at its contacts 652, it applies ground potential to the translator class group A, B or C conductors C681, C682 or C683 depending upon the particular class of the calling line as registered. Consequently, a circuit will be completed over a particular one of the above noted translator class group conductors in order to operate a corresponding class group relay R1340A, R1350A or R1360A in the translator 1300. The operation of the selected class group relay thereat will connect any one of the marking conductors such as the conductor C1243, C1245C, and C1235C, to any one of a plurality of the translator relays, such as the relay R1410A, of the translator 1300, via a translator relay conductor, such as the conductor C1344A. As a further result of the operation of the assigner test relay R650, at its contacts 653, it applies ground potential to the conductor C679 extending to Fig. 17, in order to complete an operating circuit for the connect relay R1710. The connect relay R1710 is provided to connect the various register relays and control relays in the coder 1800 portion of the director to the thirty-four common conductors extending to Fig. 14, so that the selected translator relay in the translator 1300 will selectively control the operation of the register relays in the coder 1800 in accordance with the translation of the particular called office code digits registered in the director.

In the present call, the calling subscriber line is of the class 3 type and consequently the translator class group A conductor C681 is grounded in order to operate the class group A relay R1340A and the auxiliary relay R1310A. The latter relay connects all of the terminals on the terminal block TB1250 to the terminals on the block TB1395.

The manner in which the particular translator relay in the translator 1300 is operated will now be described. As previously noted at the time the translator assigner 1000 associates its wiper 1003 with the contact terminating the conductor C1070, it applies ground potential thereto. In Fig. 15, the grounded conductor C1070 is connected via the wiper 1527 and the conductor C1223 to the wiper 1202 of the switch 1200. It will be recalled that the wipers of this switch are all positioned into engagement with the contacts 61, in the associated contact banks. Consequently, the ground potential applied to the wiper 1202 is further extended by way of the conductor C1241 to the terminal block TB1240 and jumpered to the terminal TB1250 by means of the jumper C1242. The conductor C1243 connected to this terminal is now connected to the conductor C1342 due to the operated condition of relay R1310A. The grounded conductor C1342 is jumpered via the conductor C1343 to the conductor C1344A in order to operate the translator relay R1410A in Fig. 14. The translator relay R1410A is permanently wired in code to mark the WXYZ11 and WXYZ12 code marking conductors in accordance with the routing digits 4 and 8 and to mark the WXYZ17 code marking conductors in accordance with the rate digit 1 and also to mark the TB and ABT conductors extending to the coder 1800.

For the purpose of this description it has been assumed that the routing digits required to extend a connection from a calling subscriber in the FLorida 3 exchange to a called subscriber in the EMpire 1 exchange, are the digits 4 and 8.

Figure 17:
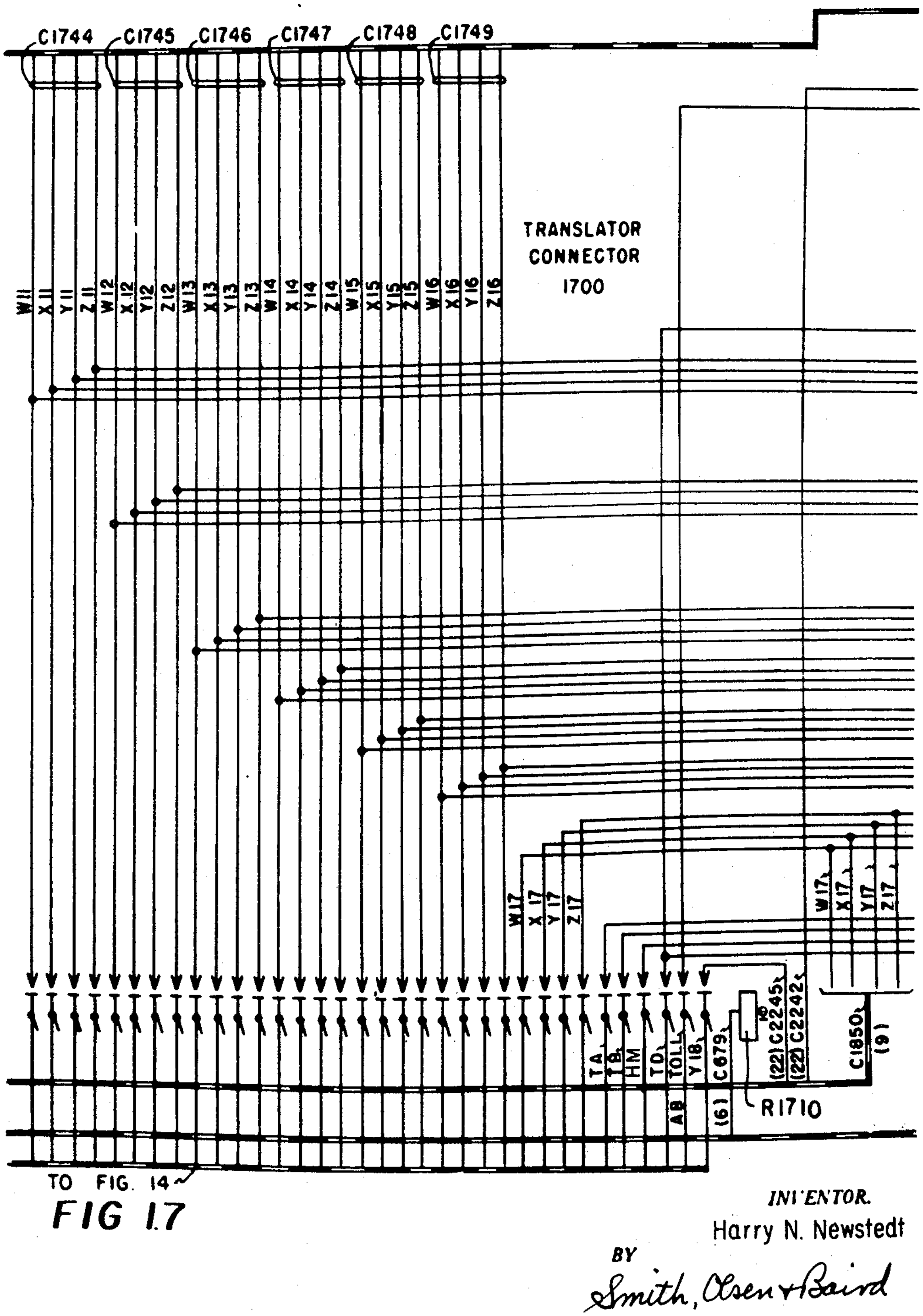
Figure 18:
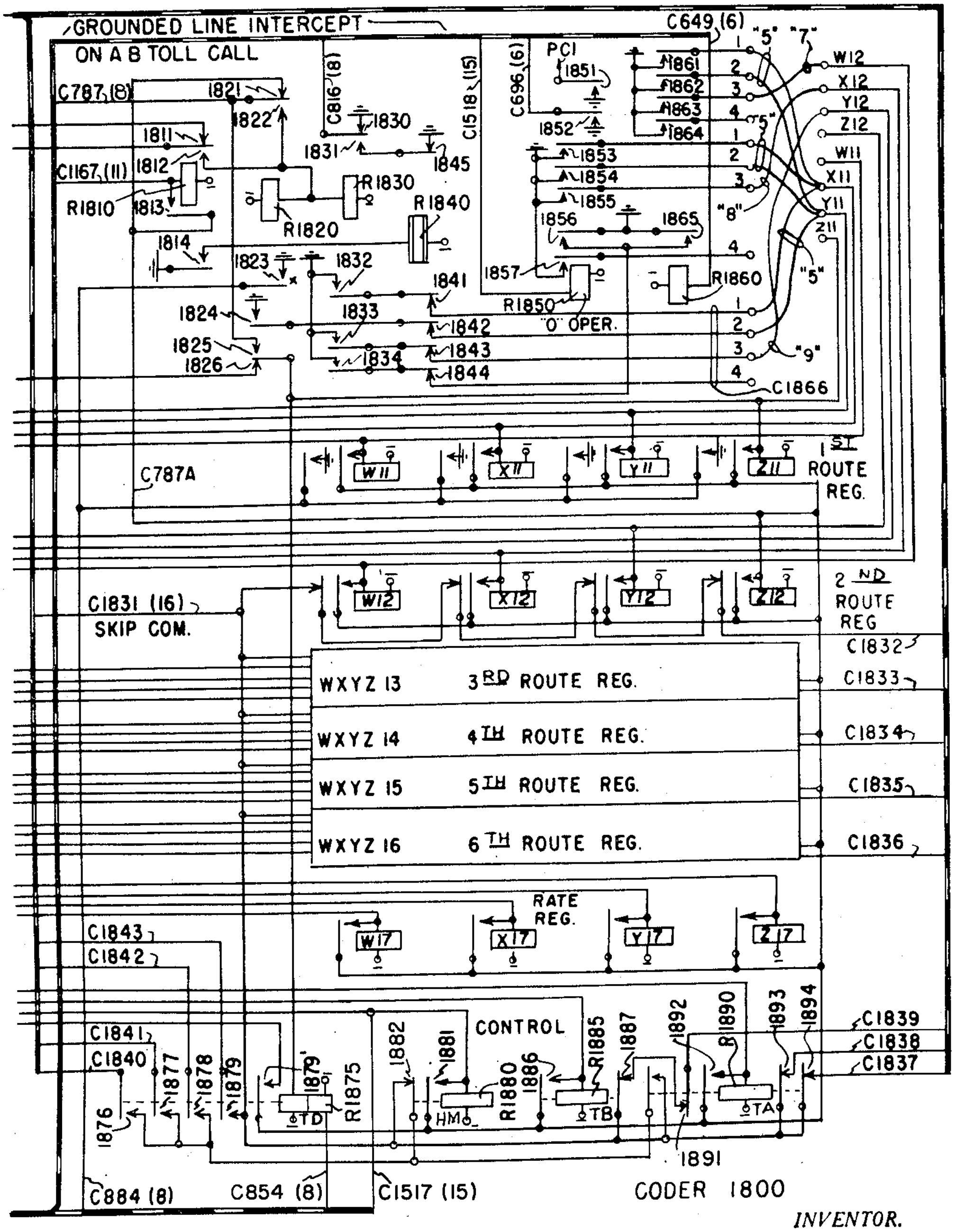

Referring now to Figs. 17 and 18, it will be seen that when the selected translator relay R1410A operates, it grounds the X11 and Y11 conductors via the contacts of the connect relay R1710 in order to complete circuits for operating the X11 and Y11 register relays in the first route register. As soon as the last-mentioned relays are operated, they immediately lock themselves in their operated position over a circuit including their left-hand inner-make contacts, conductor C787A, contacts 1821, and the grounded conductor C787 extending to Fig. 8. Accordingly, these relays are locked in their operated positions ot register the first routing digit 4 in the first route register of the coder 1800. In addition thereto, at the left-hand outer-make contacts the register relays X11 and Y11 apply ground potential to the conductor C884 extending to Fig. 8 in order to operate the translation complete relay R810 in the controller 600. The last-mentioned circuit indicates to the controller 600 that all of the information is transferred from the operated translator relay in the translator 1300, to the coder 1800. Although the above description includes only the transfer of one routing digit from the translator 1300 to the coder 1800 it should be understood that all of the information permanently registered in the operated translator relay is simultaneously transferred to the coder 1800. Therefore, the second routing digit 8 will be transferred to the second route register in the coder 1800 by the application of ground potential to the X12 code marking conductor, thereby to operate the X12 register relay in the second route register of the coder 1800. The last-mentioned relay also locks itself in its operated position via its inner-make contact to the grounded conductor C787. At its outer-break contact, the X12 register relay interrupts a point in a circuit including in series the conductors C1832 and C1831, which prevents the send sequence switch 1650 from skipping the routing digit 8 registered in the second register of the coder 1800. Since only two routing digits are required in the present call, the WXYZ13 toWXYZ16 code marking conductors are not marked and, therefore, the register relays of the third to the sixth route registers in the coder 1800 will remain in their normal unoperated positions. It will be appreciated however, that if additional routing digits are needed they may also be registered in the coder 1800 in the manner explained above. Since no digits are registered in the third to the sixth route registers, the conductors C1833 to C1836, inclusive, are connected via closed contacts of the unoperated register relays to the skip conductor C1831 in order to control the send sequence switch 1650 to skip the last-mentioned registers.

The four WXYZ17 code marking conductors are provided to indicate the units digit of the rate of charge for a call completed between a subscriber in the FLorida 3 exchange and a called subscriber in the EMpire 1 exchange. Accordingly, it will be assumed that the charge rate for this call is the rate 01, and that the W17 and X17 code marking conductors are grounded in order to operate the corresponding register relays in the rate register in accordance with the units digit 1. These relays also lock themselves in their operated position over the previously traced circuit to the grounded conductor C787.

The TA, TB, HM, and TD code marking conductors are connected, respectively to the TA, TB, HM and TD control relays R1890, R1885, R1880 and R1875. These relays may be individually operated, or they may be operated in various combinations in order to determine the operation of the director in transmitting the dialed digits which are now registered in the code and numerical registers of the call register 1500. In order to describe the various combinations which may be utilized in any telephone connection, the different relays will be considered individually. For example, the TA control relay R1890, if operated, controls the director to send out all seven digits registered in the call register 1500 after the director has transmitted the routing digits registered in the first to the sixth route registers in the coder 1800. The TB control relay R1885 is provided to determine whether or not the third digit registered in the third code register of the call register 1500 is to be transmitted. In its operated position, the TB control R1885 will permit the director to transmit the first and second code digits registered in the call register 1500, it will control the director to skip the digit registered in the third code register, and it will permit the director to transmit the remaining digits registered in the call register 1500. The HM control relay R1880 is provided for eight-digit calls and is arranged to cause the director to automatically route such calls to an operator position for completion. This relay will normally be operated on all eight-digit numbers. Finally the TD control relay, R1875, is provided to determine whether or not the director is to transmit the digits registered on the four numerical registers of the call register 1500. Thus, if the TA control relay R1890 is operated in combination with the TD control relay R1875 then the director will transmit only the first three digits of a number as registered in the call registers of the call register 1500.

For the purpose of the present description it will be assumed that the TB control relay R1885 is operated by the translator relay R1410A and that the relay locks itself in its operated position via its contacts 1886 to the grounded conductor C787. At its contacts 1887, the TB control relay R1885 disconnects the conductor C1839 from the skip conductor C1831 and thereby controls the director to transmit the digit registered in the third code register of the call register 1500. The remaining four digits of the seven digit number registered in the call register 1500 will also be transmitted. Since the TA control relay R1890 is in its normal position, the digits registered on the first and second code register of the call register 1500 will be skipped by the director.

It will also be assumed that the AB toll conductor is grounded by the translator relay R1410A in the present call in order to complete a circuit for controlling the call recorder 2000. This circuit may be traced from the grounded AB toll conductor via the contacts 1811, the conductor C2242 extending to Fig. 22, and the winding of the start relay R2230 in the call recorder 2000. The relay R2230 operates and, at its contacts 2237, locks itself to the grounded conductor C725. The operated condition of the start relay R2230 indicates that the present telephone connection is an AB toll call and that a record is to be produced containing the items of information pertaining to the connection. The Y18 code marking conductor will not be grounded in the present call by the translator relay R1410A because the tens digit of the rate of charge for the call is the digit 0. If the last-mentioned code marking conductor is grounded, a circuit will be completed via the conductors C2245 extending to Fig. 22 in order to operate the tens digit rate relay R2270. The last-mentioned relay will register the tens digit 1 of the rate of charge for a call.

All of the information which is permanently wired on the selected translator relay R1410A in the translator 1300 is simultaneously transferred to the coder 1800 in the manner described above, and consequently, the translator 1300 may now be disconnected from the particular calling director so that it may be used by other directors requiring the translation of a registered called office code.

As described above, the translation complete relay R810 is operated as soon as one of the register relays WXYZ11 in the coder 1800 is operated to register a first route digit. At its contacts 811, the relay R810 interrupts a point in the previously traced locking circuit for the assigner start relay R640, which relay now restores to normal. In response to the restoration of the relay R640, at its contacts 641 and 642, it transfers the hold conductor C685 from the circuit including the relay R650 to direct ground potential. As soon as the above transfer is made the translator assigner 1000 is controlled over the conductor C685 to rotate its wipers 1001 to 1003, inclusive, an additional step in order to disconnect the translator assigner 1000 from the director. As a further result of the restoration of the relay R640, at its contacts 644, it removes ground potential from the start conductor C686 in order to interrupt the circuit for the start relay (not shown) in the translator assigner 1000. The translator assigner 1000, in stepping its wipers 1001 to 1003, inclusive, an additional step, interrupts the circuit including the conductor C1070 and thereby restores the selected translator relay R1410A in the translator 1300 to normal. In addition to the foregoing, the translator assigner 1000 disconnects ground potential from the conductor C1071 in order to interrupt the start circuit for the translator 1300.

As soon as the assigner test relay R650 restores to normal, it disconnects the ground potential from the class translator class group A, B, or C conductors C681 to C683, inclusive, in order to restore the particular translator class group relay in the translator 1300. At this time the translator 1300 is fully restored to normal and available for other calls. Finally, at its contacts 653, the assigner test relay R650 removes ground potential from the conductor C679 in order to restore the connect relay R1710 to normal and thereby disconnects the coder 1800 from the translator 1300.

From the foregoing description of operation it will be understood that the translator 1300 may be assigned to the exclusive use of a calling director for a very short period of time. During this time interval the information permanently stored on a selected translator relay in the translator 1300 is simultaneously transferred to and registered in the coder 1800. Immediately thereafter, the coder 1800 controls the director to disconnect the translator 1300 and render it available for further calls.

*Sending of the digits by the director*

As noted above, the translation complete relay R810 is operated to indicate that the coder 1800 has been operated to register the information transferred thereto from the translator 1300. Upon operating, the relay R810 controlled the disconnection of the translator 1300 from the coder 1800 by interrupting the circuit for the relay R640 as described above. In addition thereto, at its contacts 814, the relay R810 completes a circuit for operating the start send relay R930. The circuit for the start send relay R930 may be traced from battery via the winding of the relay, contacts 822 and 814, conductor C816 extending to Fig. 18, and the grounded contacts 1830. Upon operating, the relay R930, at its contacts 932, locks itself in its operated position to ground at the contacts 754 of the operated seizure relay R750. The start send relay R930 also controls, at its contacts 931, 933 and 934, various circuit operations whereby the director sends out impulses corresponding to the various routing digits which have been registered in the coder 1800, and certain of the dialed digits which have been registered in the call register 1500. More specifically, at its contacts 931, the relay R930 applies ground potential from the contacts 751 to the conductor C977 extending to Fig. 16 thereby to mark the contacts 1 to 9, inclusive, and 16 and 17 in the bank associated with the wiper 1653 of the send sequence switch 1650. The ground potential applied to the above noted contacts controls the send sequence switch 1650 to start the sending operation and to continue the sending of all of the routing digits registered in the coder 1800 without regard to the speed at which the calling subscriber may dial the last four digits of the called number. In other words, after the calling subscriber has registered the first three digits of the called office code in the code registers of the call register 1500, the routing digits will be registered in the coder 1800 by the translator 1300 and the sender portion of the director may operate to send out all of the routing digits while the calling subscriber continues to dial the remaining four digits of the numerical portion of the called subscriber directory number into the director.

As a further result of the operation of relay R930, at its contacts 933, it connects the ground potential at the contacts 753', via the resistor 936 and the contacts 933, to the left-hand winding of the relay send relay R910. Finally, at its contacts 934, the relay R930 connects battery potential via the resistor 923, and the contacts 934 and 868 (as soon as relay R860 operates), to the left-hand winding of the delay send relay R910. At the present time, the resistance battery potential mentioned above is not applied to the left-hand winding of the relay R910 because the relay R860 is in its normal position. Therefore, the resistance ground potential connected to the left-hand winding of the relay R910 is further extended through the winding of the relay, impulsing contacts 882, resistor 843, contacts 898, conductor C468 extending to Fig. 5, wiper 453A of the director hunter 450A, conductor C501A, contacts 512 and 521, and the upper winding of the line relay R530 of the primary selector 500A, to battery. The line relay R530 now operates and prepares the primary selector 500A to respond to the first routing digit transmitted by the director. The above noted resistance ground potential, after it passes through the left-hand winding of the relay R910, is also extended via the conductor C975 extending to Fig. 16, the home and first contacts accessible to the wiper 1663, conductor C899 extending to Fig. 8, and the resistor 843. The last-mentioned circuit effectively short-circuits the impulsing contacts 882 in order to prevent the interruptions thereof, by the pulse relay R880, from being transmitted to the line relay R530 in the primary selector 500A. The send sequence switch 1650 has its wipers 1653 to 1658, inclusive, positioned in engagement with the contacts 1 in the associated contact banks at the present time, due to the fact that the magnet RM1651 was previously operated to advance the wipers from the home contact positions when the start circuit was completed for the pulse generator 700. Consequently, when the start send relay R930 applies ground potential to the conductor C977, a circuit is completed via the wiper 1653 in engagement with the contact 1, conductor C892 extending to Fig. 8, contacts 891 and 864, winding of the pulse control relay R870, and the resistor 879, to battery. The relay R870 operates over this circuit and thus extends the ground potential applied to the conductor C892 via the contacts 881 and 877 to the conductor C895 extending to Fig. 16. In Fig. 16, the ground potential applied to the conductor C895 completes a circuit for operating the magnet RM1661 of the sender switch 1660. Since the pulse relay R880 is intermittently operated at the rate of ten pulses per second under control of the pulse generator 700, it interrupts the last-mentioned circuit, at its contacts 881, a corresponding number of times, thereby to control the magnet RM1661 to advance its wipers step-by-step at the rate of ten steps per second. As a further result of the operation of the relay R870, at its contacts 872, it applies ground potential via the contacts 861 and the conductor C894 extending to Fig. 16, in order to operate the rotary magnet RM1651 of the send sequence switch 1650. At its contacts 875, the relay R870 completes an obvious circuit for illuminating the sending lamp 883 in order to indicate that the director is performing its impulse sending operation. Finally, at its contacts 878, the relay R870 applies a direct ground potential to the conductor C468, either by way of the contacts 867 and 882, or by way of the contacts 867, conductor C975, home and first contacts accessible to wiper 1663, conductor C899, the resistor 843, and contacts 898, to the conductor C468. As long as the wiper 1663 is in engagement with its home and first contacts, the impulsing contacts 882 will be short circuited, but as soon as the wiper 1663 is stepped beyond its contact 1 the short circuit will be removed from the impulsing contacts 882 so that they then will be effective to transmit impulses over the conductor C468 to the line relay R530 in the primary selector 500A.

Before describing further operations of the sender switch 1660 and the send sequence switch 1650, it should be noted that the former is controlled by the impulsing relay R880 to advance its wipers 1663 to 1667, inclusive, step-by-step at the rate of ten impulses per second, whereby the wipers 1665 and 1666 may simultaneously test the associated contacts for the code markings applied thereto by the WXYZ wipers 1655 to 1658, inclusive, of the send sequence switch 1650. The wipers 1665 and 1666 engage the contacts 3 to 12, inclusive, during the stepping movement thereof and these contacts will be marked with ground potential applied to the wipers 1655 to 1658 by the WXYZ code marking conductors accessible to the last-mentioned wipers. The wipers 1655 to 1658, inclusive, as they are advanced over the associated bank contacts 1 to 6, inclusive, selectively connect the WXYZ11 conductors C1744 to WXYZ16 conductors C1749 of the correspondingly designated route registers in the coder 1800 to the appropriate contacts accessible to the wipers 1665 and 1666. The contacts 7 to 13, inclusive, accessible to the wipers 1655 to 1658, inclusive, terminate respectively the WXYZ21 to WXYZ27 code marking conductors extending to the various registers in the call register 1500. The contacts 16 and 17 of these wipers terminate respectively the WXYZ81 and WXYZ82 code marking conductors extending to a set of terminals which may be permanently marked in accordance with at least two digits whereby the director may route an eight-digit called number to an operator position. In view of the foregoing, it will be appreciated that the wipers 1655 to 1658, inclusive, of the sender sequence switch 1650 successively test the code marking conductors WXYZ11 to WXYZ16, and WXYZ21 to WXYZ27 to determine the digit registers in the correspondingly designated registers. The wipers will test the WXYZ81 and WXYZ82 conductors only in the event an eight digit number is registered in the director. As the sender switch 1660 advances its wipers 1665 and 1666 over its contacts 3 to 12, inclusive, it will test the WXYZ conductors to determine the digit that is registered in the particular register connected through the wipers 1655 to 1658, inclusive. Therefore, upon each cycle of rotation of the wipers of the sender switch 1660 one of the registered digits is determined and a corresponding number of switch controlling impulses will be transmitted over the impulsing conductor C468 in order to control the setting up of the telephone connection.

When a particular digit is determined by the sender switch 1660 the transmission of switch setting impulses will be terminated and the sender switch 1660 will automatically be controlled to first advance its wiper step-by-step in a rapid manner to the contacts 14 under control of the self-interrupting contacts 1662 on the rotary magnet RM1661; secondly, to advance its wipers step-by-step over its contacts 14 to 19, inclusive, at the rate of ten pulses per second; and finally, to advance its wiper to the home contact positions at the rapid rate, under control of the self-interrupting contacts noted above. The slow rate of stepping of the wipers over contacts 14 to 19, inclusive, provides the digit spacing or interdigital pause between the transmission of successive impulse trains constituting successive digits. The interdigital pause is accomplished under the joint control of the sender switch 1660 and the digit space relay R860. After each registered digit has been transmitted by the sender switch 1660, the send sequence switch 1650 will advance its wipers an additional step in order to select the WXYZ code marking conductors of the next registered digit and to extend such code markings to the bank contacts accessible to the wipers 1665 and 1666 of the sender switch 1660.

Returning again to the operations which occur immediately after the pulse control relay R870 operates, it will be seen that the first time the pulse relay R880 operates, it completes the circuit at its contacts 881 (previously traced) for energizing the rotary magnet RM1661 of the sender switch 1660. The magnet RM1661 operates to prepare the sender switch 1660 to advance its wipers from engagement with the home contacts into engagement with the contacts 1 in the associated contact banks. At the end of the first pulse, that is when the relay R880 restores to normal, the contacts 881 are opened in order to interrupt the circuit and thus restore the magnet RM1661 to normal. The restoration of the magnet RM1661 advances the wipers 1663 to 1667 into engagement with the contacts 1 in the associated contact banks.

The next operation of the pulsing relay R880 reoperates the magnet RM1661. At the end of the pulse, the magnet RM1661 restores to normal and advances its wipers into engagement with the contacts 2. No pulses are transmitted over the conductor C468 to the line relay R530 in the primary selector during the time the wiper 1663 engages the home contact and the contact 1, due to the fact that the contacts 882 are short circuited, as previously noted. It is convenient to mention at this time that the short circuit is removed from the contacts 882 during the time that the wiper 1663 engages the contacts 2 to 12, inclusive, and that the short circuit is replaced during the time that the wiper 1663 engages the contacts 13 to 24, inclusive.

The next time that the pulse relay R880 operates, after the wiper 1663 is in engagement with contact 2, an impulse is transmitted at the contacts 882 over the previously traced circuit including the impulsing conductor C468 to the line relay R530 and at the same time an impulse is transmitted at the contacts 881 over the conductor C895 to the rotary magnet RM1661. When the relay R880 restores, the impulse transmitted over the conductors C468 and C895 is terminated. Accordingly, the line relay R530 in the primary selector 500A restores and reoperates to control the first vertical step of the associated wipers in a conventional manner and the magnet RM1661 operates and restores to advance its wipers into engagement with the contacts 3 in the associated contact banks. In this manner the pulse relay R880 simultaneously repeats the impulses over the impulsing conductor C468 and the conductor C985 in order simultaneously to control the line relay R530 in the primary selector and the magnet RM1661 in the sender switch 1660. After the wipers 1665 and 1666 reach the contact 3 in the associated contact banks, the testing circuit is prepared for determining the digit that is registered in the register selected by the send sequence switch 1650.

In the present example it has been assumed that the digit 4 has been registered in the WXYZ11 register relays of the first route register in the coder 1800. Therefore, the X11 and Y11 relays, in their operated positions, apply the marking ground potential to the X11 and Y11 conductors in the cable C1744 extending to Fig. 16. Referring now to Fig. 16 it will be seen that the WXYZ11 conductors in the cable C1744 terminate, respectively, on the contacts 1 now engaged by the wipers 1655 to 1658, inclusive. Since only the X11 and Y11 conductors are marked with ground potential in accordance with the registered digit 4, the wipers 1665 and 1666 of the sender sequence switch 1660 do not find the ground potential on the associated bank contacts until these wipers have been stepped from the contacts 3 to the contacts 6. As soon as the wipers 1665 and 1666 engage the contacts 6, a circuit will be completed for simultaneously energizing both the left and the right-hand windings of the digit stop relay R920.

At the end of the fourth impulse transmitted over the conductor C468 by the pulse relay R880 the wipers of the sender switch 1660 will be advanced into engagement with the contacts 6 in the associated contact banks. The ground potential applied to the X11 code marking conductor in the cable C1744 will be extended via the wiper 1656, in engagement with contact 1, wiper 1665, in engagement with contact 6, conductor C976 extending to Fig. 9, and the right-hand winding of the digit stop relay R920 to battery. The right-hand winding of the relay will energize over the above-traced circuit, but the relay is constructed so that it will not operate its associated contacts unless the left and right-hand windings thereof are simultaneously energized. In the present example the left-hand winding of the relay R920 is energized by the ground potential applied to the Y11 code marking conductor in the cable C1744 over a circuit, including the wiper 1657, in engagement with contact 1, wiper 1666 in engagement with contact 6, conductor C974 extending to Fig. 9, and the left-hand winding of the digit stop relay R920 to battery. Since the two windings of the relay R920 are simultaneously energized, the relay operates its contacts 921, thereby to complete an obvious circuit for operating the digit space relay R860. As soon as the last-mentioned relay operates it completes a locking circuit for itself which includes its contacts 865, conductor C890 extending to Fig. 16, wiper 1664 in engagement with any one of its contacts 1 to 24, inclusive, conductor C788 extending to Fig. 8, the contacts 897 and the grounded contacts 751 of the operated seizure relay R750.

From the foregoing it will be understood that the digit stop relay R920 is operated when the wipers of the sender switch 1660 engage contacts in the associated contact banks marked in accordance with a registered digit; that the relay R920 operates the digit space relay R860; and that the digit space relay R860 will be locked in its operated position until the sender switch 1660 has completed a cycle of operation and has again returned its wipers to the some contact positions. As a further result of the operation of the digit space relay R860, at its contacts 866, it places a short circuit around the impulsing circuits 882 via the resistor 843 and the contacts 898. Also, at its contacts 866, the relay R860 completes a test circuit for the left-hand winding of the delay send relay R910 and, at its contacts 867, it removes the ground potential from the impulsing contacts 882. In view of the foregoing it will be appreciated that the pulses transmitted over the conductor C468 to the line relay R530 in the primary selector 500A are terminated by the operation of the digit space relay R860.

The relay R910 is provided in order to prevent the sending of the impulses of the next digit over the conductor C468 in the event that the next impulse receiving switch in the switch train over which the connection is to be completed is not in condition to receive the impulses transmitted by the director. If the next switch in the switch train is not in condition to receive the impulses of a digit, it returns a ground potential over the conductor C468 in order to energize the left-hand winding of the relay R910. This circuit may be traced from the conductor C468 via the contacts 866 or 922, the left-hand winding of the relay R910, contacts 868 and 934, and the resistor R923, to battery. The right-hand winding of the relay R910 is also energized over a circuit, including grounded contacts 753'. The relay R910, if operated over the above-traced circuit, completes, at its contacts 911, a circuit for retaining the relay R860 in its operated position even though the digit stop relay R920 has restored to normal and the locking ground potential has been removed from the conductor C890. In other words, the delay send relay R910, in its operated position, will prolong the operation of relay R860 until the next switch in the switch train is in condition to receive the next series of impulses, at which time the ground potential will be removed from the conductor C468 to restore the delay send relay R910 to normal.

For the purpose of this description it will be assumed that the delay send relay R910 is not operated. As a further result of the operation of relay R860, at its contacts 864, it interrupts the circuit for the pulse control relay R870 which now restores to normal. At its contacts 863, the relay R860 connects the pulse control relay R870 to the conductor C893 so that the latter relay may be reoperated at a predetermined point during the automatic stepping of the wipers of the sender switch 1660. Also, at its contacts 861, the relay R860 removes ground potential from the conductor C894, thereby to permit the magnet RM1651 of the send sequence switch 1650 to restore to normal and advance its wipers into engagement with the contacts 2 in the associated contact banks.

As soon as the relay R870 restores to normal, at its contacts 871 and 873, it completes points in the circuits which control the sender switch magnet RM1661 so that the wipers thereof will be automatically advanced, at a high rate of speed, from the engaged contacts 6 to the contacts 14. The circuit for operating the magnet RM1661, may be traced from ground via the wiper 1667 in engagement with the contact 6, conductor C898 extending to Fig. 8 (multiply connected to all of the contacts 1 to 12, inclusive), contacts 871, conductor C897, interrupter contacts 1662, and the winding of the magnet RM1661, to battery. The magnet RM1661 operates when the circuit is completed and interrupts its circuit at its contacts 1662. The magnet now restores to normal and advances its wipers an additional step in a counterclockwise direction. In this manner the wipers 1663 to 1667, inclusive, of the sender switch 1660 are advanced step-by-step from the engaged contacts 6 to the contacts 13 in the associated contact banks. As soon as the wiper 1667 disengages the associated contact 12, and steps to the contact 13, the self-interrupting circuit for the magnet RM1661 is interrupted and a separate circuit is completed via the conductor C896, contacts 873 and 871, conductor C897, self-interrupting contact 1662, and the winding of the rotary magnet RM1661, to battery. The magnet RM1661 again operates and restores, in the manner previously described, and advances its wipers into engagement with the contacts 14. In this position, the wiper 1667 extends ground potential via the conductor C893 (multiply connected to the contacts 14 to 19, inclusive), contacts 863, winding of the pulse control relay R870, and the resistor 879, to battery. Accordingly, it will be seen that when the wiper 1667 engages the contact 14, the circuit for stepping the wipers of the sender switch 1660 is transferred from the automatic self-interrupting circuit for advancing the wiper at a rapid rate, to a circuit which advances the wipers step-by-step at the rate of ten pulses per second over the contacts 14 to 19, inclusive. As soon as the above traced circuit is completed the relay R870 operates and, at its contacts 877, it recompletes the previously traced circuit for pulsing the rotary magnet RM1661 under control of the contacts 881 of the pulse relay R880. Therefore, the wipers 1663 to 1667, inclusive, are advanced step-by-step over the contacts 14 to 19, inclusive, at the rate of ten steps per second and when the wiper 1667 disengages the contact 19, the above traced impulsing circuit for the magnet RM1661 is interrupted. The circuit for retaining the pulse relay R870 in its operated position is maintained as long as the wiper 1667 is in engagement with any one of the contacts 14 to 19, inclusive, and as soon as the wiper 1667 disengages the contact 19, the relay R870 restores. As soon as the relay R870 restores it again completes, at its contacts 871 and 873, the previously traced self-interrupting circuit for the magnet RM1661, Consequently, the wipers 1663 to 1667, inclusive, are again advanced at a rapid rate over the contacts 20 to 24, inclusive, and as soon as the wiper 1667 disengages the contact 24, the self-interrupting circuit of the magnet RM1661 is terminated. Furthermore, when the wiper 1664 disengages the contact 24, the ground potential on the conductor C788 is disconnected from the conductor C890 in order to interrupt the locking circuit for the digit space relay R860. The relay R860 now restores to normal and again conditions the various circuits to transmit the next digit registered in the director.

In view of the foregoing description of the operation of the director to transmit the first routing digit, it will be understood that the sender switch 1660 is controlled to advance its wipers over its contacts in order to transmit a series of impulses corresponding to the numerical value of the digit registered in the first route register of the coder 1800 which is selected by the send sequence switch 1650. It will also be understood that the sender switch 1660 returns its wipers back to the home contacts, first at a rapid rate, then at the rate of ten pulses per second, and finally, at a rapid rate in order to provide an interdigital pause between the transmission of each series of impulses. When the digit space relay R860 restores to normal at the end of the above described cycle of operation, the circuits are again in condition to repeat the cycle of operation in order to transmit digit registered in the WXYZ12 register relays of the second route register in the coder 1800.

It will be recalled that the digit space relay R860 operates under control of the digit stop relay R920, as soon as the impulses of the first routing digit 4 are transmitted. The relay R860, at its contacts 861, interrupts the circuit for the magnet RM1651 of the send sequence switch 1650 which restores to normal and advances its wipers 1653 to 1658, inclusive, into engagement with the contacts 2 in the associated contact bank. As soon as the wiper 1654 engages the contact 2, it applies ground potential to the conductor C1832 extending to Fig. 18. In Fig. 18, it will be seen that the conductor C1832 is connected to a series circuit including back contacts of each of the register relays WXYZ12, the skip common conductor C1831 extending to Fig. 16, the self-interrupting contacts 1652, and the winding of the magnet RM1651. Similar circuits including, respectively, the conductors C1833 to C1836, inclusive, for the respective third, fourth, fifth and sixth route registers in the coder 1800 are also provided for controlling the operation of the magnet RM1651. Each of the above-mentioned circuits may be completed only in the event that a digit is not registered in the associated route register. In the present example the digit 8 is registered in the X12 relay of the second route register in the coder 1800. However, no digits are registered in the third, fourth, fifth and sixth route registers. Since the X12 relay in the second route register is operated, the above-traced series circuit including the conductors C1832 and C1831 is interrupted in order to prevent the magnet RM1651 of the send sequence switch 1650 from being operated. The locking ground potential applied to the conductor C787, which retains the X12 relay in its operated position, is further extended via the X12 conductor in the cable C1745 to the wiper 1656 of the send sequence switch 1650, thereby to indicate that the digit 8 is registered in the second route register.

Figure 8:
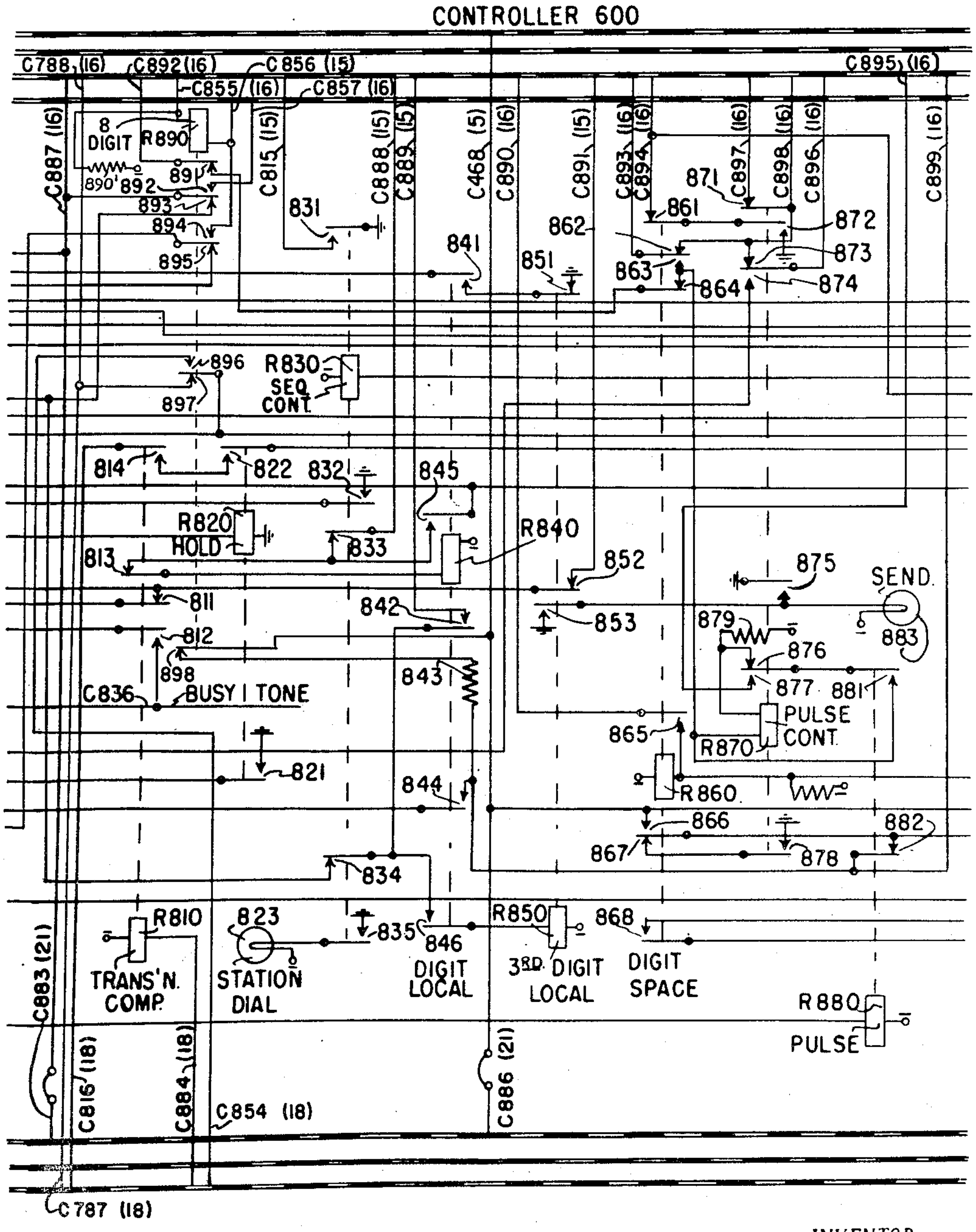

With the wiper 1653 in engagement with the contact 2, the ground potential applied to the conductor C977 is connected via the conductor C892 extending to Fig. 8, contacts 891 and 864, winding of the pulse control relay R870, and the resistor 879, to battery. The relay R870 now reoperates in order to provide the pulsing ground for controlling the magnet RM1661 of the sender switch 1660, in the manner previously described. Consequently, the wipers 1663, to 1667, inclusive, are advanced step-by-step to search for the code marking ground potentials applied to the contacts accessible to the wipers 1665 and 1666 through the WXYZ wipers 1655 to 1658, inclusive, by the second route register in the coder 1800. The operations of the sender switch 1660, the pulse control relay R870, the pulse relay R880, the digit stop relay R920, and the delay send relay R910, are the same as has been previously described. It will be understood that when the wiper 1665 engages the contact 10 in the associated contact bank, the ground potential applied thereto via the wiper 1656 from the X12 marking conductor in the cable C1745 will be applied to the conductor C976 in order to energize the right-hand winding of the digit stop relay R920. Simultaneously therewith the direct ground potential connected to the contact 10 engaged by the wiper 1666 is applied to the conductor C974 in order to energize the left-hand winding of the digit stop relay R920. Accordingly, the two windings of the relay R920 are simultaneously energized in order to operate the relay and thereby recomplete the previously traced circuit for operating the digit space relay R860.

As the wipers 1665 and 1666 are advanced step-by-step from the contacts 2 to the contacts 10, eight impulses are transmitted over the conductor C468 by the pulse relay R880 in order to control the setting of the second switch in the switch train in accordance with the second routing digit 8. During the stepping of the wipers 1665 and 1666, circuits may be completed at different times for either the right-hand or left-hand winding of the digit stop relay R920, but it is not until these wipers reach the contacts 10 that circuits are completed for simultaneously energizing both windings of the relay R920 to terminate the transmission of the impulses constituting the second routing digit.

The operations which now take place are substantially the same as those previously described, whereby the sender switch magnet RM1661 is self-interruptedly controlled to advance its wipers step-by-step to the contacts 14, whereby the wipers are advanced step-by-step under control of the pulse relay R880 over the contacts 14 to 19, inclusive, at ten pulses per second, and whereby the wipers are advanced step-by-step over the contacts 19 to 24, inclusive, into engagement with the home contact position under control of the self-interrupting circuit for the rotary magnet RM1661. In this manner the sender switch 1660 completes the second cycle of operation to transmit the second routing digit 8 registered in the WXYZ12 register relays in the second route register of the coder 1800 and to provide the interdigital pause after the transmission of the second routing digit 8.

Since no routing digits are registered in the third, fourth, fifth and sixth route registers of the coder 1800, it is essential that the send sequence switch 1650 be automatically controlled to advance its wipers over the contacts 3 to 6, inclusive, in order to skip the above-noted registers. Therefore, at the end of the transmission of the second routing digit 8, the digit space relay R860 interrupts, at its contacts 861, a point in the circuit for the magnet RM1651. The magnet RM1651 thereupon restores to normal and advances its wipers into engagement with the contacts 3 thereof. In this position, the wiper 1654 applies ground potential to the conductor C1833 extending to Fig. 18, and then through the left-hand break contacts (not shown) of the four unoperated WXYZ13 register relays in the third route register of the coder 1800, the skip conductor C1831 extending to Fig. 16, the interrupter contacts 1652, and the winding of the magnet RM1651, to battery. The magnet RM1651 now operates and when it is fully operated, it interrupts its own circuit, at it contacts 1652, and restores to normal in order to advance the wipers 1653 to 1658, inclusive, from engagement with the contacts 3 into engagement with the contacts 4. In this position, the wiper 1654 applies ground potential to the conductor C1834, whereby a similar self-interrupting circuit is completed for the magnet RM1651, which circuit includes the normally closed left-hand break contacts of the unoperated WXYZ14 register relays in the fourth route register of the coder 1800 and the skip conductor C1831. The magnet RM1651 thereupon operates and restores in order to advance its wipers into arrangement with the contacts 5 in the associated contact banks. In this position the wiper 1654 applies ground potential to the conductor C1835 in order to again complete the circuit for operating the magnet RM1651 through the left-hand break contacts of the unoperated WXYZ15 register relays in the fifth route register of the coder 1800. When this circuit is completed the rotary magnet RM1651 again operates and restores in order to advance its wipers into engagement with the contacts 6. In this position the wiper 1654 applies ground potential to the conductor C1836 whereby the circuit is now completed through the left-hand break contacts of the unoperated WXYZ16 register relays of the sixth route register in the coder 1800. The magnet RM1651 again operates and restores, thereby to advance its wipers into engagement with the contacts 7. The above described operations whereby the wipers of the send sequence switch 1650 are automatically advanced step-by-step from the contacts 2 into engagement with the contacts 7, in order to skip the unoperated registers in the coder 1800, is started as the digit space relay R860 is operated, and it is completed within a very short interval of time, usually before the wipers of the sender switch 1660 have completed their cycle of operation and have been returned to their home contact positions.

The operations which now take place depend upon the operated and restored conditions of the TA, TB, HM and TD control relays R1890, R1885, R1880, and R1875 in the coder 1800. These relays, it will be recalled, store certain control information as determined by the operation of a selected translator relay in the translator 1300. In the present example the TB control relay R1885 has been operated and locked to the grounded conductor C787A. By referring to Fig. 8, it will be seen that conductors C1837, C1838, and C1839, which are respectively connected to the contacts 7, 8 and 9 accessible to the wiper 1654, are normally connected to the skip conductor C1831 via contacts of the TA and TB control relays R1890 and R1885. With only the TB control relay R1885 operated, it disconnects the conductor C1839 from the skip conductor C1831, at its contacts 1887, whereas the conductors C1837 and C1838 remain connected to the skip conductor C1831 by way of the contacts 1894 and 1893, respectively, of the unoperated TA control relay R1890. Consequently, when the wiper 1654 of the send sequence switch 1650 engages the contact 7, ground potential is applied via the conductor C1837 and the contacts 1894 to the skip conductor C1831, in order to again complete the self-interrupting circuit for the magnet RM1651. Accordingly, the magnet RM1651 advances its wipers into engagement with the contacts 8. In this manner, the send sequence switch 1650 will skip the digit registered in the first code register 1520 and marked on the WXYZ21 code marking conductors terminating in the bank contacts accessible to the wipers 1655 to 1658, inclusive.

The wiper 1654 now applies ground potential via the conductor C1838 and the contacts 1893, to the skip conductor C1831, in order to control the magnet RM1651 to advance its wipers into engagement with the contacts 9. In this manner, the send sequence switch 1650 skips the digit registered in the second code register 1530 and marked on the WXYZ22 code marking conductors terminating in the bank contacts accessible to the wipers 1655 to 1658, inclusive. In this position the wiper 1654 applies ground potential to the conductor C1839, but inasmuch as the TB control relay R1885 has opened its contacts 1887, the ground potential is not applied to the skip conductor C1831. In other words, the operation of only the TB control relay R1885 has determined that the send sequence switch 1650 should skip the digits registered on the first and second code registers 1520 and 1530, and that the sender switch 1660 should send out the digit registered in the third code register 1540 and marked on the WXYZ23 code marking conductors. The advancement of the wipers 1653 to 1658, inclusive, from the contacts 2 to the contacts 9, and the tests performed over the corresponding contacts of the wipers 1654 are all completed during the interdigital pause provided after the transmission of the second routing digit 8.

When the wipers of the sender switch 1660 have completed the second cycle of operation by returning to the home contact positions, the locking ground potential retained on the conductor C890 by the wiper 1664 is removed therefrom in order to restore the digit space relay R860 to normal. In response to the restoration of the relay R860, the contacts 864 are again closed in order to complete the previously traced circuit for the pulse control relay R870. Relay R870 reoperates and reinitiates the cycle of operation whereby the sender switch 1660 advances its wipers over the associated contact banks to transmit impulses in accordance with the value of the digit registered in the third code register 1540. In the present example, the digit 1 is registered in the third code register 1540 and consequently the wipers 1544 and 1545 are in engagement with the contacts 1 in order to apply a marking ground potential to the W23 and X23 code marking conductors. Since the WXYZ23 code marking conductors are connected respectively to the contacts 9 engaged by the WXYZ wipers 1655 to 1658, inclusive, the ground potential applied to the W23 and X23 code marking conductors is connected to the contacts 3 accessible to the wipers 1665 and 1666 of the sender switch 1660. Therefore, when the wipers 1665 and 1666 engage the contacts 3, the first impulse will be transmitted over the conductor C468 by the pulse relay R880. At this instant the ground potential applied to the contacts 3 engaged by the wipers 1665 and 1666 will complete the previously traced circuits for energizing the left and right-hand windings of the digit stop relay R920. The relay R920, at its contacts 921, completes the circuit for the digit space relay R860, and the latter relay locks itself to the grounded conductor C890. During the stepping of the wipers of the sender switch 1660 from the contacts 2 to the contacts 3, one impulse corresponding to the digit 1 registered in the third code register 1540 is transmitted over the conductor C468 to control the next impulse receiving switch in the switch train.

The digit space relay R860, upon operating, again interrupts the circuit for the magnet RM1651 in order to cause the wipers of the send sequence switch 1650 to be advanced into engagement with the contacts 10. Also, the pulse control relay R870, upon restoring to normal, again controls the magnet RM1661 of the sender switch 1660 in order to advance the wipers thereof, in the manner previously described, back to the home contact positions. As soon as the wipers of the sender switch 1660 are again returned to the home contact positions the digit space relay R860 is restored to normal and the circuit for operating the pulse control relay R870 is again prepared at the contacts 864.

Since the relay R870 must operate to initate each cycle of operation in the sender switch 1660, circuits have been provided whereby a test is made to determine whether or not the sender switch 1660 has reached a point in the sending out of the digits registered in the call register 1500 which corresponds to a numerical register which is being controlled from the calling subscriber dial. In other words, if the calling subscriber should register the first three digits of the called office code portion of a directory number and should then delay in dialing the remaining digits of the numerical portion of the called number, it is possible for the sender switch 1660 to transmit all of the routing digits and all of the digits registered in the code registers 1520, 1530 and 1540 before the calling subscriber has registered a digit in the first numerical register 1610. In the latter event, the sender switch 1660 will test the first numerical register 1610 before attempting to send out the digit registered therein. If no digit is registered in the first numerical register 1610, the send sequence switch 1650 will prevent the operation of the pulse control relay R870 until after the calling subscriber has registered the first numerical digit of the called number in the first numerical register 1610. It may be well to point out at this time that if the subscriber delays in the dialing of any of the digits of the called number for more than a predetermined length of time, the director is arranged to automatically time-out and disconnect itself from the calling subscriber line.

In order to prevent the sender switch 1660 from getting ahead of the registration of the digits in the numerical registers 1610, 1620, 1630 and 1640, the controller 600 portion of the director is provided with corresponding relays R940, R950, R960 and R990, which are sequentially operated in response to the operation of each of the above-noted numerical registers to register a digit. More specifically, the relay R940 is provided to indicate when the first numerical digit has been registered in the first numerical register 1610. As previously noted, the sequence switch 1510 has its wipers in engagement with the contacts 4 during the time that the calling subscriber is dialing the fourth digit of a called number, which digit is the first digit of the numerical portion of the called number. The impulses of this digit are transmitted over the conductor C717, the wiper 1514, and the conductor C1554, to the first numerical register 1610, and thereafter the wipers of the switch 1510 are immediately advanced into engagement with the contacts 5, thereby to prepare the circuit for registering the second numerical digit in the second numerical register 1620. As soon as the wiper 1515 of the sequence switch 1510 engages contact 5, a circuit is completed from ground at the contacts 757 of the operated seizure relay R750, and then via the contacts 895, conductor C794 extending to Fig. 16, wiper 1515 and the engaged contact 5, conductor C979 extending to Fig. 9, and the winding of the relay R940, to battery. The relay R940 operates, and at its contacts 942 it locks itself to ground at contacts 754. The operated condition of relay R940 indicates that a digit has been registered in the first numerical register 1610. At its contacts 941, the relay R940 applies the ground potential at the contacts 751 to the conductor C978 extending to Fig. 16, and then via the contact 10 engaged by the wiper 1653 of the send sequence switch 1650, conductor C892 extending to Fig. 8, contacts 891 and 864, winding of the pulse control relay R870, and the resistor 879, to battery. The relay R870 now operates and reinitiates the cycle of operation of the sender switch 1660 whereby the digit registered in the first numerical register 1610 is transmitted to the switch train in the manner previously described.

Before proceeding with the description of the operations which now occur as a result of the operation of relay R870 it should be understood that the second numerical send relay R950, the third numerical send relay R960, and the fourth numerical send relay R990 are successively operated, over circuits similar to those described above for operating the first numerical send relay R940, as the second, third and fourth numerical digits are successively registered in the second, third and fourth numerical registers 1620, 1630 and 1640. These relays, of course, are operated over circuits including the wiper 1515 of the receive sequence switch 1510 as the wiper successively engages the sixth, seventh and eighth contacts in the associated contact bank. At the contacts 951, 961 and 991 these relays apply ground potential respectively to the conductors C980, C982 and C985, which terminate respectively in the contacts 11, 12 and 13 accessible to the wiper 1653 of the send sequence switch 1650.

When the pulse relay R870 operates, in response to the registration of the first numerical digit in the register 1610, it controls the sender switch 1660 to transmit a number of pulses corresponding to the digit registered in the first numerical register 1610. It should be noted, however, that as soon as the wipers of the switch 1650 engage, the contacts 10 a test is made by the ground potential on the wiper 1654 to determine whether or not the digit registered in the register 1610 should be transmitted. This test is made over the conductor C1840 extending to Fig. 18, to the contacts 1876 of the TD control relay R1875. Since the relay R1875 is in its normal position, the contacts 1876 thereof will be opened and no ground potential will be applied to the skip conductor C1831. In the positions 11, 12 and 13, the wiper 1654 will also test the conductors C1841, C1842 and C1843 to determine whether or not the digit registered in the second, third and fourth numerical registers 1620, 1630 and 1640 are also to be transmitted. In the present example, each of the digits registered in the numerical registers of the call register 1500 will be transmitted. When the wipers 1665 and 1666 of the sender switch 1660 have found the contacts in the associated contact banks which are marked in accordance with the digit registered in the first numerical register 1610, the digit stop relay R920 will be operated, in the manner previously described, in order to terminate the transmission of the impulses corresponding to the digit registered in the register 1610. The remaining operations whereby the digit space relay R860 and the pulse control relay R870 cooperate with the sender switch 1660 to provide the interdigital pause between the transmission of successive digits and to return the wipers of the switch 1650 to the home contact positions is the same as has been previously described.

If it is assumed that the remaining three digits of the called number are registered in the second, third and fourth numerical registers 1620, 1630 and 1640, the WXYZ25, WXYZ26 and WXYZ27 code marking conductors will be marked accordingly. Thereafter, the send sequence switch 1650, the sender switch 1660, the digit space relay R860, the pulse control relay R870, and the digit stop relay R920 will cooperate, in the manner described above, to control the transmission of impulses corresponding to the registered digits to the digit receiving switches in the switch train, in order to complete the telephone connection to the desired called subscriber line. It may be well to mention at this time, however, that the sender switch 1660 is prevented from sending out the last digit of a called subscriber directory number in the event that the call recorder 2000 (Figs. 19 to 22) has not performed all of its operations by the time the sender switch 1660 is ready to transmit the last digit.

The blocking of the sender switch 1660 to prevent the transmission of the last digit is controlled over the conductor C986 on a seven-digit called number. This conductor will be grounded in order to control the pulse relay R870 only when the call recorder 2000 has completed its normal operations.

After the sender switch 1660 has transmitted the last digit registered in the fourth numerical register 1640, the send sequence switch magnet RM1651 is controlled by the operation of the digit space relay R860, in the manner previously described, to advance its wipers from engagement with the contacts 13 into engagement with the contacts 14. The wiper 1654 in engagement with the contact 14 applies ground potential via the conductor C887 extending to Fig. 8 contacts 893 and the lower winding of the director release relay R780, to battery. The director release relay R780 now operates and locks itself, via its contacts 786, to ground at contacts 754; it controls the release of the director from the calling subscriber line, in the manner previously described; and it controls the director test relay R510, in the manner previously described, in order to connect the calling subscriber line to the connection which has been set up over the various switches in the switch train to the called subscriber line. Before the director release relay R780 is operated to control the release of the director, it should be understood that the call recorder 2000 illustrated in Figs. 19 to 22, inclusive, must have performed all of its operations, including the identification of the directory number of the calling subscriber substation.

*Operation of the call recorder 2000*

A description will now be given of the mode of operation of the call recorder 2000 illustrated in Figs. 19 to 22, inclusive. Before proceeding with the description it should be noted that in Fig. 19 the detector 1900 has been schematically illustrated by means of a block diagram, and that the conductors connected to the block diagram have been designated, for the most part, with the same designations that appear in the detector 1900, illustrated in the John E. Ostline application Serial No. 79,677, filed March 4, 1949. The detector 1900 represented in the block diagram is the same as the detector 1900 shown and described in the last-mentioned Ostline application, and the various conductors are identified by the same designations in order to correlate the operation of the present system with the operation of the detector 1900. The detailed operation of the detector 1900 in the present application is identical with the operation of the detector 1900, illustrated in the above-noted Ostline application, and it will be understood from the following description that upon seizure, the detector will associate itself with the calling call recorder 2000, it will identify the numerical portion of the directory number of the calling subscriber substation on a terminal per station basis, and it will store the number identifying the calling subscriber substation on the code storage relays WXYZ1 to WXYZ5, inclusive.

The call recorder 2000 is also provided with a code send switch 1950 which is arranged to transmit to the toll ticketing repeater 2300A included in the connection, the various items of record information which are stored either in the code storage relays of the call recorder 2000 or which are stored in the various registers of the call register 1500. As previously noted, the call recorder 2000 is also provided with a plurality of calling station identifying relays (Fig. 20) which are controlled by the calling devices at the calling party-line subscriber substations for the purpose of marking the party 1 to the party 5 conductors C1906 to C1909 and C1909′ in accordance with the position of the calling station on a party line. The conductors C1906 to C1909, inclusive are connected respectively to the party 1 to the party 4 relays provided in the detector 1900 of the Ostline application Serial No. 79,677 and illustrated in Fig. 5 thereof, in order to control the detector to search for the identity of the particular calling station on a calling line in the manner described in the said Ostline application. Since the present application is arranged for five subscriber substations on a party line, an additional party 5 conductor C1909' is also connected to the detector 1900 and it is connected to a party 5 relay thereat, in the manner described above, so that the detector 1900 will search for the calling line in a group of lines including only the fifth subscriber substations on the party lines of the system. Since the latter modification of the detector 1900 in the Ostline application Serial No. 79,677, merely comprises the addition of a party 5 relay and associated circuits which are substantially identical to the four-party relays, and associated circuits illustrated therein, it is not deemed necessary to enlarge upon the disclosure of the present detector 1900 to include the circuit details of the modification.

Figure 22:
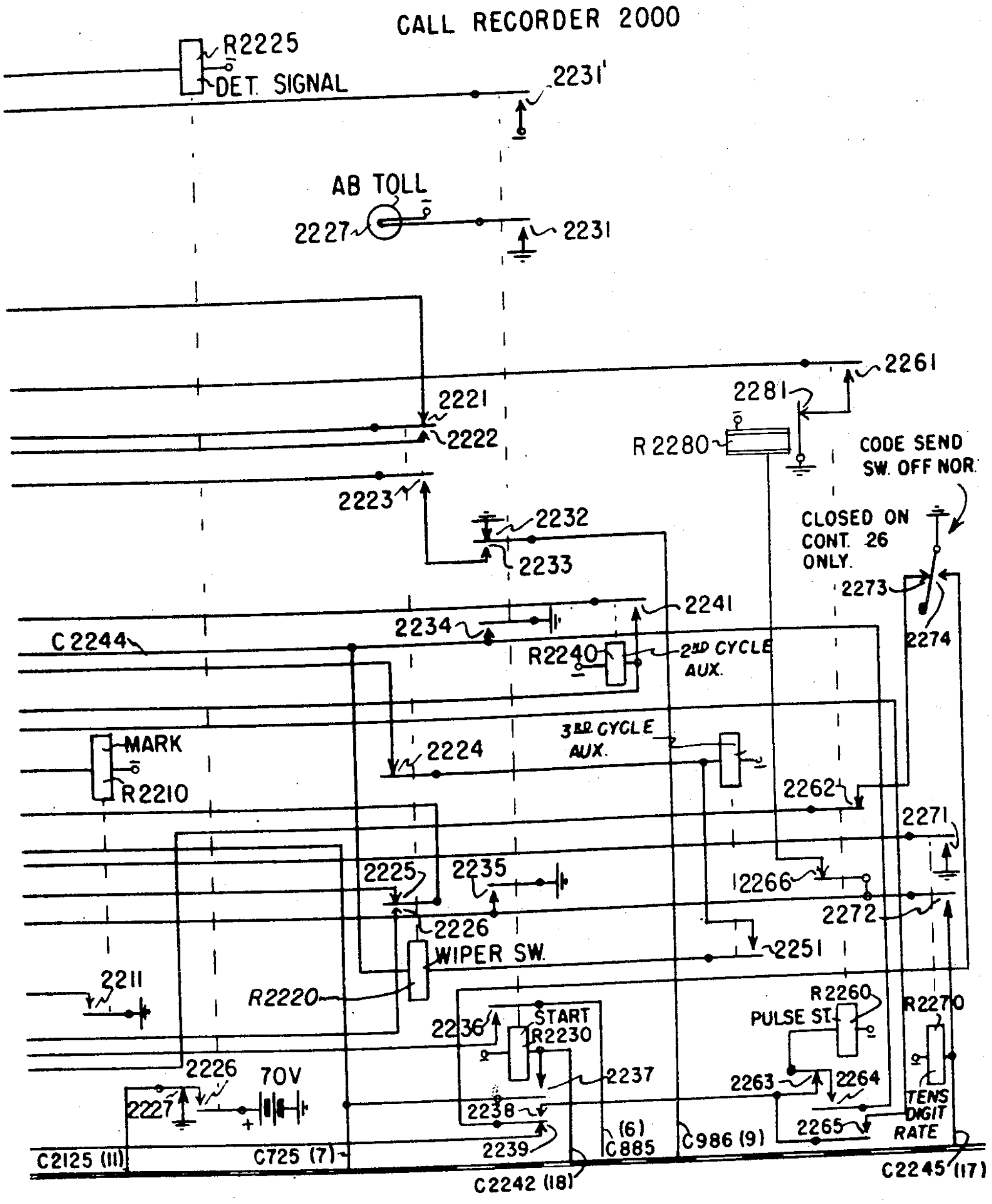

In the previous description of the mode of operation of the controller 600 portion of the director it was pointed out that as soon as the director was seized the seizure relay R750 operated and, at its contacts 757, applied ground potential to the conductor C725 extending to Fig. 22, in order to operate the relay R2105 in the call recorder 2000. The last-mentioned relay is operated as soon as the director is seized in order to prevent the subsequent operation of the detection complete relay R2120 until after the detector 1900 has completed the detection cycle and has identified the calling line. It will also be recalled from the previous description of the operation of the coder 1800 that the translator 1300 completed a circuit for operating the start relay R2230 in the call recorder 2000 in order to indicate that the call recorder 2000 is required in the present telephone connection. In other words, the operation of the call recorder 2000 is, for all practical purposes, initiated in response to the operation of the start relay R2230.

Figure 9:
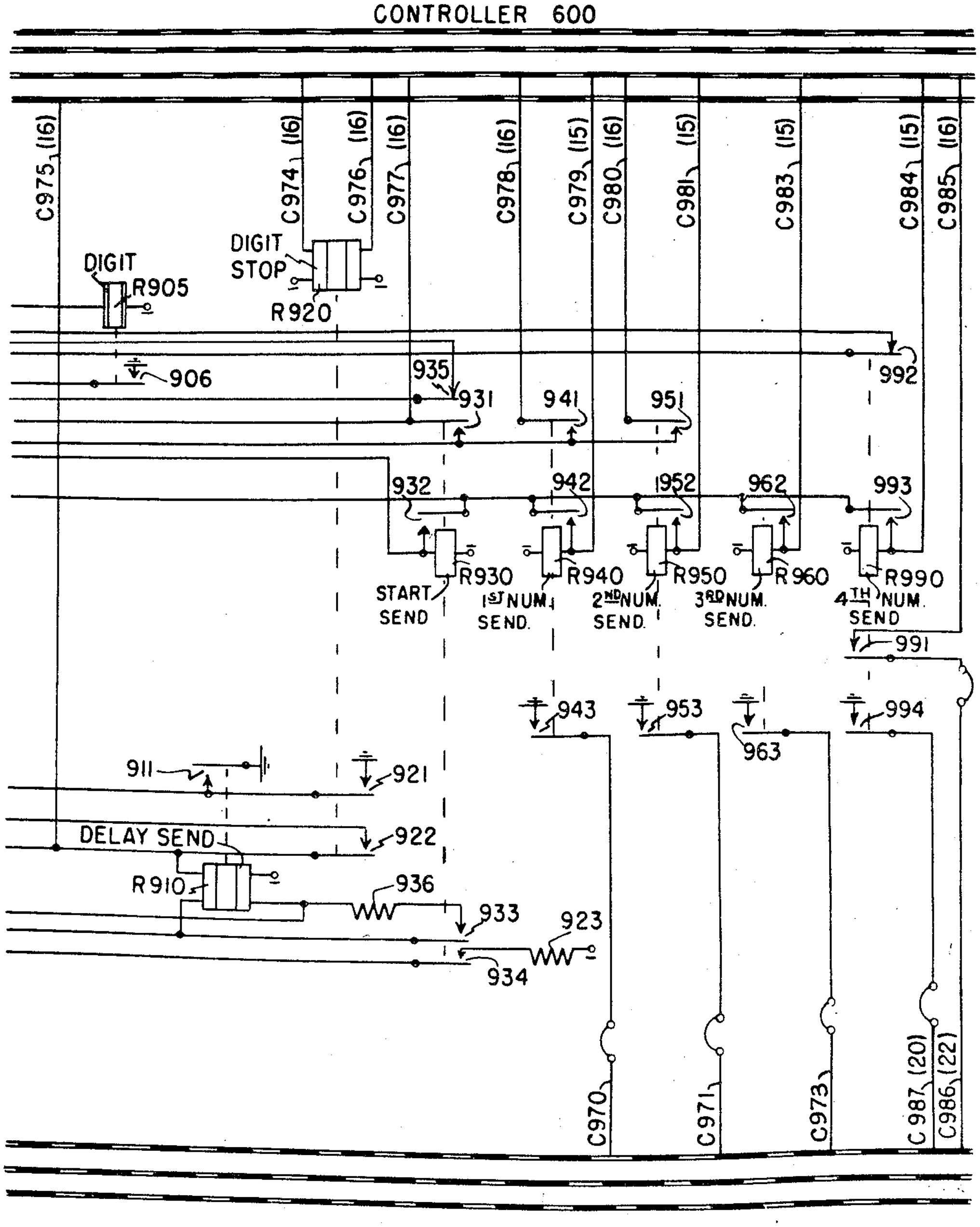

When the start relay R2230 operates, at its contacts 2234, it applies a holding ground potential to the conductor C2244; at its contacts 2232, it removes ground potential from the conductor C986 extending to Fig. 9, in order to prevent the sender switch 1660 from transmitting the digit registered in the fourth numerical register 1640; and, at its contacts 2231, it completes an obvious circuit for illuminating the AB toll lamp 2227 in order to indicate that the call recorder 2000 is being utilized in an AB toll connection. As a further result of the operation of the relay R2230, at its contacts 2238, it prepares a point in the circuit for the pulse start relay R2260; at its contacts 2236, it connects the T conductor C885 to the lower winding of the code send relay R2140; and at its contacts 2235, it completes a circuit, including the contacts 2136, 2124 and 2112, for operating the detector start relay R2070. At its contacts 2235, the relay R2230 completes a circuit including contacts 2266 for operating relay R2280. The relay R2070, at its contacts 2071, applies ground potential to the start conductor C1903 and, at its contacts 2172, it removes the busy marking ground potential from the guard conductor C1902'. The last-mentioned circuits, including the start conductor C1903 and the guard conductor C1902', control the association of the detector 1900 with the particular calling call recorder 2000.

It should be understood that the call recorder 2000 is one of a plurality of call recorders, each of which is individually associated with a particular director, and that the detector 1900 is common to all of the call recorders provided in the telephone exchange. Consequently, when the detector start relay R2070 operates and applies ground potential to the start conductor C1903, it simultaneously removes the busy marking ground potential from the guard conductor C1902'. The grounding of the start conductor C1903 controls the finder in the detector 1900 to search for the particular calling call recorder 2000, which is now marked as the calling recorder by the removal of the busy marking ground potential from the guard conductor C1902'. All other call recorders are, at the present time, marked with a busy marking ground potential on the associated guard conductors. The rotary magnet ROT of the Finder in the detector 1900 automatically advances the wipers 597 and 597A over the associated bank contacts until the wiper 597 engages the ungrounded guard conductor C1902'. Simultaneously therewith, a ground potential connected to the wiper 597A of the Finder in the detector 1900 is applied to the holding conductor C1902 in order to operate the detector test relay R2110 in the call recorder 2000 over a circuit, including the contacts 2125, 2135 and 2231'. As a further result of the grounding of the start conductor C1903, the detector 1900 operates in the manner described in detail in the Ostline application Serial No. 79,677, filed March 4, 1949, to identify the number of the calling subscriber line.

When the detector test relay R2110 operates, in response to the association of the detector 1900 with the call recorder 2000, it completes, at its contacts 2113, an obvious circuit for operating the detector connect relay R1910 whereby various conductors of the detector 1900, which are common to all call recorders, are individually connected to the call recorder 2000, over the contacts 1911 to 1926, inclusive. At its contacts 2112, the relay R2110 interrupts the circuit for the detector start relay R2070 which now restores to normal in order to remove the ground potential from the start conductor C1903 and to apply the busy marking ground potential to the guard conductor C1902'. Since the operation of the detector 1900 has been started, however, it continues to operate until it has identified the number of the calling subscriber line. As a further result of the operation of relay R2110, at its contacts 2111, it connects the winding of the detection signal relay R2225 to the SB conductor C1901. The latter relay, however, will not be operated by the detector 1900 until the detector has been controlled over one of the party 1 to party 5 conductors in accordance with the position of the particular calling station on the calling party line.

Figure 20:
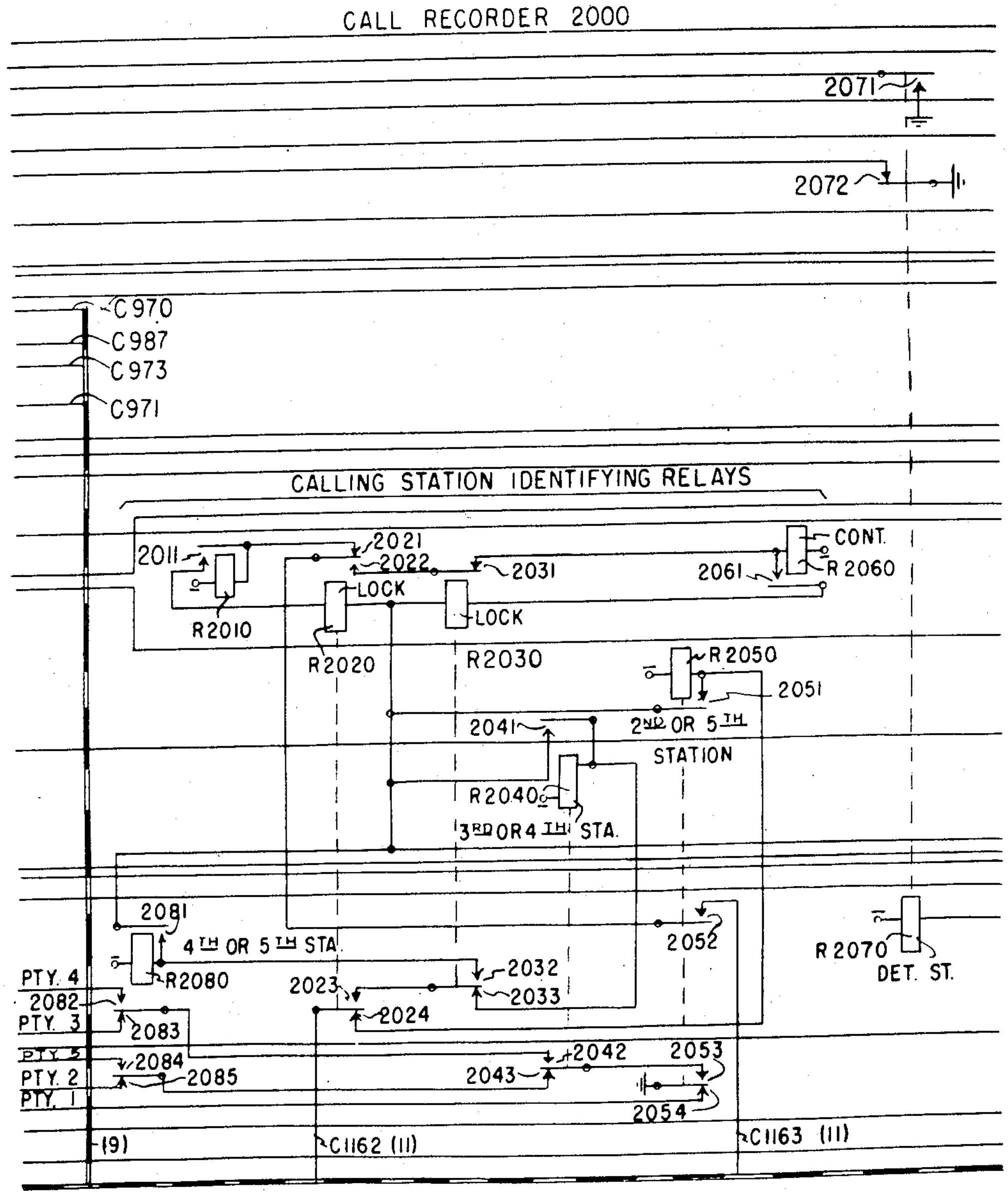
Figure 21:
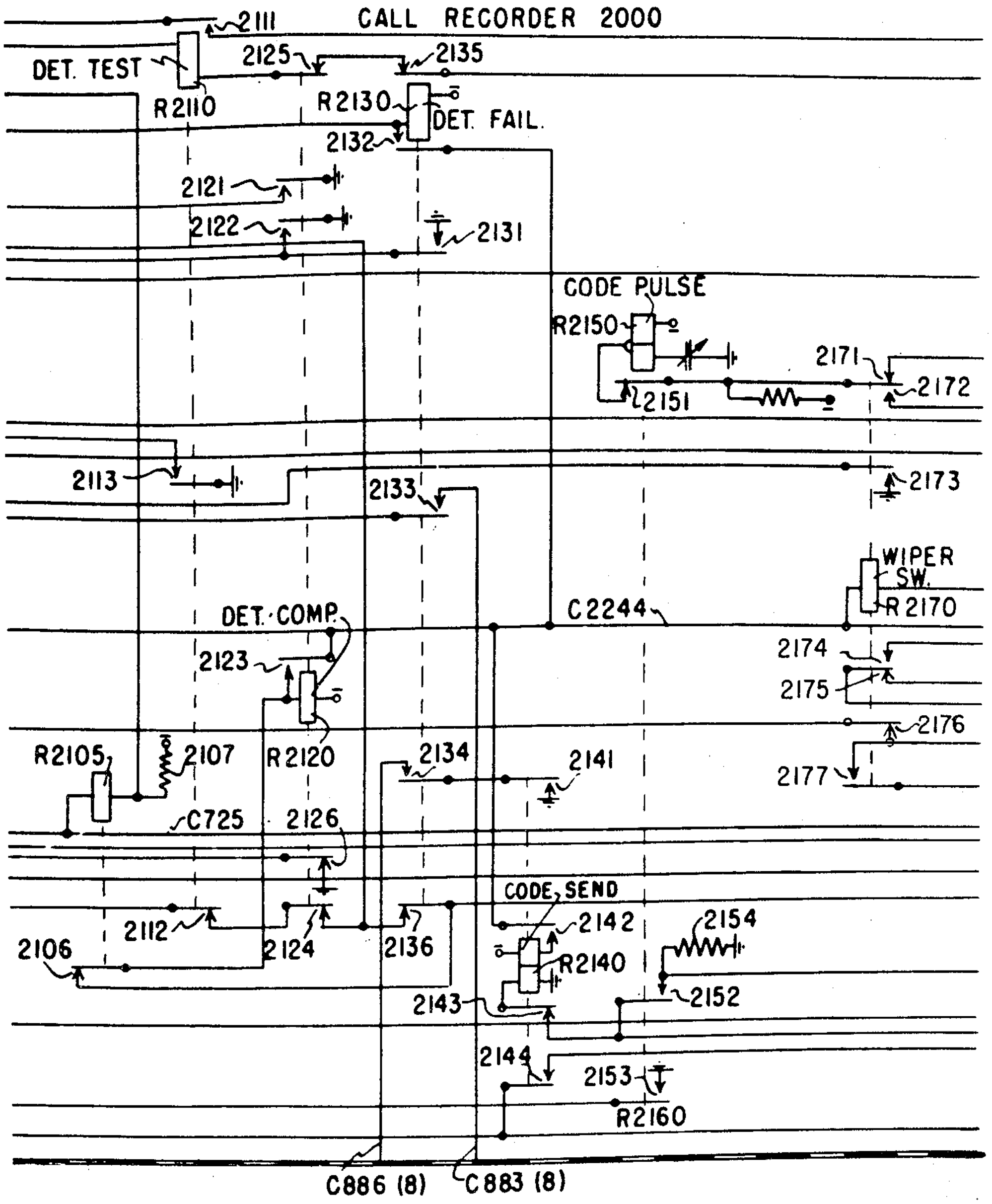

In the previous description of the operation of the calling station identifying relays illustrated in Fig. 20, it was pointed out that these relays were operated in certain combinations in accordance with ground and loop impulses transmitted, by the special calling devices provided at the second to the fifth substations on five-party lines. It was also pointed out that if the calling station is connected to an individual line, or is the first station on a five-party line, no station identifying ground impulses are transmitted and consequently, all of the calling station identifying relays of Fig. 20 remained in their unoperated positions. It was also pointed out that the calling station identifying relays were selectively operated to apply a marking ground potential to any one of the party 1 to party 5 conductors in accordance with the position of the calling station on the different subscriber lines. Therefore, when the detector connect relay R1910 is operated it connects the various party conductors, noted above, to the conductors C1906 to C1909, inclusive, and C1909', and depending upon the position of the calling station on the calling line, one of the above-noted conductors is grounded. The ground potential applied to any one of the above conductors selectively controls the detector to determine the group of lines in which the detector must search to find and identify the directory number of the calling subscriber substation. As soon as the party marking is registered in the detector, over any one of the party conductors C1906 to C1909, inclusive, and C1909', it applies a ground potential to the SB conductor C1901 in order to operate the detection signal relay R2225.

The detection signal relay R2225, in its normal position, supplies the holding ground potential to the sleeve conductor of the calling line in order to retain certain of the switching apparatus in its operated position and in order to mark the calling line as busy to other switching apparatus having access thereto. More specifically, at its contacts 2227, the relay R2225 normally connects ground potential via the conductor C2125 extending to Fig. 11, conductor C473 extending to Fig. 5, wiper 458A of the director hunter 450A, conductor C506A, contacts 516 of the operated director test relay R510, conductor C446A, line finder 440A, and the wiper 436A, conductor C431A, line circuit 405A, and the C conductor extending to the connector banks. The ground potential normally applied to the above circuit provides the holding ground potential for maintaining the line finder 440A in its operated position, for retaining the cut-off relay (not shown) in the line circuit 405A in its operated position, and for maintaining a busy marking ground potential on the C conductor extending to the bank contacts of the various connectors in the exchange having access to the calling line.

However, as soon as detection signal relay R2225 operates, as described above, it removes the direct ground potential from the above-traced circuit, at its contacts 2227, and, at its contacts 2226, it applied the 70-volt positive booster battery to the above-mentioned circuit. This positive booster battery potential retains the line finder 440A and the line circuit 405A in their operated positions, and it also maintains the busy marking potential upon the C conductor. In addition to the foregoing, the 70-volt positive booster battery is also extended over an "S" lead, which is individual to the particular calling subscriber substation, to the detector 1900 illustrated in Fig. 19. In response to the booster battery potential applied to the above-described circuit, the detector 1900 operates, in the manner described in the above-mentioned Ostline application, Serial No. 79,677, to register therein the thousands, hundreds, tens and units digit of the numerical portion of the directory number of the particular calling subscriber substation. When the detector 1900 has determined the digital value of the thousands digit of the calling subscriber number, the four WXYZ2 code marking conductors, schematically illustrated and designated C1930, will be marked in code form in accordance with the identified digit, and the digit will be registered in the WXYZ2 code storage relays in the call recorder 2000. The hundreds, tens, and units digits of the calling station directory number, as determined by the detector 1900, will also be transferred to and registered in the respective WXYZ3, WXYZ4, and WXYZ5 code storage register relays, in the manner noted above. In addition to the foregoing, the detector 1900 also marks the WXYZ1 code marking conductors in accordance with the exchange digit of the three digit office code identifying the particular exchange in which the calling line terminates. The digit identifying the calling exchange is registered in code form in the WXYZ1 code storage relays. At the conclusion of the operation of the detector, the last five digits of the calling subscriber directory number will be registered in the code storage relays WXYZ1 to WXYZ5, inclusive, in the call recorder 2000. The operated ones of the various code storage relays will be locked in their operated positions to the grounded conductor C2244.

When the detector 1900 has completed the identification of the calling substation directory number, it connects ground potential to the EB conductor C1904 in order to short-circuit the relay R2105. The latter relay is normally retained in its operated position by the seizure relay R750 in the controller 600 portion of the director. Consequently, when the relay R2105 restores to normal, at its contacts 2106, it now completes a circuit for operating the detection complete relay R2120, which may be traced from ground at the contacts 2235. The relay R2120 now locks itself in its operated position via its contacts 2123 to the grounded conductor C2244. As a further result of the operation of the relay R2120, at its contacts 2125, it interrupts the circuit for the detector test relay R2110. The latter relay now restores to normal and interrupts, at its contacts 2113, the circuit for the detector connect relay R1910. The latter relay now restores to normal and disconnects the call recorder 2000 from the common detector 1900. At its contacts 2111, the relay R2110 also interrupts the circuit for the detection signal relay R2225 which also restores to normal and, at its contacts 2226 and 2227, substitutes the direct ground holding potential for the 70-volt positive booster battery potential applied to the conductor C2125. Although the relay R2105 may reoperate when the shunting ground potential is disconnected therefrom by the restoration of the relay R1910, it performs no further function at the present time inasmuch as the detection complete relay R2120 is now locked in its operated position.

As a further result of the operation of relay R2120, at its contacts 2121, it applies ground potential to the multiply connected contacts 4 to 23, inclusive, accessible to the wiper 1951; at its contacts 2122, it applies ground potential to the contact 2 accessible to the wiper 1951; at its contacts 2124, it interrupts the circuit for the detecor start relay R2070. Finally, at its contacts 2126, the relay R2120 disconnects ground potential from the marking conductor X10 connected to the contact 2 accessible to the wiper 1955. Further operations of the call recorder 2000 will be initiated when the director has transmitted sufficient digits to include the toll ticket repeater 2300A in the telephone connection and has caused the connected ticket repeater to return a starting potential over the T conductor C885.

Before leaving the description of the operation of the call recorder 2000, it should be noted that the INC conductor C1905 is provided to cause the operation of the detection failure relay R2130 whenever the detector 1900 fails to find and register the number of the calling subscriber substation. The inability of the detector 1900 to detect a calling subscriber number is described in detail in the previously mentioned Ostline application Serial No. 79,677, and for the purpose of describing the detection failure condition, it will be assumed that the detector failed to identify the calling line and, as a result thereof, applied ground potential to the INC conductor C1905 in order to operate the relay R2130. Upon operating, the relay R2130, at its contacts 2132, locks itself to the grounded conductor C2244. It should be understood, however, that in response to a detection failure condition, the detection complete relay R2120 will not be operated. As a further result of the operation of the detection failure relay R2130, at its contacts 2133, it prepares a point in the circuit for applying ground potential to the conductor C883 extending to Fig. 8, in order subsequently to complete an operating circuit for the director release relay R780. Also, at its contacts 2134, the relay R2130 prepares a point in the circuit for applying ground potential to the R conductor C886 extending to Fig. 8, in order to prevent the director from transmitting further impulses to the switch train included in the partially completed connection. Further operations of the call recorder 2000 and other portions of the associated director, as a result of a detection failure condition registered on the relay R2130, will be described hereinafter.

*Transmission of the items of record information*

Referring now to the schematic trunking diagram shown in Fig. 2, it will be seen that a call on any subscriber line will be extended via its associated line circuit 405A to 405H, inclusive, the finder 440A, 440B or 440C, the primary selector 500A, 500B or 500C, and the director hunter 450A, 450B or 450C, to the director 300. The director 300 is individually associated with the call recorder 2000 which in turn is controlled by the detector 1900 to register the calling station directory number. All of the digits of a called subscriber directory number, as dialed by the calling subscriber, are registered in the director and the translator 1300 is associated with the director, by means of the translator assigner 1000, in order to register in the coder 1800 portion of the director the route digits for routing the telephone connection in the direction of the called destination. During the time that the detector 1900 is operating to detect the calling subscriber directory number, the director 300 is controlled, in the manner described above, to transmit the route digits to the primary selector 500A, 500B or 500C and the subsequent switches in the switch train. In the present call the first routing digit 4 transmitted by the director, controls the primary selector 500A to raise its wipers to the fourth level and to automatically select an idle toll ticket repeater, such as the ticket repeater 2300A. The second routing digit 8 transmitted by the director, controls the ticket repeater selector 2700A, associated with the selected ticket repeater, to raise its wipers to the eighth level and to automatically select an idle toll line to the EMpire 1 exchange by way of a repeater, such as the repeater 305. The remaining digits transmitted by the director are repeated over the selected toll line to the switching apparatus in the EMpire 1 exchange. As soon as the above-mentioned connection is extended to the toll ticket repeater 2300A, it functions, in the manner described in the previously noted Ostline application, Serial No. 75,985, filed February 12, 1949, to return a battery potential over one of the incoming conductors included in the connection in order to signal the associated call recorder 2000A that it may start the code sending operation to be described hereinafter.

Referring now to Fig. 5, it will be assumed that battery potential returned from the ticket repeater 2300A is applied to the conductor C2306, and that it is further extended via the wiper 564A of the operated primary selector 500A, contacts 524, 515, and 525, conductor C502A, wiper 454A of the director hunter 450A, conductor C469 extending to Fig. 6, conductor C885 extending to Fig. 22, contacts 2236 of the operated start relay R2230, contacts 2143, and the lower winding of the code send relay R2140, to ground. The code send relay R2140 now operates in order to initiate the code sending operation of the call recorder 2000 whereby the registered items of record information, including the directory number of the calling subscriber substation and the directory number of the called subscriber substation, are transferred from the call recorder 2000 to the toll ticket repeater 2300A. The record information which is transferred to the toll ticket repeater 2300A is registered therein and made available, at the termination of the connection, to produce a record of the various items of information required in ticketing the present toll call.

When the code send relay R2140 operates, it locks itself in its operated position over a circuit including its upper winding, the contacts 2142, and the grounded conductor C2244. Also, at its contacts 2143, the relay 2140 disconnects its lower winding from the T conductor C885. Finally, at its contacts 2144, the relay R2140 completes a circuit for operating the rotary magnet RM1957 of the code send switch 1950. This circuit may be traced from ground via the code send switch off-normal contacts 2273, contacts 2262, 2144, and 1958, and the winding of the rotary magnet RM1957, to battery. The magnet RM1957 operates and then interrupts its own circuit, at its contacts 1958, whereupon the magnet restores to normal and advances its wipers 1951 to 1956, inclusive, from the normal resting position 26 into engagement with the contacts 1 in the associated contact banks. In response to the advancement of the wipers from position 26 to contact 1, the code send switch off-normal contacts 2273 are opened and the contacts 2274 are closed. It should be noted that the code send switch off-normal contacts 2274 remain closed as long as the wipers of the code send switch 1950 engage any one of the contacts 1 to 25, inclusive, and that the contacts 2273 are closed only when the wipers are in position 26 of the associated contact banks.

As soon as the contacts 2273 are opened, the initial operating circuit for the magnet RM1957 is interrupted and as soon as the contacts 2274 are closed, a circuit is completed via the contacts 2238 and 2263, and the winding of the pulse start relay R2260, to battery. The pulse start relay R2260 now operates and locks itself, via its contacts 2264, to the grounded conductor C2244 and simultaneously therewith, at its contacts 2263, it interrupts its initial operating circuit. As a further result of the operation of the pulse start relay R2260, at its contacts 2261, it prepares a point in the circuit for the upper winding of the code pulse relay R2150. Also, at its contacts 2266, the relay R2260 interrupts the circuit for the slow-to-release relay R2280. The relay R2280 is slow-to-release so that the associated ticket repeater may condition itself to receive the items of information transmitted by the call recorder 2000. When the relay R2280 restores, at its contacts 2281, it completes a circuit including contacts 2261, 2171 and 2151 for operating relay R2150. Upon operating, the relay R2150, at its contacts 2151, interrupts its initial operating circuit, whereupon the relay restores to normal and recompletes its operating circuit as soon as the contacts 2151 are again closed. The cyclic operation of the relay R2150 occurs at the rate of ten pulses per second under control of the variable discharge condenser connected to the local circuit including the lower winding of the relay. Therefore, the code pulse relay R2150 will continue to operate and restore at a predetermined rate as long as the circuit is completed for its upper winding.

As soon as the wipers 1951 to 1956, inclusive, of the code send switch 1950 engage the contacts 1 in the associated contact banks, the wiper 1954 connects the W6 code marking conductor to a circuit, including the winding of the mark relay R2210. The WXYZ6 and WXYZ7 code marking conductors are connected, respectively, to the contacts 1 to 8, inclusive, accessible to the wiper 1954 and each of the marking conductors are connected to the terminal block TB1959. The two groups of WXYZ conductors are provided so that they may be marked in accordance with the tens and units digits identifying the particular call recorder 2000. In the present example, the WXYZ6 code marking conductors are marked in accordance with the tens digit 1 and the WXYZ7 code marking conductors are marked in accordance with the units digit 2. Therefore, the W6 and X6 code marking conductors are grounded to indicate the tens digit 1, and the W7 and Y7 code marking conductors are grounded to indicate the units digit 2. When the wiper 1954 engages the contact 1, the ground potential applied to the W6 code marking conductor is extended via the contacts 2176 and the winding of the mark relay R2210, to battery. The mark relay R2210 now operates and, at its contacts 2211, applies direct ground potential to the contacts 2152 of the code pulse relay R2150 in order to short-circuit the resistance ground potential normally applied to these contacts by way of the resistor 2154. Since the above-traced circuit for the mark relay R2210 is completed prior to the operation of the code pulse relay R2150, the first time the relay R2150 operates the direct ground potential, applied to its contacts 2152, is transmitted via the contacts 2236 and the T conductor C885, to the ticket repeater 2300A over the previously traced circuit whereby the ticket repeater controlled the initial operation of relay R2140. The toll ticket repeater 2300A is provided with code marking and stepping relays which are selectively controlled either by direct ground or resistance ground impulses to register the various items of information transmitted thereto in the same manner as is described in the Ostline application, Serial No. 75,985. Since the schematically illustrated toll ticket repeater 2300A is exactly the same as the toll ticket repeater illustrated and described in the above-mentioned Ostline application, the description of the operation thereof will be omitted in the present application.

The first operation of the code pulse relay R2150 also completes, at its contacts 2153, an operating circuit for the magnet RM1957. At the end of the first pulse, the relay R2150 restores and, at its contacts 2152, it removes the ground pulse from the T conductor C885. At its contacts 2153, the relay R2150 interrupts the circuit for the magnet RM1957 which now restores to normal and advances its wipers from engagement with the contacts 1 into engagement with the contacts 2. In view of the above description, it will be understood that upon each operation of the code pulse relay R2150, either a direct ground or a resistance ground pulse will be transmitted over the T conductor C885 to the toll ticket repeater 2300A, and a pulse will also be transmitted to the magnet RM1957 in order to advance its wipers step-by-step over the associated contact banks. The transmission of a direct ground or a resistance ground pulse over the conductor C885 is determined in accordance with either the operated or the unoperated condition of the mark relay R2210. The operated or unoperated condition of the mark relay R2210, in turn, is governed in accordance with the particular code markings applied to the various code marking conductors accessible to the wiper 1954. It is in this manner that the various items of information stored in the call recorder 2000 and in the call register 1500 portion of the director are transmitted, in code form, to the ticket repeater 2300A.

The items of information picked-up and transmitted as the wiper 1954 of the code send switch 1950 is rotated step-by-step over the contacts 1 to 25, inclusive, are as follows:

WIPER 1954 OF THE CODE SEND SWITCH 1950

| Contact Position | Code Marking | Information Transmitted |
|---|---|---|
| 1 | W6 | Identity of the Director Tens Digit. |
| 2 | X6 | |
| 3 | Y6 | |
| 4 | Z6 | |
| 5 | W7 | Identity of the Director Units Digit. |
| 6 | X7 | |
| 7 | Y7 | |
| 8 | Z7 | |
| 9 | | Stepping Pulse. |
| 10 | W17 | Charge Rate—Units Digit. |
| 11 | X17 | |
| 12 | Y17 | |
| 13 | Z17 | |
| 14 | W21 | Called Station Directory No. 1st Digit. |
| 15 | X21 | |
| 16 | Y21 | |
| 17 | Z21 | |
| 18 | W22 | Called Station Directory No. 2nd Digit. |
| 19 | X22 | |
| 20 | Y22 | |
| 21 | Z22 | |
| 22 | W23 | Called Station Directory No. 3rd Digit. |
| 23 | X23 | |
| 24 | Y23 | |
| 25 | Z23 | |
| 26 | | Stepping Pulse. |

From the foregoing table it will be understood that the tens digit 1 and the units digit 2 identifying the call recorder 2000 will be transmitted in code form to the ticket repeater 2300A as the wiper 1954 is advanced step-by-step over the contacts 1 to 8, inclusive. When the wiper 1954 engages the contact 9 a resistance ground pulse will be transmitted over the T conductor C885.

When the wiper 1954 is successively advanced over the contacts 10 to 13, inclusive, the units digit of the rate of charge for the connection will be transmitted to the toll ticket repeater 2300A. The WXYZ17 code marking conductors in the cable C1850 terminate respectively on the contacts 10 to 13 accessible to the wiper 1954 and they are marked in code form in accordance with the units digit of the rate of charge for a call from a calling subscriber in the FLorida 3 exchange to a called subscriber in the EMpire 1 exchange. As previously indicated, the WXYZ17 code marking conductors in the cable C1850 are marked by the operated rate register relays WXYZ17 provided in the coder 1800 portion of the director. In the present example it may be assumed that the units digit 1 of the rate of charge 01 is registered in the above-noted register relays and that, as a result thereof, the W17 and X17 code marking conductors are marked with ground potential. Therefore, if the wiper 1954 is advanced over the contacts 10 to 13, inclusive, the mark relay R2210 and the code pulse relay R2150 will cooperate to transmit in code form to the toll ticket repeater 2300A, the units digit 1 of the rate of charge for the call.

The next three items of record information to be transmitted from the call recorder to the ticket repeater are the first, second and third code digits of the called subscriber directory number as registered in the first, second and third code registers 1520, 1530 and 1540 in the call register 1500 portion of the director. Consequently, the WXYZ21, the WXYZ22, and WXYZ23 code marking conductors connected respectively to the contacts 14 to 25, inclusive, accessible to the wiper 1954 are marked by the above-noted code registers in accordance with the digits 361 identifying the EMpire 1 exchange. The WXYZ21 to WXYZ23 code marking conductors are included in the cable C2012 extending to Fig. 16, and they are connected respectively to the bank contacts accessible to the wipers 1524 and 1525 of the first code register 1520, the wipers 1534 and 1535 of the second code register 1530, and the wipers 1544 and 1545 of the third code register 1540. Therefore, as the wiper 1954 of the code send switch 1950 advances step-by-step over the contacts 14 to 25, inclusive, the marking relay R2210 and the code pulse relay R2150 will cooperate in the manner previously described to transmit in code form the digits 361, registered in the code registers of the call register 1500, to the toll ticket repeater 2300A.

During the first cycle of operation of the code send switch 1950, the wipers 1951, 1952, 1953, 1955 and 1956 perform no operating controls in the call recorder 2000, but the wiper 1954 is effective during the 25 steps of the first cycle of operation to transmit the above-noted items of information to the toll ticket repeater 2300A. During the time that the wipers of the code send switch 1950 are advancing step-by-step through the first cycle of operation, the ground potential at the code send switch off-normal contacts 2274 retains the second cycle auxiliary R2240 in its operated position over a circuit which includes the contacts 2238, 2265 and 2175, and the winding of the relay R2240. Accordingly, the relay R2240 is retained in its operated position during the first cycle of operation of the code send switch 1950 and as soon as the wipers thereof are advanced into engagement with the contacts 26, the off-normal contacts 2274 are opened and the off-normal contacts 2273 are closed. The contacts 2274 interrupt a point in the original operating circuit for the relay R2240, but simultaneously therewith a locking circuit is completed for the relay which includes its contacts 2241, the winding of the wiper switching relay R2170, and the grounded conductor C2244. The wiper switching relay R2170 operates in series with the relay R2240 and, at its contacts 2172, it connects the code pulse relay R2150 to the wiper 1951 of the code send switch 1950. Also, at its contacts 2177, the relay R2170 connects the mark relay R2210 to the wiper 1955 of the code send switch 1950. In view of the foregoing, it will be understood that the wiper switching relay R2170, places the code pulse relay R2150 under control of ground potential applied to the contacts accessible to the wiper 1951 and it transfers the mark relay R2210 from the wiper 1954 to the wiper 1955 of the code send switch 1950. During the second cycle of rotation of the wipers of the code send switch 1950, a test will be made for code marking potentials applied to the conductors terminating in the bank contacts accessible to the wiper 1955.

When the code send switch 1950 advances its wipers from the contacts 25 into engagement with the contacts 26, as noted above, ground potential is also extended via the wiper 1951 in engagement with its contact 26, the contacts 2221, 2172 and 2151, and the upper winding of the code pulse relay R2150, to battery. As soon as the code pulse relay R2150 operates, it completes, at its contacts 2153, an obvious circuit for operating the rotary magnet RM1957. Also, in response to the operation of the pulse relay R2150, at its contacts 2151, it interrupts its operating circuit and restores to normal, in the manner previously described. At its contacts 2153, the relay R2150 now interrupts the circuit for the magnet RM1957 which also restores to normal and advances the wipers of the code send switch 1950 from engagement with the contacts 26 into engagement with the contacts 1. As a further result of the momentary operation of the code pulse relay R2150, at its contacts 2152, it transmits a resistance ground pulse over the T conductor C885 to the toll ticket repeater 2300A in order to cause a stepping switch thereat to remain in synichronism with the stepping of the wipers of the code send switch 1950. As a further result of the advancement of the wipers of the code send switch 1950 from engagement with the contacts 26 into engagement with the contacts 1, the off-normal contacts 2274 are again closed in order to complete a circuit via the contacts 2238, 2265, 2174 and 2224, in order to operate the third cycle auxiliary relay R2250.

The code send switch 1950 is now conditioned to transmit the various items of record information marked in code form on the marking conductors terminating in the bank contacts 2 to 25, inclusive, accessible to the wiper 1955. These items of record information are transmitted to the toll ticket repeater 2300A in substantially the same manner as has been described above in connection with the step-by-step rotation of the wiper 1954 of the code send switch 1950. It should be noted, however, that the circuit for the pulse relay R2150 is controlled during the second cycle of the code send switch 1950 by ground potential applied to the contacts accessible to the wiper 1951.

The items of record information picked up and transmitted as the wiper 1955 of the code send switch 1950 is rotated step-by-step over the contacts 1 to 25, inclusive, during the second cycle, are as follows:

WIPER 1955 OF CODE SEND SWITCH 1950

| Contact Position | Code Marking | Information Transmitted |
|---|---|---|
| 1 | | Stepping Pulse. |
| 2 | X10 | Detector Failure—If Grounded. |
| 3 | Y18 | Charge Rate: Tens Digit "0" If Not Grounded Tens Digit "1" If Grounded. |
| 4 | W1 | Calling Station Directory No. 3rd Digit. |
| 5 | X1 | |
| 6 | Y1 | |
| 7 | Z1 | |
| 8 | W2 | Calling Station Directory No. 4th Digit. |
| 9 | X2 | |
| 10 | Y2 | |
| 11 | Z2 | |
| 12 | W3 | Calling Station Directory No. 5th Digit. |
| 13 | X3 | |
| 14 | Y3 | |
| 15 | Z3 | |
| 16 | W4 | Calling Station Directory No. 6th Digit. |
| 17 | X4 | |
| 18 | Y4 | |
| 19 | Z4 | |
| 20 | W5 | Calling Station Directory No. 7th Digit. |
| 21 | X5 | |
| 22 | Y5 | |
| 23 | Z5 | |
| 24 | W24 | Called Station Directory No. 4th Digit. |
| 25 | X24 | |
| 26 | | Stepping pulse. |

When the wiper 1955 of the code send switch 1950 is in engagement with the contact 1, no circuit is completed for operating the mark relay R2210 and therefore the code pulse relay R2150 applies an additional resistance ground pulse to the T conductor C885, in order to transmit another synchronizing stepping pulse to the toll ticket repeater 2300A. At the end of the pulse the wipers of the code send switch 1950 are stepped from the contacts 1 into engagement with the contacts 2. In this position, the wiper 1955 again prepares a point in the circuit for controlling the mark relay R2210, and the wiper 1951 completes the previously traced circuit for operating the code pulse relay R2150. If the detector 1900 has failed, for some reason or other, the detection complete relay R2120 will not be operated and, consequently, a direct ground potential will be connected via its contacts 2126 to the X10 code marking conductor and then via the wiper 1955 in order to complete the previously traced circuit for operating the mark relay R2210. If the mark relay R2210 is operated as a result of a detector failure condition, a direct ground pulse is transmitted over the T conductor, C885 to the toll ticket repeater 2300A, and it will cause the latter circuit to connect the calling subscriber line to an intercepting operator position. However, if the detection complete relay has been operated, no ground potential will be applied to the X10 code marking conductor. Therefore, the mark relay R2210 will not operate, and the code pulse relay R2150 will transmit the resistance ground pulse to the ticket repeater 2300A in order to retain the rotary switch in the ticket repeater 2300A in synchronism with the code send switch 1950. The code pulse relay R2150 also causes the wipers of the code send switch 1950 to be advanced from the contacts 2, into engagement with the contacts 3.

When the wiper 1955 engages the contact 3, a circuit is prepared for operating the mark relay R2210, depending upon whether or not the tens digit rate relay R2270 is operated to apply ground potential to the Y18 code marking conductor. As previously noted, the charge rate for the present call is the rate 01 and, consequently, the tens digit rate relay R2270 will not be in its operated position. Therefore, no ground potential will be applied to the Y18 code marking conductor and the mark relay R2210 will not be operated. Consequently, the code pulse relay R2150 will transmit a resistance ground pulse over the T conductor C885 and it will transmit a stepping pulse to the magnet RM1957. A resistance ground pulse transmitted over the T conductor C885 ticket repeater 2300A will indicate that the tens digit of the rate of the present call is the digit 0, which digit will be registered in the toll ticket repeater. It should be noted, however, if the charge rate for the call described is any rate from 10 to 19, inclusive, the tens digit rate relay R2270 will be operated by the appropriate translator relay in the translator 1300. In the latter event the contacts 2271 will be closed in order to apply ground potential to the Y18 code marking conductor and thus complete the operating circuit for the marking relay R2210. The mark relay R2210 will cause the code pulse relay R2160 to transmit a direct ground pulse instead of a resistance ground pulse to the ticket repeater, thereby to cause the registration of the tens digit 0 for the rate of charge for a call. In response to the restoration of the code pulse relay R2150, the wipers of the code send switch 1950 will be advanced from the contacts 3 into engagement with the contacts 4.

Contacts 4 to 23, inclusive, accessible to the wiper 1955 are respectively connected to the WXYZ1 to WXYZ5, inclusive, code marking conductors extending to the correspondingly designated code storage relays. These relays have been operated to register therein the calling exchange digit 3 of the calling FLorida 3 exchange code and the four numerical digits of the numerical portion of the calling subscriber directory number as determined by the detector 1900. As the wipers of the code send switch 1950 are advanced step-by-step over the contacts 4 to 23, inclusive, under control of the code pulse relay R2150, the wiper 1955 successively tests the various code marking conductors in order to complete the circuit for controlling the mark relay R2210. Therefore, as the respective contacts are engaged by the wiper 1955, either a resistance ground pulse or a direct ground pulse will be transmitted over the T conductor C885, thereby to transfer the digits registered in the WXYZ1 to the WXYZ5 code storage relays to the toll ticket repeater 2300A in the manner described hereinbefore.

When the wiper 1951 of the code send switch 1950 is in engagement with the contacts 24 and 25, the operating ground potential for controlling the pulse relay R2150 will be supplied from the conductor C970 extending to Fig. 9. However, this conductor will be grounded only in the event a digit has been registered in the first numerical register 1610 of the call register 1500 and has caused the operation of the first numerical send relay R940 in the controller 600 portion of the director. If ground potential is applied to the above-noted conductor to indicate that the first numerical digit has been registered, the code pulse relay R2150 will again operate and restore in order to control the stepping of the wipers of the code send switch 1950 from engagement with the contacts 24 into engagement with the contacts 25. The contacts 24 and 25 accessible to the wiper 1955 terminate, respectively, the W24 and the X24 code marking conductors extending to the first numerical register 1610 in the call register 1500. Inasmuch as it has been assumed that the first digit of the numerical portion of the called subscriber number is the digit 1, the W24 and X24 code marking conductors will have a direct ground potential applied thereto. Consequently, during the stepping of the wiper 1955 over the contacts 24 and 25 the mark relay R2210 will be operated so that two direct ground pulses will be transmitted by the code pulse relay R2150 over the T conductor C885 to the ticket repeater 2300A to register therein the digit 1.

When the wipers of the code send switch 1950 are in engagement with the contacts 25, the next restoration of the code pulse relay R2150 will control the magnet RM1957 to advance the wipers into engagement with the contacts 26. In this position, the code send switch off-normal contacts 2274 are again controlled, thereby to interrupt a point in the initial operating circuit for the third cycle auxiliary relay R2250. As soon as the above circuit is interrupted, the relay R2250 locks itself in its operated position over a circuit, including its contacts 2251, the winding of the wiper switching relay R2220, and the grounded conductor C2244. When the last-mentioned circuit is completed, the wiper switching relay R2220 operates and, at its contacts 2221, disconnects the code pulse relay R2150 from the wiper 1951. At its contacts 2222, the relay R2220 connects the code pulses relay R2150 to the wiper 1952. Also, at its contacts 2225, the relay R2220 disconnects the mark relay R2210 from the wiper 1955 and, at its contacts 2226, it connects the mark relay R2210 to the wiper 1956. From the foregoing it will be seen that the wiper switching relay R2220 transfers the circuit for controlling the mark relay R2210 from the wiper 1955 to the wiper 1956 and that it also transfers the control circuit for the code pulse relay R2150 from the wiper 1951 to the wiper 1952. In this manner, the call recorder 2000 is conditioned to operate the code send switch 1950 through its third cycle of operation, whereby the information stored in code form and marked on the bank contacts accessible to the wiper 1956 may be transferred to the toll ticket repeater 2300A.

The items of record information picked-up and transmitted as the wiper 1956 of the code send switch 1950 is rotated step-by-step over the contacts 1 to 18, inclusive, during the third cycle are as follows:

WIPER 1956 OF CODE SEND SWITCH 1950

| Contact Position | Code Marking | Information Transmitted |
|---|---|---|
| 1 | Y24 | Called Station Directory No. 4th Digit. |
| 2 | Z24 | |
| 3 | W25 | Called Station Directory No. 5th Digit. |
| 4 | X25 | |
| 5 | Y25 | |
| 6 | Z25 | |
| 7 | W26 | Called Station Directory No. 6th Digit. |
| 8 | X26 | |
| 9 | Y26 | |
| 10 | Z26 | |
| 11 | W27 | Called Station Directory No. 7th Digit. |
| 12 | X27 | |
| 13 | Y27 | |
| 14 | Z27 | |
| 15 | W8 | Class of Calling Line (Any Digit 1 to 0, inclusive). |
| 16 | X8 | |
| 17 | Y8 | |
| 18 | Z8 | |

When the wiper 1952 of the code send switch 1950 engages the contact 26, ground potential therein is applied via the contacts 2222, 2172, and 2151 in order to again complete the circuit for operating the code pulse relay R2150. The code pulse relay R2150 now operates and restores, in the manner previously described, in order to transmit a resistance ground stepping pulse to the toll ticket repeater, and also to transmit a stepping pulse to the magnet RM1957. The wipers of the code send switch 1950 are now advanced into engagement with the contacts 1 in order to begin the third cycle of operation.

The Y24 and Z24 code marking conductors which terminate respectively in the contacts 1 and 2 accessible to the wiper 1956 extend to the first numerical register 1610 of the call register 1500 but, as previously noted, these conductors are not marked at the present time since the digit 1 is registered in the first numerical register 1610. Consequently, the mark relay R2210 will not be operated as the wiper 1956 is advanced over its contacts 1 and 2. In this connection it should be noted that the ground potential applied to the conductor C970 by the first numerical send relay R940 completes the circuit, including either the contact 1 or the contact 2 engaged by the wiper 1952, for controlling the pulse relay R2150. Therefore, the code pulse relay R2150 will transmit two pulses to the magnet RM1957 in order to advance the wipers over the contacts 1 and 2 during the third cycle of operation. Since the Y24 and Z24 code marking conductors are not grounded, the mark relay R2210 will remain in its unoperated position and the code pulse relay R2150 will transmit two resistance ground impulses over the T conductor, C885. At the end of the second pulse, the wipers of the code send switch 1950 will be advanced from contacts 2 into engagement with the contacts 3.

Contacts 3 to 14, inclusive, accessible to the wiper 1956 terminate respectively the code marking conductors WXYZ25 to WXYZ27, inclusive, which conductors are respectively marked, in code form, in accordance with the last three digits of the called subscriber number registered in the second, third and fourth numerical registers 1620, 1630 and 1640 of the call register 1500. In order to control the subsequent pulses transmitted by the code pulse relay R2150, each of the last-mentioned digits must be registered in the call register 1500 before it can be transferred to the ticket repeater 2300A. More specifically, when the wiper 1952 disengages the contact 2, during the third cycle of operation, the operating ground potential applied to the conductor C970 is disconnected from the circuit including the code pulse relay R2150. When the wiper 1952 engages the contact 3, ground potential must be applied to the conductor C971 before the pulse relay R2150 can reoperate to transfer the digit registered in the second numerical register 1620. However, ground potential will be applied to the conductor C971, by the operation of the second numerical send relay R950, only in the event that a digit has been registered in the second numerical register 1620. As soon as the digit is registered, ground potential is applied by way of the conductor C971 to the multiply connected contacts 3 to 6, inclusive, and then via the wiper 1952 to the code pulse relay R2150.

In view of the foregoing it will be understood that the ground potential applied to the conductor C971 will control the code relay R2150 to operate and restore in the manner previously described in order to advance the wipers of the code send switch 1950 step-by-step over the contacts 3 to 6, inclusive, and also in order to transfer, in code form, the digit registered in the second numerical register 1620 to the ticket repeater 2300A. During the stepping of the wiper 1956 over the contacts 3 to 6, inclusive, the mark relay R2210 will be controlled to transmit direct ground pulses in place of a resistance ground pulses in accordance with the code markings applied to the WXYZ25 code marking conductors.

At the conclusion of the transmission of the digit registered in the second numerical register 1620, the wipers of the code send switch 1950 are advanced from the contacts 6 into engagement with the contacts 7. In this position the wiper 1952 engages the first of the four contacts connected to the conductor C973. The conductor C973 will be grounded only in the event that the third digit of the numerical portion of the called subscriber directory number has been registered in the third numerical register 1630 of the call register 1500 and has caused the operation of the third numerical send relay R960. If the conductor C973 is grounded to indicate that the third digit has been registered, the code pulse relay R2150 is controlled, in the manner previously described, to advance the wipers of the code send switch 1950 step-by-step over the contacts 7 to 10, inclusive, of the associated contact banks. As the wiper 1956 is advanced step-by-step over the above-noted contacts, the digit registered in the third numerical register 1630 and marked in code form on the WXYZ26 code marking conductors is transferred to the ticket repeater 2300A by means of the direct ground and resistance ground pulses transmitted over the T conductor C885 under control of the mark relay R2210 and the code pulse relay R2150, in the manner previously described.

When the wipers of the code send switch are advanced from engagement with the contacts 10, the pulsing circuit for the code pulse relay R2150 is again interrupted at the wiper 1952 and when the latter wiper engages the contact 11 a test is made to determine whether or not a digit has been registered in the fourth numerical register 1640. If a digit has been registered in the numerical register 1640, the fourth numerical send relay R990 will be in its operated position and ground potential will be applied to the conductor C987 terminating in the contacts 11 to 18, inclusive, accessible to the wiper 1952. This ground potential will cause the relay R2150 to advance the wipers of the code send switch 1950 over the contacts 11 to 14, inclusive, whereby the code pulse relay R2150 and the mark relay R2210 will function, in the manner previously described, to transmit the digit registered in the fourth numerical register 1640 and marked in code form on the WXYZ27 code marking conductors over the T conductor C885 and also to advance the wipers of the code send switch 1950 over the contacts 15 to 18, inclusive, whereby the code pulse relay R2150 and the mark relay R2210 will function to transmit the digit indicative of the class of the calling line marked in code form on the WXYZ8 code marking conductors, over the T conductor C885.

When the pulse relay R2150 restores to normal to advance the wipers of the code send switch 1950 from the contacts 18, into engagement with the contacts 19, the wiper 1952 interrupts the previously traced circuit for controlling the code pulse relay R2150 in order to prevent the transmission of an additional pulse by the latter relay.

However, since the wiper 1953 is now in engagement with the contact 19 in the associated contact bank, it completes the previously mentioned circuit for unlocking the sender switch 1660 in the director so that it may send out the last digit registered in the fourth numerical register 1640. This digit is not transmitted to complete the connection to a called line until the call recorder 2000 has transferred all of the items of information to the ticket repeater 2300A. This circuit may be traced from ground at contacts 2173 of the operated wiper switching relay R2170, wiper 1953 and the engaged contact 19, contacts 2223, and 2233, conductor C986 extending to Fig. 9, contacts 991 of the operated fourth numerical send relay R990, conductor C985 extending to Fig. 16, contact 13 engaged by the wiper 1653, conductor C892 extending to Fig. 8, contacts 891 and 864, winding of the pulse control relay R870, and the resistor 879, to battery. The relay R870 operates when the above-traced circuit is completed and controls the sender switch 1660, in the manner previously described, to transmit the numerical impulses corresponding to the digit registered in the fourth numerical register 1640.

The transmission of the last digit by the impulse sender 1660 controls the last impulse receiving switch in the switch train to select the terminals of the particular called subscriber line in the EMpire 1 exchange and to signal the subscriber thereon in a conventional manner. The principal reason for preventing the sender switch 1660 from transmitting the last digit of the called number until all of the items of record information have been transferred to the toll ticket repeater 2300A is to eliminate the possibility of a called subscriber answering a call during the period of time that the items of record information are being transmitted from the call recorder 2000 to the ticket repeater 2300A.

From the foregoing it will be seen that when the code send switch 1950 has completed the first, second and third cycles of operation, all of the items of record information will be transferred to the toll ticket repeater 2300A and the director will be controlled to transmit the last digit to complete the connection to the called line. The subsequent release of the call recorder 2000 is controlled in response to the removal of the holding ground potential from the conductor C725 by the controller 600 portion of the director.

In the previous description of the operation of the director it was pointed out that the director release relay R780 is operated after all of the switch controlling impulses have been transmitted. It was also pointed out that during the release of the director, the seizure relay R750 in the controller 600 restores to normal and, at its contacts 757, removed ground potential from the conductor C725 extending to Fig. 22. In the call recorder 2000, the removal of ground potential from the conductor C725 causes various operated relays, including the start relay R2230 to restore to normal. As soon as the start relay R2230 restores to normal, the ground potential, at the contacts 2234, is removed from the conductor C2244 thereby to cause the restoration of various other operated relays in the call recorder 2000. At its contacts 2235, the relay R2230 interrupts the locking circuit for the relay R2270 and, at its contacts 2239, it completes a circuit including the off-normal contacts 2274 and the contacts 1958 for controlling the rotary magnet RM1957. The magnet RM1957 is self-interruptedly operated over the above-traced circuit to advance its wipers step-by-step, from the contacts 19, over the remaining contacts in the associated contact banks until they reach the contacts 26. In this position, the off-normal contacts 2274 are opened in order to terminate the stepping circuit for the magnet RM1957. The call recorder 2000 is now fully restored to normal.

*Class grouping of subscriber lines*

In the previous description of the finder selector-link, comprising 440A and the primary selector 500A, it was pointed out that six separate groups of similar finder-selector links may be provided and that the finder-selector links in each of the six groups may be respectively wired in accordance with six different classes of calling subscriber lines. It was also pointed out that the terminals T11, T13, T17, T20 and T24 in each of the selectors may be strapped together to provide the necessary marking potentials on the conductors C502A and C503A to register in the controller 600 portion of the director the particular class identification of a calling subscriber line.

In Fig. 4 another grouping arrangement of the finder-selector links is illustrated wherein one group of links, including the finder 440C and the primary selector 500C, may be employed to serve three different classes of calling subscriber lines including lines of the class 1, class 2 and class 3 types. The group of finder-selector links, including the finders 440B and the primary selector 500B, may also be provided to serve three additional classes of subscriber lines including the subscriber lines of the class 4, class 5 and class 6 types. As previously noted, the primary selectors 500B and 500C are identical to the previously described primary selector 500A and the finders 440B and 440C are the same as the finder 440A except that they are provided with an additional set of right-normal-post springs which have been designated respectively RNP492B and RNP492C. The T terminals in the group of primary selectors including the primary selector 500C are connected, in the manner illustrated, with the T10 terminal connected to the T17 terminal so that no potential, ground potential or resistance battery potential may be forwarded from the associated finder to the conductor C503C extending to the controller 600 portion of the director in order to register therein with a class 1, a class 2 or a class 3 calling subscriber line. The T terminals in the group of primary selectors including the primary selector 500B are connected, in the manner illustrated, with the T10 and T17 terminals interconnected so that no ground, ground potential or resistance battery potential may be forwarded over the conductor C503B to the controller 600 portion of the director and with the T20 and T24 terminals interconnected so that a ground potential may be forwarded, by way of the lower winding of relay R530, over the conductor C502B to the controller 600 portion of the director.

In view of the previous description of the operation of the controller 600 portion of the director, it will be understood that the class relays R600, R670 and R710 therein are selectively controlled in accordance with the different potentials or absence of potentials on the conductors C469 and C470, applied thereto by the connected primary selector, to register any one of the six different classes of calling subscriber lines.

If it is assumed that the class 1 subscriber at substation 401–C1 initiates a call, the line circuit 405H, the distributor 442C, the finder 440C, the primary selector 500C, and the director hunter 450C will operate in the manner previously described to interconnect the calling subscriber line with an idle director, such as the director illustrated in the drawings. When the calling line is connected to the director the class test of the calling subscriber line is made by cyclically connecting the class test relays R670 and R710 to the conductor C470 and by connecting the class test relay R600 to the conductor C469. Since the calling line is of the class 1 type, the left and right normal-post-springs 491C and 492C will not be operated and consequently no potential will be applied to the conductor C470. Also, in view of the fact that the terminals T20 and T24 in the selector 500C are not interconnected no potential will be applied to the conductor C469. Therefore, the above named class test relays in the controller 600 portion of the director will remain in their normal positions to register the fact that the calling line is of the class 1 type.

If it is assumed that the call is initiated by a class 2 subscriber at substation 401–C2, the line circuit 405G, the distributor 442C, the finder 440C, the primary selector 500C and the director hunter 450C will operate in the manner previously described to interconnect the calling subscriber line with the director. Subscriber lines of the class 2 type are accessible to the finder 440C over a particular level of the associated contact banks and each time the wipers of the finder searches for a class 2 line in that level, the left normal-post-springs 491C will be closed to apply ground potential by way of the conductor C447C, terminals T10 and T17, conductor C503C, and wiper 455C, to the conductor C470 extending to the controller 600 portion of the director. The ground potential applied to the conductor C470 causes the operation of the relay R670 during the class test operation to register the digit 2 indicative to class 2 calling subscriber line.

If any one of the party subscriber substations TS1–3 to TS5–3 of the class 3 type initiates a call, the line circuit 405G individual to the party line, the distributor 442C, the line finder 440C, the primary selector 500C and the director hunter 450C will operate in the manner previously described to interconnect the calling subscriber line and the director. The class 3 subscriber lines are also accessible to the wipers of the finder 440C in a particular level and when the wipers are actuated to that level to search for the calling line, the right normal-post-springs RNP492C are closed to connect a resistance battery potential over the previously traced circuit, instead of a ground potential, to the conductor C470. In the controller 600 portion of the director, the class test relay R710 will be operated during the class test cycle to register the digit 3 indicative of a class 3 calling subscriber line. From the foregoing description it will be appreciated that different classes of calling lines may be served by a single group of finder-selector links and that the class of the particular calling subscriber line will be registered in the controller 600 portion of the director so that the particular digit indicative of the class of the calling line will be subsequently recorded.

The finder-selector links provided in the group including the finder 440B and the primary selector 500B are substantially the same as the finder-selector links described above except that the terminals T20 and T24 are interconnected so that a resistance ground potential will be connected to the conductor C502B at the time, no ground, ground potential or resistance battery potential is applied to the conductor C503B for the class of calling line indication. The manner in which the ground potential is applied to the terminal T24 may best be understood by referring to the primary selector 500A (Fig. 5). It will be recalled that when a director is connected to the primary selector 500A, the director test relay R510 is in its operated position and consequently the contacts 515 thereof are closed. Therefore, ground potential will be connected to the terminal T24 over a circuit including the contacts CAM559, the lower winding of the relay R530, contacts 523 and 515 to the terminal T24. Since the primary selector 500B is wired and connected in this manner the ground potential noted above applied to the terminal T24 will be connected via the terminal T20 to the conductor C502B.

When the class 4 subscriber at substation 401–C4 initiates a call, the line circuit 405E, the distributor 442B, the finder 440B, the primary selector 500B and the director hunter 450B will operate in the manner previously described to interconnect the calling subscriber line with the director illustrated in the drawings. Subscriber lines of the class 4 type terminate in levels accessible to the wipers of the finder 440B that do not cause the operation of the left or the right normal-post-springs LNP491B or RNP492B. Therefore, no potential is applied via the conductor C503B and the wiper 455B to the conductor C470 extending to the controller 600 portion of the director. However, the above noted ground potential now applied to the terminal T24 in the primary selector 500 is connected by way of the terminal T20, the conductor C502B and the wiper 454B to the conductor C469 extending to the controller 600 portion of the director. Since no potential is applied to the conductor C470 and ground potential to the conductor C469, the class test relay R600 only will be operated during class test operation of the director. The operated condition of the relay R600 will register the digit 4 indicative of the class 4 calling subscriber line.

The operation of the equipment in response to the initiation to a call by either a class 5 or a class 6 calling subscriber line, such as 401–C5 and 401–C6 is the same as the operation of the equipment in response to a call initiated by the class 4 subscriber at substation 401–C4. In the case of a class 5 call however, the left normal-post-springs LNP491B apply ground potential over the previously traced circuit to the conductor C470, whereas, in the case of a class 6 calling line, the right normal-post-spring RNP492B of the finder will apply resistance battery to this conductor. The application of ground potential to the conductor C470 and ground potential to the conductor C469 will operate the relays R600 and R670 during the class test cycle in order to register the digit 5 indicative of a class 5 calling subscriber line. On the other hand, the application of resistance battery potential to the conductor C470 and ground potential to the conductor C469 will operate the relays R600 and R710 during the class test cycle in order to register the digit 6 indicative of a class 6 calling subscriber line.

In view of the foregoing, it will be understood that the class 4, class 5 or class 6 calling subscriber lines register a corresponding class identifying digits in the director and that this digit will subsequently be recorded if the call initiated by the subscriber is one that is to be toll ticketed. The remaining operations of the director and the associated switching apparatus to register the directory number of a desired called subscriber, to control the switching apparatus to establish the desired connection and to transmit the various items of record information to a toll ticket repeater included in the connection is the same as has been previously described.

*Eight digit calls*

In a telephone network of the type disclosed in Fig. 1, one or more of the telephone exchanges may include subscriber substations identified by eight digit directory numbers in addition to the regular subscriber substations identified by conventional seven digit directory numbers. If it is assumed that such an exchange is included in the present system, that the exchange is in the process of being converted from manual operation to automatic operation, that all of the seven digit subscriber lines have been converted to automatic operation and that the eight digit subscriber lines are still on a manual basis of operation, it would be inadvisable to instruct the subscribers in the FLorida 3 exchange, for example, to call the local exchange operator instead of dialing the directory number of a desired called subscriber in such an exchange. This is particularly true if it is assumed that the majority of the subscriber lines in the combined automatic and manual exchanges have been fully converted for automatic operation. Consequently, each director provided in the present system is arranged so that the registration of the called office code digits identifying the combined manual and automatic exchange causes the director to attempt to complete the call, in the manner previously described, as a normal seven digit call. However, the registration in the director of the called office code digits identifying the combined manual and automatic exchange controls the director to select a particular translate relay in the common translator 1300 which registers the appropriate routing digits in the coder 1800 portion of the director. The selected translate relay also operates the high multiple HM relay R1880 in the coder 1800 to indicate to the director that the call is to be extended to the combined manual and automatic exchange having both seven and eight digit subscriber lines and the AB toll start relay R2230 in the call recorder 2000 to indicate that a record is to be produced of the call. As previously described, the selected translate relay may also operate the TA control relay R1890 in the coder 1800 if all of the digits of the called subscriber directory number, as registered in the call register 1500, are to be transmitted following the transmission of the registered routing digits or it may operate the TB control relay R1885 if all but the first two digits of the called subscriber directory number, as registered, are to be transmitted following the transmission of the routing digits.

If the calling subscriber dials the digits of a regular seven digit directory number of an automatic subscriber in the combined manual and automatic exchange, the director will complete the connection and a record will be made of the call in the previously described manner. However, if the calling subscriber dials the digits of an eight digit directory number identifying a manual subscriber in the combined manual and automatic exchange, the mere act of dialing the eighth digit of the directory number will cause the partially completed connection over the automatic switching apparatus, to be released and it will set up an alternate connection to the "0" operator in the FLorida 3 exchange who will then extend the connection to a manual operator in the combined manual and automatic exchange for completion to the desired called manual subscriber. This call however, being handled on a semi-automatic basis, will be ticketed by the "0" operator in the FLorida 3 exchange.

In order to describe the operation of the director in response to a call to a seven digit subscriber station in the combined manual and automatic exchange, it will be assumed that a call has been initiated by one of the subscribers in the FLorida 3 exchange and that the calling subscriber line is connected to the director by way of the calling subscriber line circuit, the finder-selector link, including, for example, the finder 440A and the primary selector 500A, and the director hunter 450A. It will also be assumed that the calling subscriber has dialed the three called office code digits identifying the combined manual and automatic exchange and the remaining four numerical digits of a seven digit directory number. These digits, as previously described, are registered respectively in the registers 1520, 1530, 1540, 1610, 1620, 1630 and 1640 of the call register 1500 portion of the director. The first digit of the called office code registered in the register 1520, selects one of the wipers 1201 to 1208, inclusive, of the switch 1200; the digit registered in the register 1530 operates the wipers of the switch 1200 in a vertical direction to a position opposite a level in the associated bank contacts corresponding to the value of the second digit; and the third digit registered in the register 1540 causes the switch 1200 to rotate its wipers a number of steps over the contacts of the selected level to a particular contact corresponding to the numerical value of the third digit. At this time the contact engaged by the particular selected wiper of the switch 1200 will now complete a circuit, in the manner previously described, to one of the multiple contacts of either a class A, class B and class C relay, such as the relays R1310A, R1320A and R1330A, in the translator 1300. One of these relays is operated in accordance with the particular class of the subscriber line. Accordingly, the circuit completed will now be completed by way of the selected one of the wipers of the switch 1200, one of the multi-contacts of the relay R1310A, for example, in order to operate a translate relay, similar to the relay R1410A. As previously described, this translate relay is permanently wired to register in the coder 1800 portion of the director one or more routing digits for routing the particular call in the direction of the called exchange; to register the rate of charge for the call in accordance with the class of the calling subscriber line; and to ground the AB toll conductor to indicate to the call recorder 2000 that the particular call is to be recorded.

In the call being described, however, the selected translate relay will also ground the HM conductor extending to the coder 1800 thereby to operate the HM relay R1880. Upon operating, the relay R1880 locks itself, by way of its contacts 1881, to the conductor C787 which is grounded in the controller 600 portion of the director over a circuit including the contacts 897 and 751. If it is also assumed that in the present call, that it is necessary to transmit the seven digits as registered in the call register 1500 the selected translate relay will also ground the TA conductor extending to the coder 1800 in order to operate the TA relay R1890. This relay also locks itself, at its contacts 1892, to the grounded conductor C787. As a further result of the operation of relay R1890, at its contacts 1891, 1893 and 1894, it disconnects the conductors C1837, C1838 and C1839 from the skip conductor C1831 thereby to control the sender portion of the director to transmit the digits registered in the first three registers of the call register 1500.

As a result of the registration of the routing digits in the route registers of the coder 1800, the translator 1300 is dismissed, in the manner previously described, and the send sequence switch 1650 and the sender switch 1660 cooperate to transmit impulses corresponding to the digits registered in the route registers of the coder 1800 and then to transmit impulses corresponding to each of the seven digits registered in the registers of the call register 1500. After all of the digits have been transmitted by the director, the wiper 1654 of the send sequence switch 1650 is advanced into engagement with contact 14 thereby to complete a circuit including the conductor C887, the contacts 893 and the lower winding of the director release relay R780. Upon operating, the relay R780 controls the director to disconnect itself from the primary selector 500A, in the manner previously described, thereby to interconnect the calling subscriber in the FLorida 3 exchange with the called subscriber substation identified by the seven digit directory number terminating in the called combined manual and automatic exchange.

It should be understood, however, that the impulses of the various digits transmitted by the director, control the primary selector 500A and the subsequent switching apparatus in the telephone network in order to complete the connection to the desired called subscriber substation. It may be well to mention at this time that this connection included a toll ticket repeater, such as the ticket repeater 2300A, and that the call recorder 2000A has registered all of the items of record information in the ticket repeater in the manner previously described.

In the foregoing description, it was assumed that the call was completed to an automatic subscriber substation identified by a seven digit directory number located in the combined manual and automatic exchange. It will now be assumed that the calling subscriber has dialed an eight digit directory number of a manual subscriber located in the combined automatic and manual exchange. Since the automatic and manual subscribers are terminated in the combined automatic and manual exchange, it is apparent that the three digits comprising the called office code portion of the call subscriber directory numbers, are identical, regardless of the total number of digits included in the directory numbers. Consequently, the first seven digits of an eight digit directory number are registered, in the manner described above, in the seven registers, 1520, 1530, 1540, 1610, 1620, 1630 and 1640 of the call register 1500. The first three digits, comprising the called office code portion of the directory number, will select a wiper of the switch 1200 and operate the wiper in the vertical and rotary direction to select the previously mentioned translate relay, such as the relay R1410A in the translator 1300, in substantially the same manner as has been described above in connection with the seven digit call to the combined manual and automatic exchange, assuming of course, that the class of the calling line is also the same as noted previously. The selected translate relay will now register the routing in the coder 1800 portion of the director; it will also register the rate applicable to the call; it will operate the TA control relay R1890, it will operate the HM control relay 1880, and it will initiate the operation of the call recorder 2000 by applying ground potential to the AB toll conductor. From the description thus far, it should be understood that if the subscriber does not dial an eighth digit the director will attempt to complete the call in the same manner as has been described above to the combined manual and automatic exchange. However, if the calling subscriber dials the last digit of an eighth digit directory number, the partially established connection toward the combined manual and automatic exchange will be released and a new connection will be established by the director over an alternate route to the "0" operator in the FLorida 3 exchange.

Referring now to the call register 1500, it will be recalled that the magnet RM1511 of the receive sequence switch 1510 operates at the beginning of each series of impulses transmitted to the call register and that it restores to normal at the end of each series of impulses in order to advance its wipers one step in a counterclockwise direction. Consequently, the wiper 1514 in engagement with contact 1 completes the circuit over which the impulses of the first digit are transmitted to and registered by the first code register 1520. After the first digit is registered, the wiper 1514 advances to contact 2, whereupon the second digit will be registered in the second code register 1530. In this manner the wipers 1513 to 1516, inclusive, of the receive sequence switch 1510 are advanced step-by-step over the associated bank contacts to register the seven successive digits of a seven digit directory number in the seven registers of the call register 1500. As soon as the seventh digit is registered in the fourth numerical register 1640, the wipers of the receive sequence switch 1510 are automatically advanced into engagement with the eighth contact in the associated contact banks. In this position the wiper 1515 connects the grounded conductor C794 to the conductor C984 extending to Fig. 9, in order to operate the fourth numerical send relay R990 and thus indicate that the seventh digit of a called number has been registered.

Since it has been assumed that the present call is to be directed to the combined manual and automatic exchange, the HM relay R1880 in the coder 1800 was operated as previously noted by the selected translate relay in the translator 1300. This relay upon operating, at its contacts 1881, locks itself to the grounded conductor C787 and it simultaneously connects the locking ground by way of the conductor C1517 extending to Fig. 15 to the wiper 1516 of the receive sequence switch 1510. Although the ground potential is connected to the wiper 1516 shortly after the registration of the third digit of the called office code it only becomes effective when the wiper 1516 engages the contact 8 to complete a circuit including the contacts 1512 for operating the magnet RM1511. Upon operating the magnet, at its contacts 1512, interrupts its initial operating circuit and restores to normal and advances its wipers 1513 to 1516, inclusive, into engagement with the contacts 9. Accordingly, it will be understood that if the HM relay R1880 is operated to apply the ground potential to the wiper 1516, the receive sequence switch 1510 will automatically advance its wipers from the contacts 8 into engagement with the contacts 9. It may be well to mention at this time, however, that the wipers of the switch 1510 automatically move from contacts 8 to contacts 9 whether or not the calling subscriber dials an eighth digit, and the director will function in the manner previously described in attempting to complete the call to an automatic subscriber substation in the combined manual and automatic exchange.

However, if the calling subscriber now dials an eighth digit, the magnet RM1511 will be operated over a circuit including the conductor C815 and the first ground pulse of the eighth digit will be transmitted by way of the conductor C717, wiper 1514 in engagement with the contact 9, conductor C856 extending to Fig. 8, the winding of the eighth digit relay R890 and the resistor 890′ to battery. The relay R890 operates over this circuit and, at its contacts 894, locks itself to ground at contacts 757 of the operated seizure relay R750. At the end of the dialing of the eighth digit, the magnet RM1511 will restore to normal, in the manner previously described, and advance its wipers into engagement with the contacts 10. However, the eighth digit relay R890 is now locked in its operated position and, therefore, does not restore to normal when its initial operating circuit is interrupted by the advancement of the wiper 1514 from the contact 9 into engagement with the contact 10.

As a further result of the operation of the relay R890, at its contacts 898, it interrupts a point in the previously described circuit including the conductor C468 in order to prevent transmission of any additional impulses by the director to the primary selector 500A and to any subsequent automatic switches included in the switch train. At its contacts 891, the relay R890 disconnects the pulse control relay R870 from the conductor C892 thereby to restore the relay and prevent the contacts 878 from transmitting further impulses. Thus it is apparent that while the director may be transmitting one of the routing digits registered in the route registers of the coder 1800 or one of the digits registered in the call register 1500 in attempting to complete the call as a seven digit call, the operation of the eighth digit relay R890 immediately stops impulse transmission regardless of the digit being transmitted by the director.

As a further result of the operation of relay R890, at its contacts 897, it disconnects the ground potential at contacts 751 from the conductor C787 extending to Fig. 18. In Fig. 18, the removal of ground potential from the conductor C787 causes the restoration of any operated register relays in the coder 1800, it causes the restoration of the operated HM relay R1880, and it causes the restoration of the TA control relay R1890 which is assumed to be in its operated position at this time. In other words, whatever digits and control functions have been registered in the coder 1800 are erased therefrom by the removal of ground potential from the conductor C787. At its contacts 896, the relay R890 applies the ground potential at the contacts 751 by way of the conductor C854 extending to Fig. 18 and the righthand winding of the TD control relay R1875, to battery, in order to operate the latter relay. At the present time, all of the registers and all of the control relays in the coder 1800 are in their restored positions except the relay R1875 which is now operated. As a result thereof, the conductors C1832 to C1843, inclusive, are connected to the skip conductor C1831.

As previously explained, each of the skip conductors C1832 to C1843, inclusive, terminate respectively in the contacts 2 to 15, inclusive, accessible to the wiper 1654 of the send sequence switch 1650. Regardless of the position of the wiper 1654 at this time, it will now complete a self-interrupting circuit for the magnet RM1651 whereby the wipers will be advanced step-by-step from whatever contact position the wiper 1654 is in engagement with to the contact position 14. For example, if the wiper 1654 is in engagement with the contact 2, ground potential will be extended by way of the conductor C1832 extending to Fig. 18, the left-hand break contacts of the four WXYZ12 second route register relays, conductor C1831 extending to Fig. 16, the self-interrupting contacts 1652 and the winding of the magnet RM1651, to battery. The magnet now operates and restores to advance the wipers 1653 to 1658, inclusive, one step into engagement with the contacts 3. Similar circuits including successively the conductors C1833 to C1836, inclusive, the third to the sixth route registers in the coder 1800 and the skip conductor C1831, control the magnet RM1651 to advance the wipers into engagement with the contacts 7. In position 7, wiper 1654 applies ground potential by way of the conductor C1837 and contacts 1894 of the restored relay R1890 to the skip conductor C1831 in order to advance the wipers of the send sequence switch 1650 into engagement with the contacts 8. In positions 8 and 9, the wiper 1654 again completes the stepping circuit for the magnet RM1651 by way of the conductor C1838 and C1839 to the skip conductor C1831. As soon as the wiper 1654 engages contact 10, the conductor C1840 will be grounded in order to complete a circuit including the contacts 1876 of the now operated TD control relay R1875, contacts 1882 of the restored HM relay R1880 and the skip conductor C1831, whereupon the magnet RM1651 advances the wipers into engagement with the contacts 11. In positions 11, 12 and 13, the wiper 1654 successively applies ground potential to the conductors C1841, C1842 and C1843, whereupon, the skip conductor C1831 is successively grounded in order to control the magnet RM1651 to advance the wipers step-by-step over the contacts 11, 12 and 13 into engagement with the contacts 14.

In view of the foregoing, it will be understood that as soon as the relay R890 in the controller 600 portion of the director is operated as a result of the dialing of an eighth digit, the send sequence switch 1650 will automatically advance its wipers into engagement with the contacts 14, thereby to skip the transmission of impulses corresponding to the digits registered on any of the digit registers. It should be understood, however, that the digits registered on one or more of the route registers or the registers of the call register 1500 may have been transmitted by the director before the relay R890 operates.

As soon as the wiper 1654 is advanced into engagement with the contact 14, ground potential is connected by way of the conductor C887 extending to Fig. 8, contacts 892 of the operated relay R890, conductor C857 extending to Fig. 16, contacts 1652, and the winding of the magnet RM1651, to battery. The magnet RM1651 now operates and restores, in the manner previously described, in order to advance the wiper 1653 to 1658, inclusive, into engagement with the contacts 15. It may be well to mention at this time that if the eighth digit relay R890 is not operated when the wiper 1654 engages contact 14, the director release relay R780 will be operated in order to release the director.

As soon as the wiper 1654 engages contact 15, ground potential is applied by way of the conductor C736 extending to Fig. 7, contacts 734 and the winding of the relay R720, to battery. The relay R720 now operates and, at its contacts 724, it completes an obvious circuit for operating the slow-to-operate relay R730 and the latter relay, at its contacts 734, interrupts the circuit for the relay R720 which slowly restores to normal. As soon as the relay R720 again restores, at its contacts 724, it interrupts the circuit for the relay R730 which also slowly restores to normal.

Before the relay R730 restores, however, a circuit is completed from ground, contacts 723, 733, 767 and 935, conductor C894 extending to Fig. 16, and the winding of the magnet RM1651, to battery in order to operate magnet. In this circuit, it should be noted that the control relay R760 is locked in its operated position to ground at contacts 752, as a result of the calling line class test which was made as soon as the calling subscriber line was connected to the director. Shortly after the above traced circuit is completed for operating the magnet RM1651, the relay R730 restores to normal and, at its contacts 733, it interrupts the circuit in order to restore the magnet to normal and thereby advance its wipers 1653 to 1658, inclusive, into engagement with the contacts 16.

The period of time required for the relay R720 to operate, the relay R730 to operate, and the relay R720 to then restore, allows sufficient time for all of the operated switches in the switch train, which have been positioned by impulses transmitted by the director before the eighth digit is dialed, to restore to their normal resting positions.

Referring now to the wiper 1655 to 1658, inclusive, of the send sequence switch 1650, it will be seen that when these wipers engage the contacts 16, they connect the WXYZ81 code marking conductors to the bank contacts accessible to the wiper 1665 and 1666 of the sender switch 1660. For the purpose of this description, it will be assumed that the X81 and Z81 code marking conductors are permanently grounded in accordance with the digit 5 and that the X82 and Z82 conductors connected to contacts 17 are permanently grounded in accordance with the digit 5. In other words, the director is arranged so that it will automatically reroute eight digit calls over a route to a "0" operator position by transmitting the routing digits 55 marked on the bank contacts 16 and 17 accessible to the wipers 1655 to 1658, inclusive. The next operation to be performed by the send sequence switch 1650 is to again initiate operation of the pulse control relay R870, and to restore the eight digit relay R890 so that the sender switch 1660 may be controlled to transmit impulses corresponding to the digits 55. Accordingly, when the wiper 1654 engages the contact 16, it applies ground potential by way of the conductor C855 extending to Fig. 8 to the mid-point of the circuit between the winding of the relay R890 and the resistor 890'. This ground potential now shunts the relay R890 and it restores to normal.

As soon as the relay R890 restores to normal, at its contact 896, it interrupts the previously traced circuit including the conductor C854 in order to restore the TD control relay R1875 in the coder 1800 to normal and, at its contacts 897, it reapplies the ground potential by way of the conductor C788 extending to Fig. 16, to the multiple connected contacts accessible to the wiper 1664 and it also applies ground potential to the locking ground conductor C787 extending to Fig. 18. As a further result of the restoration of the relay R890, at its contacts 898, it reconnects the previously described impulsing circuit including the contacts 882 to the conductor C468 extending to Fig. 5 in order to reoperate the line relay R530 in the primary selector 500A. Finally, at its contacts 891, the relay R890 completes a circuit including the conductor C892 for reoperating the pulse control relay R870. The last mentioned circuit may be traced from ground at contacts 751 of the operated relay R750 and then by way of the contacts 931, conductor C977 extending to Fig. 16, contacts 16 engaged by wiper 1653, conductor C892 extending to Fig. 8, contacts 891 and 864, the winding of the pulse control relay R870 and the resistor 879, to battery. The relay R870 upon operating restarts the impulse transmitting cycle whereby the sender switch 1660, the pulse control relay R870, the digit space relay R860 and the digit stop relay R920 cooperate to transmit impulses corresponding to the digit 5 marked in code form on the X81 and Z81 marking conductors engaged by the wipers 1656 and 1658 of the send sequence switch 1650.

At the end of the transmission of the impulses corresponding to the digit 5, the digit space relay R860 is operated and, at its contacts 861, it interrupts the circuit including the conductor C894 in order to restore the magnet RM1651 and advance the wipers of the send sequence switch 1650 from the contacts 16 into engagement with the contacts 17.

The sender switch 1660 retains the digit space relay R860 in its operated position over the previously traced circuit including the winding of the relay, its contacts 865, conductor C890, wiper 1664 and the multiply connected contacts which are grounded by the conductor C788. Consequently, the digit space relay R860 will remain operated until the sender switch 1660 has advanced its wipers to the home contact position at a fast and a slow rate of stepping in the manner previously described to provide an interdigital pause.

As soon as the send sequence switch 1650 advances its wipers into engagement with the contacts 17, the sender switch 1660 will again operate step-by-step in the manner previously described to search for the contacts in the associated banks which are marked by the ground potential applied to the X82 and Z82 marking conductors engaged by the wipers 1656 and 1658. These conductors are marked in accordance with the digit 5 and consequently, the sender switch 1660 during its stepping operation and in cooperation with the pulse control relay R870, the pulse relay R880 and the digit stop relay R920 will transmit 5 impulses corresponding to the digit 5 over the conductor C468. As soon as the last impulse of the digit 5 is transmitted, the digit stop relay R920 reoperates the digit space relay R860 and, at its contacts 862, the latter relay interrupts the circuit including the conductor C894 in order to control the magnet RM1651 to advance its wipers 1653 to 1658, inclusive, one step into engagement with the contacts 18. As previously noted, the sender switch 1660 will then restore its wipers to their normal resting positions to provide the interdigital pause.

It should be noted at this time, however, that if it is necessary to skip the digit marked in code form on the WXYZ82 code marking conductors, the terminals TA and TB may be interconnected so that when the wiper 1654 engages contact 17 a circuit is completed by way of the interconnected terminals TA and TB and the self-interrupting contacts 1652 for momentarily operating the magnet RM1651. Consequently, the wipers of the send sequence switch 1650 will immediately skip over the contacts 17 in order to prevent the transmission of the digit marked on the WXYZ82 code marking conductors.

When the wiper 1654 of the send sequence switch 1650 engages contact 18, it applies ground potential by way of the conductors C887 extending to Fig. 8, contacts 893, and the winding of the director release relay R780, to battery. This relay now operates to complete the previously described releasing control whereby the director will be restored to normal.

Referring now to Fig. 2 of the drawings, it will be understood that when the director transmits the rerouting digits 55 marked on code form on the WXYZ81 and WXYZ82 code marking conductors, the first digit 5 will control the primary selector 500A, in the manner previously described, to select an idle trunk in the fifth level terminating for example, in an idle special selector, such as the selector 340. Thereafter, the second digit 5 transmitted by the director will control the special selector 340 to select an idle trunk in the fifth level extending to the "0" operated position. When the director release relay R780 is operated and the director is disconnected from the primary selector 500A the calling subscriber line will be connected directly to the "0" operator position.

After ascertaining the directory number of the eight digit manual subscriber in the combined manual and automatic exchange, the "0" operator will then complete the connection by way of automatic switching apparatus or by way of manual trunk lines to the manual operator provided in the combined manual and automatic exchange. The latter operator will, of course, plug in and signal the desired eight digit manual subscriber line in a conventional manner. As soon as the called subscriber answers, the connection will be completed between the calling and called subscribers by way of a portion of the automatic equipment and the "0" operator position in the FLorida 3 exchange and the manual operator position in the combined manual and automatic called exchange.

It should be noted that in directing the call to a manual subscriber of the eight digit type located in the combined automatic and manual exchange, the director in the FLorida 3 exchange first attempts to complete the connection as a seven digit call over the automatic switching apparatus in a normal manner and when the eighth digit is dialed, the director automatically released all of the partially operated switching apparatus, including the primary selector 500A, and thereafter automatically transmits the routing digits 55 in order to reroute the call by way of the primary selector 500A and the special selector 340 to the "0" operator position.

*Translation of calls requiring common routing digits but different rates*

In setting up the various telephone connections, the director calls upon the common translator 1300 for the purpose of translating the called office code portion of a called subscriber directory number into appropriate routing digits. In the present system, the translator assigner 1000 operates to find a calling director, and after the director is found, the common translator 1300 is associated with the coder 1800 portion of the director. Also, one of a plurality of translate relays in the translator 1300 is selected by the selective operation of the switch 1200 in the code switch 1100 portion of the director. The switch 1200, is operated in a vertical direction and a rotary direction in accordance with the second and third digits of the called office code and one of eight separate wipers of the switch is selected in accordance with the first digit of the called office code. Since each wiper in the switch has access to 100 separate contacts in the associated contact bank and since any one of the 100 separate contacts may be selected by each of the eight separate wipers, it is possible to select any one of 800 different bank contacts. If each contact represents the translation of a particular called office code, it is apparent that 800 separate translations may be provided in the system. This number may also be multiplied to 2400 separate translation selections inasmuch as each of the 800 contacts of the switch 1200 may be connected through contacts of three different class relays, such as the class group A, B, and C relays R1310A, R1320A and R1330A illustrated in Fig. 13. It will also be apparent from the previous description of the operation of the system, that each of the multi-contact route relays, such as the route relay R1410A, is jumpered to register in code form in the coder 1800 portion of the director any one of six different rate digits. Each of the route relay digits are also permanently jumpered to register in the coder 1800 portion of the director, the particular rate digit applicable to the call as determined by the class of the calling line and the ultimate destination of the particular called exchange. Reference may be had to the Ostline application Serial No. 75,985, filed February 12, 1949 and to the Ostline application Serial No. 205,460, filed January 11, 1951, for a complete understanding of the selection of the various route relays in accordance with specific called office codes for the purpose of routing the calls to the desired exchange.

While the arrangements described in the present application, as well as those described in the above noted Ostline applications are satisfactory in operation, it is apparent that it is necessary to provide as many multi-contact route relays as there are routes to the different exchanges as well as different rates applicable to calls to the different exchanges. Since the route relays are somewhat expensive to manufacture, it is a feature of the present invention to eliminate the use of certain of the route relays when the only difference in the permanent jumpering thereof resides in the rate digit required for establishing the charge rate applicable to a call.

In the present system calls to several of the called exchanges may be routed over a common routing path to a tandem switching point. Consequently, the route digits required to route the call to such a common switching point will be the same for all exchanges reached through this switching center. However, since the called exchanges may be located in different zones of the network, the rate of charge applicable to the calls may be different depending upon distance between the originating FLorida 3 exchange and the particular called exchange and the class of the particular calling subscriber line.

In order to describe the foregoing arrangement, the route relay R1410B illustrated in Fig. 14 is permanently jumpered in the same manner of the route relay R1410A, in accordance with the routing digits 48, but the rate applicable to a call employing the route relay R1410B is determined by an ordinary rate relay, such as the relay R1420 or the relay R1430. In addition to the foregoing, the route relay R1410B is permanently jumpered so that it will ground the TA conductor and the AB toll conductor extending to the coder 1800. As previously noted, the routing digits 48 are employed to route the call to the EMpire 1 exchange. It will be assumed that this exchange is the tandem switching point referred to above and that certain of the called exchanges are reached over this route. Although only two of the rate relays have been illustrated in Fig. 14 it should be understood that additional relays having the associated contacts wired for different rate digits may also be employed to selectively operate the route relay R1410B whenever the code digits of a called exchange are to be translated into the routing digits 48.

In order to describe the operation of the system, it will be assumed that a subscriber in the FLorida 3 exhange has registered the called orifice code digit 785 of the SUperior 5 exchange and the four numerical digits identifying a particular called subscriber into the call register 1500 portion of the director. As a result of the registration of the first digit 7, the wiper 1206 of the switch 1200 is selected and as a result of the registration of the digits 85, the wipers of the switch 1200 are positioned in a vertical and rotary direction into engagement with the contacts 85. As a further result of the registration of the called office code digits 785, the translator assigner 1000 associates the translator 1300 with a coder 1800 portion of the director by operating relay R1710 and ground potential is applied to the wiper 1206 of the switch 1200. Also one of the class A, B or C relays R1340A, R1350A, and R1360A in the translator 1300 is operated depending upon the class of the particular calling subscriber line. The ground potential applied to the wiper 1206 is extended by way of the conductor C1261 connected to the terminal 85 and then by way of the conductors C1261A, 1261B, 1261C, 1261D and 1261E and the winding of the rate relay R1420, to battery. In this circuit it is assumed that the class A relay R1340A and the class A auxiliary relay R1310A have been operated by a class 1, 2, or 3 calling subscriber line. When the rate relay R1420 is operated in the manner described above, it completes, at its contacts 1421, an obvious circuit for operating the route relay R1410B. As a further result of the operation of relay R1420, at its contacts 1422X and 1422Y, it connects ground potential, at the terminal 1423, to the X17 and Y17 code marking conductors in order to mark these conductors in accordance with the rate digit 5. It should be noted, however, that the WXYZ17 conductors may be marked in accordance with any digit 1 to 0, inclusive, by connecting the grounded terminal 1423 to the contacts 1422W to 1422Z, inclusive, in accordance with the previously noted code.

Referring now to the coder 1800 portion of the director illustrated in Figs. 17 and 18, it will be seen that the application of ground potential to the X17 and Y17 code marking conductors operates the corresponding relays in the rate register. It will also be noted that when the route relay R1410B operates it marks the WXYZ11 code marking conductors in accordance with the routing digit 4 and the WXYZ12 code marking conductors in accordance with the routing digit 8. From the foregoing, it is apparent that under the joint control of the route relay R1410B and the rate relay R1420, the routing digits 48 are registered respectively in the first and second route registers and the rate digit 5 is registered in the rate register of the coder 1800. Also, the route relay R1410B applies ground potential to the TA conductor in order to operate the TA control relay R1890 in the coder 1800 and it applies ground potential to the AB toll conductor in order to initiate the operation of the call recorder 2000, in the manner previously described. As soon as the routing digit 4 is registered in the first route register of the coder 1800, the translator 1300 and the translator assigner 1000 restore to normal in order to disconnect the coder 1800 portion of the director from the translator 1300.

In view of the fact that the TA control relay R1890 in the coder 1800 has been operated, the conductors C1837 to C1830 inclusive, are disconnected from the skip conductor C1831. Consequently, the sender portion of the director first transmits the routing digits 48 in order to route the present call by way of the primary selector 500A, the ticket repeater 2300A, the ticket repeater selector 2700A and the repeater 305 to the tandem switching point in the EMpire 1 exchange. Thereafter, the sender portion of the director transmits the called office code digit 785 and then the numerical portion of the calling subscriber directory number as registered in the call register 1500 in order to complete the connection from the EMpire 1 exchange to the desired called subscriber line in the SUperior 5 exchange. It should be understood, however, that before the director is released from the connection, the call recorder 2000 functions, in the manner previously described, to transmit the various items of record information including the directory numbers of both the calling and the called subscriber lines, the class of the calling line and the rate applicable to the connection, to the ticket repeater 2300A. Thereafter, the director releases from the connection and the conversational circuit including the switching apparatus in the FLorida 3, the EMpire 1 exchange and the SUperior 5 exchange is completed between the calling and the called subscribers.

In the foregoing description it was assumed that a call from a subscriber in the FLorida 3 exchange to a subscriber in the SUperior 5 exchange required the registration of the rate digit 5. The rate applicable to the call was determined in accordance with the distance between the exchanges and the class of the particular subscriber line. It should be understood, however, that if another class of line should make the same call, the rate of charge may, for example, be based on the rate digit 8 instead of 5. All of the operations described above would still be performed, but if the class of the calling line is such that the class B relay R1350A is operated instead of the class A relay R1340A, the previously described circuit, including the conductors C1261, C1261A, C1261B is now extended by way of the conductor C1261F, C1261G and C1261H in order to operate the rate relay R1430. As soon as the relay R1430 operates, at its contacts R1431, it completes an obvious circuit for operating the route relay R1410B and, at its contacts 1432Y, it applies ground potential at the terminal 1433 to the Y17 conductor in order to register the rate digit 8 in the rate register of the coder 1800. Since all of the other operations are the same as those previously described, it will be apparent that the only difference is that the rate digit 8 will be recorded at the end of the call instead of the rate digit 5.

In view of the foregoing description it should be understood that calls to other exchanges requiring the routing digits 48 and the other controls performed by the route relay R1410B to complete the connection, but having different rates applicable to the calls, simplified rate relays, such as the relays R1420 or R1430, may be selectively operated in accordance with the called office code to control the route relay R1410B, in the manner described above. Thus it will be apparent that one relatively expensive multi-contact route relay may be utilized for controlling the routing of calls to several different exchanges reached by way of a common tandem switching point even though the rates for the different calls to such exchanges are of different values.

*Conclusions*

For a complete understanding of various other operations of the director in response to toll calls from the FLorida 3 exchange to the CHase exchange; the registration of a falsely grounded calling line; the failure of a calling subscriber to dial; the dialing of an incomplete called number; the failure of the translator, assigner 1000; the failure of the sending apparatus in the director; the dialing of a non-existing called office codes; and calls to the "0" toll operator; reference may be had to the description of the system disclosed in the Ostline application Serial No. 205,460, filed January 11, 1951. The fundamental arrangement whereby the director is automatically controlled to route eight-digit called subscriber directory numbers to an operator position for completion is described and claimed in the copending divisional application Serial No. 402,489, filed January 6, 1954. The fundamental arrangement whereby the translator mechanism is controlled to route all calls destined for certain predetermined terminating exchanges over a predetermined route to a tandem switching exchange and to selectively determine the charge rate applicable to each of the calls is described and claimed in the copending divisional application Serial No. 582,207, filed May 2, 1956.

While one embodiment of the invention has been disclosed, it will be understood that various modifications may be made therein which are within the true spirit and scope of the invention.

What is claimed is:

1. In a telephone system including a plurality of groups of lines corresponding respectively to different classes of service, a register sender, a finder link for each of said groups of lines operated incident to a call on a line in the associated line group for connecting said calling line to said register sender, a pair of conductors individual to each of said links marked to identify the class of service of the associated line group, means in said register sender operated incident to the connection of said calling line thereto for determining the identity of the class of service of the line group including said calling line in accordance with the markings on said pair of conductors, and means controlled by said determining means for registering the identity of the class of service of said calling line in said register sender.

2. In a telephone system including a plurality of groups of lines corresponding respectively to different classes of service, a register sender, a finder link for each of said groups of lines, a pair of conductors individual to each of said links, means controlled incident to a call on a line in one of said line groups for controlling the associated link to connect said calling line to said link, means in said link controlled incident to the connection of said line to said link for connecting said link to said register sender, means in said link controlled incident to said last-mentioned connection for connecting said calling line and said pair of conductors to said register sender and for marking said pair of conductors to identify the class of service of the group of lines including said calling line, class of service registers in said register sender, and means in said register sender controlled over said calling line for connecting said class of service registers to said pair of conductors to identify and register the class of service marked on said conductors.

3. In a telephone system including a plurality of groups of lines corresponding respectively to different classes of service, a register sender, a finder-selector link for each of said groups of lines, a pair of control conductors and a pair of marking conductors individual to each of said links, means in each of said links operated incident to a call on a line in the associated line group for connecting said calling line to said register sender over the pair of control conductors of the operated link and for placing a characteristic marking on the associated marking conductors identifying said operated link, class testing means in said register sender operative to test said marking conductors to determine the characteristic marking thereon and governed thereby to register the class of service of the group of lines served by the operated link, and means in said register sender operated over said pair of control conductors for operating said class testing means.

4. In a telephone system including a plurality of groups of lines corresponding respectively to different classes of service, a register sender, a link for each of said group of lines operated incident to a call on a line in the associated line group for connecting said calling line to said register sender, a pair of conductors individual to each of said links marked to identify the class of service of the associated line group, a class test relay in said register sender operated incident to the connection of said calling line thereto, a first relay, a second relay, a third relay, means controlled by operation of said class test relay for connecting said first relay to one of said conductors and for sequentially connecting said second relay and said third relay to the other of said conductors, whereby said first relay is either operated or remains in its restored position and said second relay and said third relay are individually operated or remain in their restored positions depending upon the class of service marked on said conductors, and means controlled in accordance with the operated and restored positions of said first relay and said second relay and said third relay for registering the identity of the particular class of service of said calling line in said group of lines.

5. In a telephone system including a plurality of groups of lines corresponding respectively to different classes of service, a register sender, a link for each of said groups of lines operated incident to a call on a line in the associated line group for connecting said calling line to said register sender, a pair of conductors individual to each of said links marked to identify the class of service of the associated line group, a class test relay in said register sender operated incident to the connection of said calling line thereto, a first relay, a second relay, a third relay, means controlled by operation of said class test relay for connecting said first relay to one of said conductors and for sequentially connecting said second relay and said third relay to the other of said conductors, whereby said first relay is either operated or remains in its restored position and said second relay and said third relay are individually operated or remain in their restored positions depending upon the class of service marked on said conductors, means controlled in accordance with the operated and the restored positions of said first relay and said second relay and said third relay for registering the identity of the particular class of service of said calling line, a plurality of class indicating signals, and additional means controlled in accordance with the operated and restored positions of said first relay and said second relay and said third relay for selecting and actuating one of said class indicating signals to indicate the particular class of service of said calling line.

6. In a telephone system including a plurality of groups of lines corresponding respectively to different classes of service, a register sender, a link for each of said groups of lines operated incident to a call on a line in the associated line group for connecting said calling line to said register sender, a pair of conductors individual to each of said links marked to identify the class of service of the associated line group, a class test relay in said register sender operated incident to the connection of said calling line thereto, a class control relay operated by operation of said class test relay, a first and a second and a third relay in said register sender, additional means controlled by operation of said class test relay for connecting said first relay to one of said conductors and for connecting said second relay to the other of said conductors, means controlled by operation of said class control relay for restoring said class test relay, means controlled incident to the restoration of said class test relay for disconnecting said first relay from said one conductor and said second relay from said other conductor and for connecting said third relay to said other conductor, said first relay being selectively controlled over said one conductor and said second and third relays being selectively controlled over said other conductor in accordance with the class of service marking thereon, a plurality of digit marking conductors, and means controlled in accordance with said selective control of said first relay and said second and said third relay for marking said digit marking conductors individually or in combinations in accordance with a digit indicative of the class of service of the group of lines including said calling line.

7. In a telephone system including a plurality of groups of lines corresponding respectively to different classes of service, a register sender, a finder-selector link for each of said groups of lines operated incident to a call on a line in the associated line group for connecting said calling line to said register sender, a first conductor and a second conductor individual to each of said links, jumper terminals in each of said links interconnected to apply different predetermined marking potentials to the associated first and second conductors in order to mark said conductors in accordance with the different classes of service of the different line groups, testing means in said register sender, means in said register sender operated by the connection thereto of said calling line for simultaneously connecting said testing means to said first and said second conductors and for thereafter connecting said testing means to only said second conductor, means controlled by the predetermined markings on said first and second conductors of said operated finder-selector link for selectively controlling the operation of said testing means to register a digit corresponding to the particular class of service of the line group including said calling line.

8. In an automatic telephone system including a plurality of groups of lines of different classes, a plurality of register senders, a link for each of said groups of lines comprising a finder having access to the lines in the associated group and a selector, a hunting switch individual to each of said links having access to said register senders, means operated incident to a call on a line in one of said groups for controlling the finder of the link in the associated group to find and connect said calling line to the selector in the associated group, a line relay operated by the connection of said line to said selector for controlling the associated hunting switch to connect an idle one of said register senders to said selector, means in said selector operated by the connection of an idle one of said register senders to said selector for disconnecting said calling line from said line relay and for connecting said calling line to said register sender, a pair of test conductors in said selector connected to said register sender by said hunting switch, said conductors being marked to indicate the class of the group of lines including said calling line, and means operated incident to said connection of said calling line to said register sender for testing said pair of conductors and governed in accordance with the markings thereon for registering the class of said calling line.

9. In a telephone system, a group of lines including restricted and non-restricted lines, a called line, a register sender, a group of trunks, a link comprising a finder having access to said group of lines and a selector having access to said trunks and a switch having access to said register sender, means operated incident to a call on one of said lines for controlling said finder to find said line and for controlling said switch to connect said calling line and said selector to said register sender, means in said register sender controlled over said calling line for registering digits identifying said called line and for transmitting a plurality of digits to set up a connection to said called line by way of said selector and a trunk in said group of trunks, means in said selector governed by the first digit transmitted by said register sender for operating said selector in a primary direction to select said group of trunks and for thereafter operating said selector in a secondary direction to search for an idle trunk in said selected group, a switch-through relay in said selector normally operated incident to the selection of an idle trunk, means controlled by operation of said switch-through relay for terminating further operation of said selector in said secondary direction and for connecting said register sender by way of said selector to said selected idle trunk so that the remaining digits for setting up a connection to said called line are transmitted by said register sender over said selected trunk, means in said finder operated in the event said calling line is a restricted line and said selector is operated in said primary direction to select said group of trunks for positively preventing operation of said switch-through relay during the operation of said selector in said secondary direction, thereby preventing said selector from selecting a trunk in said trunk group and for causing the remaining digits transmitted by said register sender to be absorbed by said selector, a busy tone source in said selector, and means in said selector controlled by said register sender after the transmission of the last digit for disconnecting said calling line and said selector from said register sender and for connecting said calling line to said selector, whereby a non-restricted calling line is connected by way of said selected trunk to said called line and whereby a restricted calling line is connected to said busy tone source.

10. In a telephone system including a plurality of groups of lines including respectively restricted and non-restricted lines, a finder having access to said lines, said finder being characterized by a plurality of different primary operations thereof to select corresponding ones of said groups of lines and by a plurality of different secondary operations thereof to select corresponding ones of the individual lines in the previously selected one of said groups of lines, a group of trunks, automatic switching apparatus associated with said finder and operative to extend connections from calling ones of said lines to said trunks, a register sender, a control conductor interconnecting said finder and said automatic switching apparatus, means operated incident to a call on one of said lines governing said primary and secondary operations of said finder to find said calling line, said primary operation selectively controlling said control conductor each time a restricted group of lines including said calling line is selected, means controlled incident to said finder finding said calling line for connecting said calling line to said register sender and said register sender to said switching apparatus, means in said register sender controlled over said calling line for transmitting digits to said switching apparatus in order to set up a connection from said calling line over a trunk in said group of trunks, means in said switching apparatus controlled in accordance with the first digit transmitted by said register sender for selecting said group of trunks, additional means in said switching apparatus thereafter operated automatically to search for an idle trunk in said selected group of trunks, a relay in said switching apparatus operated only in the event an idle trunk is found, means controlled by operation of said relay for terminating said searching operation of said switching apparatus and for connecting said register sender to said idle trunk so that the remaining digits will be transmitted over said idle trunk by said register sender, a blocking circuit for preventing operation of said relay completed over said control conductor only in the event that said primary operation of said finder has controlled said control conductor to indicate that the group of lines including said calling line are restricted and said automatic switching apparatus has selected said trunk group in response to said first digit transmitted, a busy tone source, means controlled by the completion of said blocking circuit for preventing operation of said relay and for controlling said switching apparatus to absorb the remaining digits transmitted by said register sender, means in said switching apparatus controlled incident to the transmission of the last digit by said register sender for disconnecting said register sender from said calling line and said switching apparatus and for interconnecting said calling line and said switching apparatus, whereby a connection is completed from a calling non-restricted line over said selected trunk if said relay is operated and whereby a calling restricted line is connected to said busy tone source if said relay is prevented from operating by completion of said blocking circuit.

11. In a telephone system including a plurality of groups of lines corresponding respectively to restricted and non-restricted lines, a finder having access to said lines, said finder being characterized by a plurality of different primary operations thereof to select corresponding one of said groups of lines and by a plurality of different secondary operations thereof to select corresponding one of the individual lines in the previously selected one of said groups of lines, a group of trunks, automatic switching apparatus associated with said finder and operative to extend connections from calling ones of said lines to said trunks, a register sender, a control conductor interconnecting said finder and said automatic switching apparatus, means operated incident to a call on one of said lines governing said primary and secondary operations of said finder to find said calling line, contact springs in said finder actuated to mark said control conductor only in response to the selection of a restricted group of lines by said primary operation of said finder means controlled incident to said finder said calling line for connecting said calling line to said register sender and for connecting said register sender to said switching apparatus, means in said register sender controlled over said calling line for transmitting digits to said switching apparatus, means in said switching apparatus controlled in accordance with the first digit transmitted by said register sender for selecting said group of trunks, additional means in said switching apparatus thereafter operated automatically to search for an idle trunk in said selected group of trunks, a relay in said switching apparatus operated only in the event an idle trunk is found, means controlled by operation of said relay for terminating said searching operation of said switching apparatus and for connecting said register sender to said idle trunk so that the remaining digits will be transmitted over said idle trunk by said register sender, contact springs in said switching apparatus actuated to connect said control conductor to said relay only in response to said selection of said group of trunks, a blocking circuit for preventing operations of said relay completed over said control conductor by actuation of both said finder contact springs and said switching apparatus contact springs to indicate respectively that the group of lines including said calling line are restricted and that said switching apparatus has been controlled by the first digit transmitted by said register sender to select said group of trunks, a source of busy tone, means controlled in the event said relay is prevented from operating by the completion of said blocking circuit for absorbing the remaining digits transmitted by said register sender and for selecting said busy tone source, means in said switching apparatus controlled incident to the transmission of the last digit by said register sender for disconnecting said register sender from said calling line and said switching apparatus and for interconnecting said calling line and said switching apparatus, whereby a connection is completed over said selected trunk if said calling line is non-restricted and whereby a connection is completed to said source of busy tone if said calling line is restricted.

12. In a telephone system, a plurality of lines divided into a first group comprising restricted lines and a second group comprising non-restricted lines, a called line, a register sender, a link comprising a finder and a selector operated in response to a call on one of said lines for connecting said calling line and said selector to said register sender, a trunk group, means in said register sender controlled over said calling line for registering said called line number and for transmitting switch controlling digits to said selector, means in said selector controlled by a first digit transmitted thereto for selecting said trunk group, means for thereafter selecting an idle trunk in said selected trunk group, means in said selector governed incident to selection of said trunk group for preparing a point in a circuit for preventing said last named means from selecting any trunk in said selected trunk group, means in said finder operated only in the event said calling line is included in a restricted group of lines for completing said last-mentioned circuit, and means in said selector controlled by said register sender for disconnecting said register sender from said calling line and said selector and for connecting said calling line by way of said selector and a selected trunk to said called line if a non-restricted line is calling or for connecting said calling line to said selector and for transmitting a busy tone signal to said calling line if a restricted line is calling.

13. In a telephone system, a plurality of subscriber lines divided into two groups arranged respectively for restricted and non-restricted service, a group of trunks, a link comprising a finder having access to said lines and a selector switch having access to said trunks, a set of wipers in said finder operated in a vertical direction in response to a call on one of said lines to select the group of lines including said calling line and operated in a rotary direction to select the calling line in said selected group, control contacts in said finder only actuated by said finder wipers in response to selection at the end of said vertical movement of a restricted group of lines, a register sender, means in said selector controlled incident to selection of said calling line for connecting said calling line and said selector to said register sender, means in said register sender controlled over said calling line for registering a call to be completed over a trunk in said group of trunks, means in said register sender for thereafter transmitting a series of digits for completing said call by way of said selector and one of said trunks, a set of wipers in said selector, means in said selector controlled by a first digit transmitted thereto for operating said selector wipers in a vertical direction to select said group of trunks, means in said selector for thereafter rotating said wipers to search for an idle trunk in said selected group, a switch-through relay, means for operating said switch-through relay as soon as an idle trunk is found in order to terminate rotation of said wipers and in order to seize said idle trunk in said selected group and in order to connect said register sender to said seized trunk, whereby the remaining digits in said series are transmitted over said seized trunk to complete a connection, control contacts in said selector only actuated by said selector wipers in response to selection of said group of trunks at the end of said vertical movement, a control circuit for said switch-through relay completed only by actuation of said control contacts in said finder and said control contacts in said selector for preventing operation of said switch-through relay during rotation of said selector wipers, means thereafter effective for terminating rotation of said selector wipers after said wipers have been rotated over all of the trunks in said selected group to a predetermined rotary position, whereby the remaining digits in said series transmitted by said register sender are absorbed in said selector, means in said selector controlled by said register sender after the transmission of the last digit in said series for connecting said calling line to said selector and for disconnecting said calling line and said selector from said register sender, whereby a calling line in said restricted group of lines is prevented from completing a connection over a trunk in said group of trunks and whereby a calling line in said nonrestricted group of lines is permitted to complete a connection by way of said selector and a seized trunk in said group of trunks.

14. In a telephone system including a group of lines divided into a plurality of subgroups, each of said subgroups of lines corresponding to a different class of services, a register sender, a link common to said group of lines operative to select any subgroup of lines and any line in a selected subgroup of lines, means operated incident to a call on any one of said lines for operating said link to select the subgroup including said calling line and then the calling line in the selected subgroup, means controlled incident to said selection of said calling line by said link for connecting said calling line to said register sender, a pair of conductors individual to said link, means jointly controlled by the operation of said link to select said subgroup of lines including said calling line and the connection of said calling line to said register sender for marking said pair of conductors in a particular manner to indicate the class of service of the selected subgroup of lines including said calling line, means in said register sender operated incident to said connection of said calling line thereto for testing each conductor of said pair of conductors to determine the particular markings thereon, and means controlled by said testing means for registering the particular class of service of said calling line in said register sender in accordance with the particular manner of marking said pair of conductors.

15. In a telephone system including a first group of lines divided into first and second subgroups corresponding to first and second classes of service and a second group of lines divided into first and second subgroups corresponding to third and fourth classes of service, a register sender, a first finder having access to said first group of lines, a second finder having access to said second group of lines, means controlled in response to a call on any one of said lines for operating the finder associated with the group of lines including said calling line to search for and select the particular subgroup of lines including said calling line and to thereafter search for and select the particular calling line in the selected subgroup, a pair of marking conductors individual to each of said finders, means in said first finder for marking one conductor of the associated pair of marking conductors in a first manner when said first finder selects said first subgroup of lines in said first group and for marking said one conductor of said pair in a second manner when said first finder selects said second subgroup of lines in said first group, means in said second finder for marking the associated pair of marking conductors in a third manner when said second finder selects said first subgroup of lines in said second group and for marking said pair of conductors in a fourth manner when said second finder selects said second subgroup of lines in said second group, means controlled incident to said selection of said calling line by one of said finders for connecting said register sender to said connected calling line and to said pair of conductors individual to the operated finder, means in said register sender operated incient to said connection with said calling line for testing said marking conductors to determine the markings thereon, and means controlled in the event said marking conductors of said first finder are marked in said first manner or said second manner for registering a first digit or a second digit indicative respectively of the class of service of said first or said second subgroup of lines in said first group of lines and controlled in the event said marking conductors of said second link are marked in said third manner or said fourth manner for registering a third digit or a fourth digit indicative respectively of the class of service of said first or said second subgroup of lines in said second group of lines.

16. In a telephone system including three groups of lines corresponding respectively to three different classes of service, a finder having access to said lines, said finder being characterized by a plurality of different primary operations thereof to select corresponding ones of said groups of lines and by a plurality of different secondary operations thereof to select corresponding ones of the individual lines in the previously selected one of said groups of lines, an automatic switch associated with said finder, a register sender, a control conductor interconnecting said finder and said automatic switch, means operated incident to a call on one of said lines for governing said primary and secondary operations of said finder to find said calling line, first contact springs in said finder actuated to mark said control conductor in a first manner by applying a ground potential thereto only in response to the selection of a first group of said three groups of lines by said primary operation of said finder, second contact springs in said finder actuated to mark said control conductor in a second manner by applying a battery potential thereto only in response to the selection of a second group of said three groups of lines by said primary operation of said finder, said control conductor being marked in a third manner by an absence of either of said potentials in response to the selection of a third group of said three groups of lines by said primary operation of said finder, means controlled incident to said finder finding said calling line for connecting said calling line to said register sender and for connecting said register sender to said automatic switch, a pair of marking conductors individual to said register sender, means in said automatic switch controlled by said connection of said register sender therewith for connecting said marked control conductor to one conductor of said pair and for applying a marking ground potential to the other conductor of said pair, means in said register sender operated by said connection of said calling line thereto for testing the two conductors of said pair of marking conductors, and means for registering in said register sender the particular class of service of the particular calling line in accordance with the particular markings encountered on said pair of conductors by said testing means.

17. In a telephone system including a group of lines divided into a plurality of subgroups, each of said subgroups of lines corresponding to a different class of service, a register sender, a link common to said group of lines operative to select any subgroup of lines and any line in a selected subgroup of lines, means operated incident to a call on any one of said lines for operating said link to select the subgroup including said calling line and then the calling line in the selected subgroup, means controlled incident to said selection of said calling line by said link for connecting said calling line to said register sender, a pair of conductors individual to said link, means jointly controlled by the operation of said link to select said subgroup of lines including said calling line and the connection of said calling line to said register sender and for marking said pair of conductors in a particular manner to indicate the class of service of the selected subgroup of lines including said calling line, a class test relay in said register sender operated incident to the connection of said calling line thereto, a first relay, a second relay, a third relay, means controlled by operation of said class test relay for connecting said first relay to one conductor of said pair of conductors and for sequentially connecting said second relay and said third relay to the other conductor of said pair of conductors, whereby said first relay is either operated or remains in its restored position and said second relay and said third relay are individually operated or remain in their restored positions depending upon the class of service marked on said pair of conductors, and means controlled in accordance with the operated and the restored positions of said first relay and said second relay and said third relay for registering the identity of the particular class of service of said calling line.

18. In a telephone system including a group of lines divided into a plurality of subgroups, each of said subgroups of lines corresponding to a different class of service, a register sender, a link common to said group of lines operative to select any subgroup of lines and any line in a selected subgroup of lines, means operated incident to a call on any one of said lines for operating said link to select the subgroup including said calling line and then the calling line in the selected subgroup, means controlled incident to said selection of said calling line by said link for connecting said calling line to said register sender, a pair of conductors individual to said link, means jointly controlled by the operation of said link to select said subgroup of lines including said calling line and the connection of said calling line to said register sender and for marking said pair of conductors in a particular manner to indicate the class of service of the selected subgroup of lines including said calling line, a class test relay in said register sender operated incident to the connection of said calling line thereto, a first relay, a second relay, a third relay, means controlled by operation of said class test relay for connecting said first relay to one conductor of said pair of conductors and for sequentially connecting said second relay and said third relay to the other conductor of said pair of conductors, whereby said first relay is either operated or remains in its restored position and said second relay and said third relay are individually operated or remain in their restored positions depending upon the class of service marked on said pair of conductors, means controlled in accordance with the operated and the restored positions of said first relay and said second relay and said third relay for registering the identity of the particular class of service of said calling line, a plurality of class indicating signals, and additional means controlled in accordance with the operated and restored positions of said first relay and said second relay and said third relay for selecting and actuating one of said class indicating signals to indicate the particular class of service of said calling line.

19. In a telephone system including three groups of lines corresponding respectively to three different classes of service, a finder having access to said lines, said finder being characterized by a plurality of different primary operations thereof to select corresponding ones of said groups of lines and by a plurality of different secondary operations thereof to select corresponding ones of the individual lines in the previously selected one of said groups of lines, an automatic switch associated with said finder, a register sender, a control conductor interconnecting said finder and said automatic switch, means operated incident to a call on one of said lines for governing said primary and secondary operations of said finder to find said calling line, first contact springs in said finder actuated to mark said control conductor in a first manner with a ground potential only in response to the selection of a first group of said three groups of lines by said primary operation of said finder, second contact springs in said finder actuated to mark said control conductor in a second manner with a battery potential only in response to the selection of a second group of said three groups of lines by said primary operation of said finder, said control conductor being marked in a third manner by an absence of either of said potentials in response to the selection of a third group of said three groups of lines by said primary operation of said finder, means controlled incident to said finder finding said calling line for connecting said calling line to said register sender and for connecting said register sender to said automatic switch, a pair of marking conductors individual to said register sender, means in said automatic switch controlled by said connection of said register sender therewith for applying a marking ground potential to the first conductor of said pair of marking conductors and for connecting the marking on said control conductor to the second conductor of said pair of marking conductors, a class test relay in said register sender operated incident to the connection of said calling line thereto, a first relay, a second relay, a third relay, means controlled by operation of said class test relay for connecting said first relay to said first conductor of said pair of marking conductors and for sequentially connecting said second relay and said third relay to said second conductor of said pair of marking conductors, whereby said first relay is operated by the marking ground potential applied to said first conductor of said pair and whereby said second relay is operated by ground potential applied to said second conductor of said pair and said third relay is operated by a battery potential applied to said second conductor of said pair depending upon the class of service marked on said pair of marking conductors, means controlled by the operated first relay in combination with the operated second or operated third relay or in combination with the restored second and third relays for registering respectively any one of the three different classes of service of said three groups of lines.

20. In a telephone system including three groups of lines corresponding respectively to three different classes of service, a finder having access to said lines, said finder being characterized by a plurality of different primary operations thereof to select corresponding one of said groups of lines and by a plurality of different secondary operations thereof to select corresponding one of the individual lines in the previously selected one of said groups of lines, an automatic switch associated with said finder, a register sender, a control conductor interconnecting said finder and said automatic switch, means operated incident to a call on one of said lines for governing said primary and secondary operations of said finder to find said calling line, first contact springs in said finder actuated to mark said control conductor in a first manner with a ground potential only in response to the selection of a first group of said three groups of lines by said primary operation of said finder, second contact springs in said finder actuated to mark said control conductor in a second manner with a battery potential only in response to the selection of a second group of said three groups of lines by said primary operation of said finder, said control conductor being marked in a third manner by an absence of either of said potentials in response to the selection of a third group of said three groups of lines by said primary operation of said finder, means controlled incident to said finder finding said calling line for connecting said calling line to said register sender and for connecting said register sender to said automatic switch, a pair of marking conductors individual to said register sender, means in said automatic switch controlled by said connection of said register sender therewith for applying a marking ground potential to the first conductor of said pair of marking conductors and for connecting the marking on said control conductor to the second conductor of said pair of marking conductors, a class test relay in said register sender operated incident to the connection of said calling line thereto, a first relay, a second relay, a third relay, means controlled by operation of said class test relay for connecting said first relay to said first conductor of said pair of marking conductors and for sequentially connecting said second relay and said third relay to said second conductor of said pair of marking conductors, whereby said first relay is operated by the marking ground potential applied to said first conductor of said pair and whereby said second relay is operated by ground potential applied to said second conductor of said pair and said third relay is operated by a battery potential applied to said second conductor of said pair depending upon the class of service marked on said pair of marking conductors, means controlled by the operated first relay in combination with the operated second or operated third relay or in combination with the restored second and third relay for registering respectively any one of the three different classes of service of said three groups of lines, a plurality of class indicating signals, and additional means controlled in accordance with the operated positions of said first relay and the operated and restored positions of said second and third relays for selecting and actuating one of said classes indicating signals to indicate the particular class of service of the group of lines including said calling line.

21. In a telephone system, a first finder-selector link, a second finder-selector link, a first group of lines divided into a plurality of subgroups, each subgroup of lines in said first group accessible to said first link, a second group of lines divided into a plurality of subgroups, each subgroup of lines in said second group accessible to said second link, each one of said subgroups of lines in said first group and in said second group corresponding respectively to a different class of service, a register sender, a pair of conductors individual to each of said links, means controlled incident to a call on any one of said lines for operating the associated link to find the calling line and to connect said register sender to said marking conductors and to mark said pair of conductors in accordance with the particular class of service of the subgroup of lines including said calling line, and means in said register sender controlled over said pair of conductors in accordance with the marking thereon for registering the particular class of service of the calling line in any subgroup of lines in said first and second groups of lines.

References Cited in the file of this patent

UNITED STATES PATENTS

| | | |
|---|---|---|
| 1,944,269 | Raynsford et al. | Jan. 23, 1934 |
| 2,040,219 | Bonomi | May 12, 1936 |
| 2,271,878 | Wadsworth | Feb. 3, 1942 |
| 2,352,492 | Ostline | June 27, 1944 |
| 2,369,071 | Ostline | Feb. 6, 1945 |
| 2,375,514 | Bakker | May 8, 1945 |
| 2,490,221 | Lomax | Dec. 6, 1949 |
| 2,517,517 | Wicks et al. | Aug. 1, 1950 |
| 2,535,510 | Ostline | Dec. 26, 1950 |
| 2,544,944 | Wicks | Mar. 13, 1951 |
| 2,592,784 | Bakker | Apr. 15, 1952 |